United States Patent
Atallah et al.

(10) Patent No.: US 12,141,525 B1
(45) Date of Patent: Nov. 12, 2024

(54) USING A NATURAL LANGUAGE INTERFACE TO CORRELATE USER INTENT WITH PREDEFINED DATA ANALYSIS TEMPLATES FOR SELECTED DATA SOURCES

(71) Applicant: Tableau Software, LLC, Seattle, WA (US)

(72) Inventors: Ryan Andrew Atallah, Palo Alto, CA (US); Yukiko Ishida Añonuevo, Concord, CA (US)

(73) Assignee: Tableau Software, LLC, Seattle, WA (US)

( * ) Notice: Subject to any disclaimer, the term of this patent is extended or adjusted under 35 U.S.C. 154(b) by 47 days.

(21) Appl. No.: 17/473,992

(22) Filed: Sep. 13, 2021

(51) Int. Cl.
G06F 40/279 (2020.01)
G06F 40/186 (2020.01)
G06F 40/205 (2020.01)

(52) U.S. Cl.
CPC .......... *G06F 40/279* (2020.01); *G06F 40/186* (2020.01); *G06F 40/205* (2020.01)

(58) Field of Classification Search
CPC ..... G06F 40/279; G06F 40/186; G06F 40/205
See application file for complete search history.

(56) References Cited

U.S. PATENT DOCUMENTS

| | | |
|---|---|---|
| 7,703,021 B1 | 4/2010 | Flam |
| 8,099,674 B2 | 1/2012 | Mackinlay et al. |
| 8,375,014 B1 | 2/2013 | Brocato et al. |
| 10,515,121 B1 | 12/2019 | Setlur et al. |
| 10,546,001 B1 * | 1/2020 | Nguyen ................. G06F 40/186 |
| 10,558,688 B1 | 2/2020 | Nguyen et al. |
| 11,604,794 B1 * | 3/2023 | Nallapati ............ G06F 16/2423 |
| 2005/0080770 A1 | 4/2005 | Lueder et al. |
| 2009/0313576 A1 | 12/2009 | Neumann et al. |
| 2010/0312602 A1 * | 12/2010 | McLoughlin ..... G06F 16/24522 |
| | | 707/E17.069 |
| 2011/0173680 A1 | 7/2011 | Bates et al. |

(Continued)

OTHER PUBLICATIONS

Mavin, Alistair, et al. "Easy approach to requirements syntax (EARS)." 2009 17th IEEE International Requirements Engineering Conference. IEEE, 2009, pp. 317-322 (Year: 2009).*

(Continued)

*Primary Examiner* — Andrew C Flanders
*Assistant Examiner* — Michael C. Lee
(74) *Attorney, Agent, or Firm* — Morgan, Lewis & Bockius LLP

(57) ABSTRACT

A computing device receives, in a graphical user interface, a first natural language query. The computing device parses the first natural language query, thereby identifying one or more keywords in the query. The computing device identifies one or more data sources that are relevant to the query. The computing device also identifies one or more data fields and/or data values from the data sources in the query. The computing device compares the keywords to respective trigger text for each of a plurality of data analysis templates, thereby selecting a first data analysis template. The first data analysis template includes a plurality of predefined data visualizations. The computing device generates a dashboard that includes the data visualizations using the identified data fields and/or data values, and displays the dashboard in the graphical user interface.

20 Claims, 45 Drawing Sheets

(56) References Cited

U.S. PATENT DOCUMENTS

| | | | |
|---|---|---|---|
| 2014/0040871 | A1 | 2/2014 | Schwan et al. |
| 2014/0244625 | A1 | 8/2014 | Seghezzi et al. |
| 2015/0100588 | A1 | 4/2015 | Allen et al. |
| 2016/0232537 | A1 | 8/2016 | Nonez et al. |
| 2016/0283091 | A1 | 9/2016 | Hang et al. |
| 2017/0308571 | A1 | 10/2017 | McCurley et al. |
| 2018/0329948 | A1 | 11/2018 | Nijor et al. |
| 2019/0179495 | A1 | 6/2019 | Watanabe et al. |
| 2019/0362009 | A1 | 11/2019 | Miseldine et al. |
| 2020/0012638 | A1 | 1/2020 | Luo et al. |
| 2020/0089700 | A1 | 3/2020 | Ericson et al. |
| 2020/0089760 | A1 | 3/2020 | Ericson et al. |
| 2020/0097302 | A1* | 3/2020 | Deutch ............... G06F 3/04817 |
| 2020/0104401 | A1 | 4/2020 | Burnett et al. |
| 2020/0110779 | A1 | 4/2020 | Setlur et al. |
| 2020/0110803 | A1 | 4/2020 | Djalali et al. |
| 2020/0134641 | A1 | 4/2020 | Morgan et al. |
| 2020/0134683 | A1 | 4/2020 | Boren et al. |
| 2020/0174755 | A1 | 6/2020 | Rose et al. |
| 2020/0236013 | A1 | 7/2020 | Mocanu et al. |
| 2020/0293167 | A1 | 9/2020 | Blyumen |
| 2020/0380432 | A1 | 12/2020 | Wang et al. |
| 2021/0117056 | A1 | 4/2021 | Kuo et al. |
| 2021/0182283 | A1 | 6/2021 | Carney et al. |
| 2021/0224328 | A1* | 7/2021 | Schrupp ............... G06F 16/9038 |
| 2021/0225529 | A1* | 7/2021 | Viengkham ............. H04L 67/12 |
| 2021/0232920 | A1 | 7/2021 | Parangi et al. |
| 2021/0342125 | A1* | 11/2021 | Burnett ...................... G06F 8/34 |
| 2021/0342785 | A1* | 11/2021 | Mann ................. G06F 11/3409 |
| 2021/0349581 | A1 | 11/2021 | Egozi et al. |
| 2021/0406325 | A1 | 12/2021 | Sinn et al. |
| 2022/0050695 | A1 | 2/2022 | Gajendran et al. |
| 2022/0358286 | A1 | 11/2022 | Wilson-Thomas et al. |
| 2022/0405314 | A1* | 12/2022 | Du ...................... G06F 16/3344 |

OTHER PUBLICATIONS

Gao, Tong, et al. "Datatone: Managing ambiguity in natural language interfaces for data visualization." Proceedings of the 28th annual acm symposium on user interface software & technology. 2015, pp. 489-500. (Year: 2015).*

Setlur, Vidya, et al. "Eviza: A natural language interface for visual analysis." Proceedings of the 29th annual symposium on user interface software and technology. 2016, p. 365-377. (Year: 2016).*

Narechania, Arpit, et al. "NL4DV: A toolkit for generating analytic specifications for data visualization from natural language queries." IEEE Transactions on Visualization and Computer Graphics 27.2 (2020), pp. 369-379 (Year: 2020).*

Mazo, Raúl, et al. "Towards a new template for the specification of requirements in semi-structured natural language." Journal of Software Engineering Research and Development 8 (2020), pp. 1-16 (Year: 2020).*

Giannakopoulou, Dimitra, et al. "Automated formalization of structured natural language requirements." Information and Software Technology 137 (Apr. 21, 2021) 106590, pp. 1-19 (Year: 2021).*

Atallah, Office Action, U.S. Appl. No. 17/368,783, Dec. 27, 2021, 38 pgs.

Atallah, Final Office Action, U.S. Appl. No. 17/368,783, Jul. 25, 2022, 26 pgs.

Atallah, Office Action, U.S. Appl. No. 17/357,912, Feb, 1, 2022, 25 pgs.

Atallah, Notice of Allowance, U.S. Appl. No. 17/357,912, Jul. 8, 2022, 12 pgs.

D. Song et al., "Building and Querying an Enterprise Knowledge Graph," in IEEE Transactions on Services Computing, Vpl. 12, No. 3, pp. 356-369, May 1-Jun. 2019, doi: 10.1109/TSC.2017.2711600, (Year 2019).

F.Siasar Djahantighi, M. Norouzifard, S.H. Davarpanah and M.H. Shenassa, "Using Natural Language Processing in Order to Create SQL queries," 2008 International Conference on Computer and Communication Engineering, 2008, pp. 600-604, doi: 10.1109/ICCCE.2008.458067, (Year 2008).

Mannheimer, Office Action, U.S. Appl. No. 17/521,820, Jan. 13, 2023, 18 pgs.

Mannheimer, Final Office Action, U.S. Appl. No. 17/521,820, May 8, 2023, 21 pgs.

Atallah, Office Action, U.S. Appl. No. 17/368,783, Oct. 6, 2023, 30 pgs.

Miller, Office Action, U.S. Appl. No. 17/878,821, Aug. 24, 2023, 17 pgs.

U.S. Appl. No. 15/486,265, filed Apr. 12, 2017. This application issued as U.S. Pat. No. 10,515,121.

U.S. Appl. No. 15/804,991, filed Nov. 6, 2017. This application issued as U.S. Pat. No. 10,817,527.

U.S. Appl. No. 15/978,062, filed May 11, 2018. This application issued as U.S. Pat. No. 10,795,902.

U.S. Appl. No. 15/978,066, filed May 11, 2018. This application issued as U.S. Pat. No. 11,010,396.

U.S. Appl. No. 15/978,067, filed May 11, 2018. This application issued as U.S. Pat. No. 11,030,207.

U.S. Appl. No. 16/219,406, filed Dec. 13, 2018. This application issued as U.S. Pat. No. 10,896,297.

U.S. Appl. No. 16/134,892, filed Sep. 18, 2018. This application issued as U.S. Pat. No. 11,048,871.

U.S. Appl. No. 16/134,907, filed Sep. 18, 2018. This application issued as U.S. Pat. No. 10,902,045.

U.S. Appl. No. 16/166,125, filed Oct. 21, 2018. This application issued as U.S. Pat. No. 11,055,489.

U.S. Appl. No. 16/234,470, filed Dec. 27, 2018. This application issued as U.S. Pat. No. 11,244,114.

U.S. Appl. No. 16/601,437, filed Oct. 14, 2019. This application issued as U.S. Pat. No. 11,455,339.

U.S. Appl. No. 16/680,431, filed Nov. 11, 2019.

U.S. Appl. No. 14/801,750, filed Jul. 16, 2015. This application issued as U.S. Pat. No. 11,294,924.

U.S. Appl. No. 16/681,754, filed Nov. 12, 2019. This application issued as U.S. Pat. No. 11,550,853.

U.S. Appl. No. 17/357,912, filed Jun. 24, 2021. This application issued as U.S. Pat. No. 11,494,061.

U.S. Appl. No. 17/368,783, filed Jul. 6, 2021.

* cited by examiner

Analytical Expressions 238
- Aggregation Expressions 240
- Group Expressions 242
- Filter Expressions 244
- Limit Expressions 246
- Sort Expressions 248
- ⋮

Figure 2B

Grammar Lexicon 262
- Analytical Concepts 266
  - Fields 268
  - Values 270
  - Aggregation 272
  - Group 274
  - Filter 276
  - Limit 278
  - Sort 280
  - ⋮
- ⋮

```
func WhichXHasTheMostY() *QuestionExp {
    return &QuestionExp{
        ID: "WhichXHasTheMostY" ,
        Parts: []*QuestionPart{
            OptionalyPhrase(HasPhrase()),
            OptionalPhrase(ThePhrase()),
            RequiredPhrase(SuperlativesSwitch()),
            RequiredPhrase(FieldExpPhrase()),
        },
        ToLODExps: func(
            parts []*QuestionPart,
            registers *interfaces.Registers,
        ) ([]*LODExp, error) {
            var results []*LODExp
            LodExp1 := NewLOD1Exp(RegistersToNewDatasourceExp(registers))
            // 1. Build "Agg({$5:FieldExp}) by {$1:DimensionExp},
            {LimitDirection} 1 as a bar chart"
            fieldExp, err := phraseToFieldExp(parts[5].Phrase)
            if err != nil : nil, arkerr.NewParent(err, "phase conversion
            failed", arker.Data{phraseIdx": 5}) ↑
            aggregationExp := &AggregationExp{
                Aggregation: ToAggregation(fieldExp, registers),
                Attribute: fieldExp,
            }
            err = LodExp1.Add(aggregationExp, registers)
            if err != nil : nil, arkerr.NewParent(err, "failed to add
            aggregation to LODExp") ↑ dimensionExp, err := phraseToFieldExp(parts[1].Phrase)
            if err != nil : nil, arkerr.NewParent(err, phrase conversion
            failed", arker.Data{"phraseIdx": 1}) ↑
            groupExp := &GroupExp{
                Group:     ByField(),
                Attribute: dimensionExp,
            }
            err = lodExp1.Add(groupExp, registers)
            if err != nil : nil, arkerr.NewParent(err, "failed to add
            aggregation to LODExp") ↑ selection, err := phraseToSelection(parts[4].Phrase)
            if err != nil : nil, arkerr.NewParent(err, "phrase conversion
            failed", arkerr.Data{"phraseIdx": 41}) ↑
            var limit *Limit
            switch selection.(*TextPhrase).Raw {
            case MostPhrase().Raw:
```

Figure 7A

```
    limit = Top()
case LeastPhrase().Raw:
    limit = Bottom()
default:
    return nil, arkerr.NewParent(err, errText: "invalid selection")
}
oneNumber := &ComplexValueExp{Value: values.NumberToSingletonSlice(
num: 1, valueconcepts.None)}
limitExp, err := Set(SetParams{
    CanBeSet: new(LimitExp),
    Registers:    registers,
    ToSet:    []interfaces.Exp{limit, groupExp, aggregationExp,
    oneNumber},
})
if err != nil : nil, arkerr.NewParent(err, "failed to set limit
exp") }
err = lodExp1.Add(limitExp, registers)
if err != nil : nil, arkerr.NewParent(err, "failed to add
aggregation to L)DExp") }
results = apped(results, lodExp1)

// 2. Build "Agg({$5:FieldExp}) by {$1:DimensionExp}
lodExp2 := NewLOD1Exp(RegistersToNewDatasourceExp(registers))
err = loExp2.Add(aggregationExp, registers)
if err != nil : nil, arkerr.NewParent(err, "failed to add
aggregation to LODExp") }
err = lodExp2.Add(groupExp. registers)

return results , nil
 },
}
```

Figure 7B

```
func ParseQuestion(
    query string,
    nGrams NGrams,
    registers *interfaces.Registers,
) ([]interfaces.Exp, error) { tokenMap := getTokenMapFromNGrams(nGrams)
    tokens := strings.Spit(query, sep: " ")

var results []interfaces.Exp

QuestionLoop:
    for _, questionExp := range exps.DefaultQuestionExp() {
      lastMarchedTokenIdx := -1
    PartLoop:
      for _, part := range questionExp.Parts {
        for tokenIdx, token := range tokens {
            if tokenIdx <= lastMarchedTokenIdx {
              continue
            }
            matched := part.Phrase.Match(token, tokenMap[tokenIdx], registers)
            if matched {
                lastMarchedTokenIdx = tokenIdx
                continue PartLoop
            }
        }
        // if we've gotten here, no nGrams matched the question part
        if part.Required {
            continue QuestionLoop
        }
      }
      // if we've gotten here, then all Required Parts were matched
      results = append(results, questionExp)
    } return results, nil
}
```

⊙ california kpis — 892

894 — Your question: *what are our California KPIs?* sum of Sales with State in California — 896

☐ Text Table ▽    ✕

$671,595 sum of Profit with State in California — 898

☐ Text Table ▽    ✕

$116,475

Profit Ratio with State in California — 899

☐ Text Table ▽    ✕

USING A NATURAL LANGUAGE INTERFACE TO CORRELATE USER INTENT WITH PREDEFINED DATA ANALYSIS TEMPLATES FOR SELECTED DATA SOURCES

RELATED APPLICATIONS

This application is related to U.S. patent application Ser. No. 17/474,018, filed Sep. 13, 2021, entitled "Generating Data Analysis Dashboard Templates for Selected Data Sources," which is incorporated by reference herein in its entirety.

This application is related to the following applications, each of which is incorporated by reference herein in its entirety:

(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;

(ii) U.S. patent application Ser. No. 15/804,991, filed Nov. 6, 2017, entitled "Systems and Methods of Using Natural Language Processing for Visual Analysis of a Data Set";

(iii) U.S. patent application Ser. No. 15/978,062, filed May 11, 2018, entitled "Applying Natural Language Pragmatics in a Data Visualization User Interface";

(iv) U.S. patent application Ser. No. 15/978,066, filed May 11, 2018, entitled "Data Visualization User Interface Using Cohesion of Sequential Natural Language Commands";

(v) U.S. patent application Ser. No. 15/978,067, filed May 11, 2018, entitled "Updating Displayed Data Visualizations According to Identified Conversation Centers in Natural Language Commands";

(vi) U.S. patent application Ser. No. 16/219,406, filed Dec. 13, 2018, entitled "Identifying Intent in Visual Analytical Conversations";

(vii) U.S. patent application Ser. No. 16/134,892, filed Sep. 18, 2018, entitled "Analyzing Natural Language Expressions in a Data Visualization User Interface";

(viii) U.S. patent application Ser. No. 16/134,907, filed Sep. 18, 2018, entitled "Natural Language Interface for Building Data Visualizations, Including Cascading Edits to Filter Expressions";

(ix) U.S. patent application Ser. No. 16/166,125, filed Oct. 21, 2018, entitled "Determining Levels of Detail for Data Visualizations Using Natural Language Constructs";

(x) U.S. patent application Ser. No. 16/234,470, filed Dec. 27, 2018, entitled "Analyzing Underspecified Natural Language Utterances in a Data Visualization User Interface";

(xi) U.S. patent application Ser. No. 16/601,437, filed Oct. 14, 2019, entitled "Incremental Updates to Natural Language Expressions in a Data Visualization User Interface";

(xii) U.S. patent application Ser. No. 16/680,431, filed Nov. 11, 2019, entitled "Using Refinement Widgets for Data Fields Referenced by Natural Language Expressions in a Data Visualization User Interface";

(xiii) U.S. patent application Ser. No. 14/801,750, filed Jul. 16, 2015, entitled "Systems and Methods for using Multiple Aggregation Levels in a Single Data Visualization";

(xiv) U.S. patent application Ser. No. 16/681,754, filed Nov. 12, 2019, entitled "Using Natural Language Expressions to Define Data Visualization Calculations that Span Across Multiple Rows of Data from a Database";

(xv) U.S. patent application Ser. No. 17/357,912, filed Jun. 24, 2021, entitled "Using a Natural Language Interface to Generate Dashboards Corresponding to Selected Data Sources"; and (xvi) U.S. patent application Ser. No. 17/368,783, filed Jul. 6, 2021, entitled "Using a Natural Language Interface to Explore Entity Relationships for Selected Data Sources."

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

A typical natural language interface for data visualization constructs a single graphic based on a user's input. Disclosed implementations expand on this by generating dashboards with multiple graphics, each graphic emphasizing a different aspect of the data. For example, one graphic may show total sales for a specific product, a second graphic may show annual sales for a recent set of years, and a third graphic may show the sales of the specific product compared to other products. Some implementations generate dashboards dynamically based on the user input.

In some cases, the user asking the question may be a business user with little or no knowledge of data science. Such a person may ask a sound business question without a clear idea of what type of graphics might be useful. To address this, some implementations enable a data analyst to curate a set of natural language templates, and assign a dashboard with multiple graphics to each template.

In general, a natural language template (also referred to as a data analysis template) is a parameterized natural language command, where each term is either a literal token (e.g., "sales" or furniture") or a parameter that has a limited set of replacement values (e.g., the replacement value is required to be the name of a measure data field from the data source or the replacement value must define a data value of a certain data type). In addition, each of the terms is designated as either required or optional.

Each template also has an associated set of data visualizations. When a template is later matched to a user's natural language input, information from the input fills in the parameters, and the system generates the dashboard, including all of the corresponding data visualizations.

There is also a need for improved systems and methods that support and refine natural language interactions with visual analytical systems. The present disclosure describes data visualization platforms that improve the effectiveness of natural language interfaces by resolving natural language utterances as they are being input by a user of the data visualization platform. Unlike existing interfaces, which require natural language inputs to be composed of complete words and/or phrases, the present disclosure describes a natural language interface that provides feedback (e.g., generates interpretations, search results, or entity search results) in response to each term that is input by the user.

The disclosed natural language interface automatically annotates a term in a natural language utterance when the interface determines with certain confidence that the term should be interpreted as a particular entity in the data source. The disclosed natural language interface also resolves ambiguities in natural language utterances by visually correlating how a term in a natural language input maps to respective analytical expressions or phrases corresponding to the interpretation. Once a term is automatically annotated, the data visualization platform displays analytical expressions or phrases corresponding to the interpretation. The data visualization platform also visually emphasizes a term and its corresponding phrases (e.g., by simultaneously pulsing the term and its corresponding phrases). The data visualization platform also visually de-emphasizes other terms in the natural language input that are not recognized by the platform, thereby informing the user that these other terms are not required in the natural language command. Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method is performed at a computing device. The computing device has a display, one or more processors, and memory. The memory stores one or more programs configured for execution by the one or more processors. The computing device receives, in a graphical user interface, a first natural language query. In response to receiving the first natural language query, the computing device parses the first natural language query. Parsing the first natural language query includes identifying one or more keywords in the first natural language query. The computing device identifies one or more data sources that are relevant to the first natural language query. The computing device also identifies one or more data fields and/or data values from the one or more data sources in the first natural language query. The computing device compares the one or more keywords with respective trigger text for each of a plurality of data analysis templates. Typically, the data analysis templates are associated with the identified data sources, but some data analysis templates are constructed to work with many different data sources. The computing device selects a first data analysis template from the plurality of templates in accordance with the comparing. The first data analysis template includes a plurality of predefined data visualizations. The computing device generates a dashboard that includes the plurality of data visualizations using the identified data fields and/or data values. The computing device then displays the dashboard in the graphical user interface.

In some implementations, the trigger text for the first data analysis template includes a plurality of terms. Comparing the one or more keywords with the respective trigger text identifies a subset of terms that are required, and matching parameters of the subset of terms with attributes of the one or more keywords.

In some implementations, each term of the plurality of terms in the trigger text for the first data analysis template is encoded to specify whether the respective term is required or optional.

In some implementations, the trigger text includes a plurality of terms, including a first term that is optional and one or more second terms that are required. In some implementations, the one or more second terms are encoded to specify constraints on the one or more second terms. In some implementations, the one or more second terms include one or more fixed terms. In some implementations, the one or more second terms include one or more variable terms.

In some instances, a variable term is (i) a variable dimension expression that is limited to being replaced by dimension data fields from the data sources, (ii) a variable field expression that is limited to being replaced by a subset of data fields in the one or more data sources, (iii) a variable superlative expression that is limited to being replaced by a superlative adjective and a data field from the data sources, or (iv) a variable measure expression that is limited to being replaced by a measure data field from the data sources.

In some instances, the variable terms include a variable field expression. The system generates the dashboard having the plurality of data visualizations by replacing the variable field expression with a first identified data field, generating an aggregate expression that includes the first identified data field, and generating one or more of the data visualizations based on the aggregate expression.

In some implementations, identifying the one or more data fields and/or data values from the one or more data sources further operates by looking up the keywords using one or more lexicons corresponding to the one or more data sources to identify the one or more data fields and/or data sources corresponding to the one or more keywords.

In some implementations, the dashboard includes a description of how the first natural language query is interpreted.

In some implementations, each of the one or more predefined data visualizations corresponds to a respective visualization type. In some implementations, each data visualization has a respective visualization type that is a bar chart, a Gantt chart, a line chart, a map, a pie chart, a scatter plot, a tree map, or a text table.

In some implementations, the first data analysis template is selected based on the one or more identified data sources.

In some implementations, generating the dashboard entails populating one or more parameters in the first data analysis template using the identified data fields and/or data values identified in the first natural language query.

In some implementations, generating the dashboard entails, for each of the plurality of data visualizations, forming a respective intermediate expression according to a context-free grammar and one or more semantic models of data fields in the one or more data sources. The computing device translates the respective intermediate expression into one or more executable database queries referencing the identified data fields and/or data values. The computing device executes the one or more database queries to retrieve data from the one or more data sources. The computing device also generates the dashboard to include a plurality of data visualizations from the retrieved data.

In accordance with some implementations, a method is performed at a computing device. The computing device has a display, one or more processors, and memory. The memory stores one or more programs configured for execution by the one or more processors. The computing device receives, in a graphical user interface, a first natural language input that includes a plurality of terms. The terms include one or more data fields and/or data values of a data source. The computing device designates the first natural language input as trigger text for a first data analysis template. The trigger text includes the plurality of terms. The computing device receives user definition of one or more rules for a subset of terms in the plurality of terms, each rule specifying respective criteria to match a respective term in the subset (e.g., what is considered to be a "match"). The computing device also receives user specification of a plurality of data visualizations corresponding to the trigger text. Each of the data visualizations uses a respective one or more data fields, from the data source, corresponding to terms from the trigger text. Each of the data visualizations has a respective data visualization type. In some implementations, the data visualization types are: bar chart, Gantt chart, line chart, map, pie chart, scatter plot, tree map, and text table. The computing device generates the first data analysis template according to the trigger text, the user definition, and the user specification.

In some implementations, the user definition of one or more rules includes user designation of a first term in the subset as an optional term and one or more second terms in the subset as required terms. In some implementations, the user definition further comprises user designation of one or more constraints on the one or more second terms. Each constraint specifies a respective limited set of values that are designated as matching a respective one of the second terms. In some implementations, the one or more second terms include one or more fixed terms (e.g., a literal string, such as "sales", where a match has to be exact). In some implementations, the one or more second terms include one or more variable terms. A "variable" term is also referred to as a parameterized term, and can take on a range of values for matching.

In some implementations, the one or more variable terms include (i) a variable dimension expression that is limited to being replaced by dimension data fields from the data source, (ii) a variable field expression that is limited to being replaced by a specific subset of data fields from the data source, (iii) a variable superlative expression that is limited to being replaced by a superlative adjective and a data field from the data source, and/or (iv) a variable measure expression that is limited to being replaced by a measure data field from the data source.

In some implementations, the computing device receives user identification of one or more additional data sources for which the first data analysis template is designated.

In some implementations, the user specification of the plurality of data visualizations includes specifying the order in which the plurality of data visualizations are to be displayed.

In some implementations, the first natural language input is received via an input box of the graphical user interface.

In some implementations, after generating the first data analysis template, the computing device receives user submission of the first natural language input. In response to the user submission, the computing device generates and displays a first dashboard. The first dashboard corresponds to the first data analysis template. The dashboard displays the plurality of data visualizations.

In some implementations, the computing device displays, in the graphical user interface, a visualization customization region. The visualization customization region includes the plurality of data visualizations. The visualization customization region also includes, for each of the data visualizations, a respective plurality of phrases that define the respective data visualization. In some implementations, the plurality of phrases for a first data visualization includes a first phrase that identifies a first term in the subset. In some implementations, the plurality of phrases for a first data visualization includes a first phrase that identifies a data field, from the data source, that is not included in the first natural language input.

In accordance with some implementations, a computing device includes one or more processors, memory, and a display. The memory stores one or more programs configured for execution by the one or more processors. The one or more programs include instructions for performing any of the methods described herein.

In accordance with some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily interact with data visualizations and manipulate dashboard results without having to build a new dashboard from scratch.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings, in which like reference numerals refer to corresponding parts throughout the figures.

FIGS. 2A-2D are block diagrams of a computing device according to some implementations.

FIGS. 5A-5J provide a series of screen shots for generating a data analysis template according to some implementations.

FIGS. 6A-6I provide a series of screen shots for generating a data analysis template according to some implementations.

FIGS. 7A-7C provide source code for some technical implementation details, in accordance with some implementations.

FIGS. 8A-8F provide a series of screen shots showing how saved data analysis templates are applied to natural language input, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by defining user-customized mappings between natural language expressions (e.g., a business question) with a custom set of visualizations. Such methods and devices improve user interaction with the natural language interface by providing flexible and quicker dashboard results without requiring the user to build a new dashboard from scratch.

Figure 1:
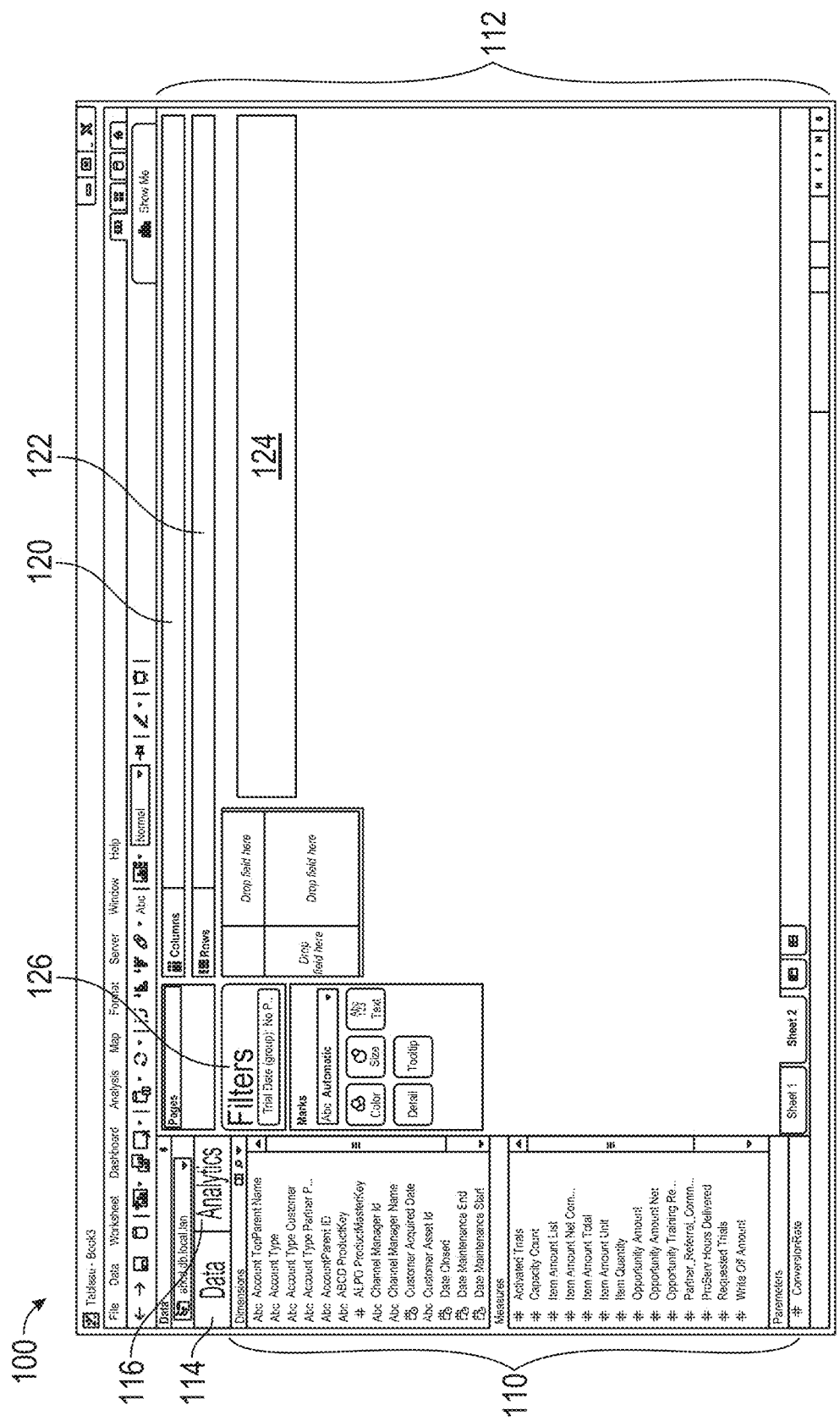
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a filters region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
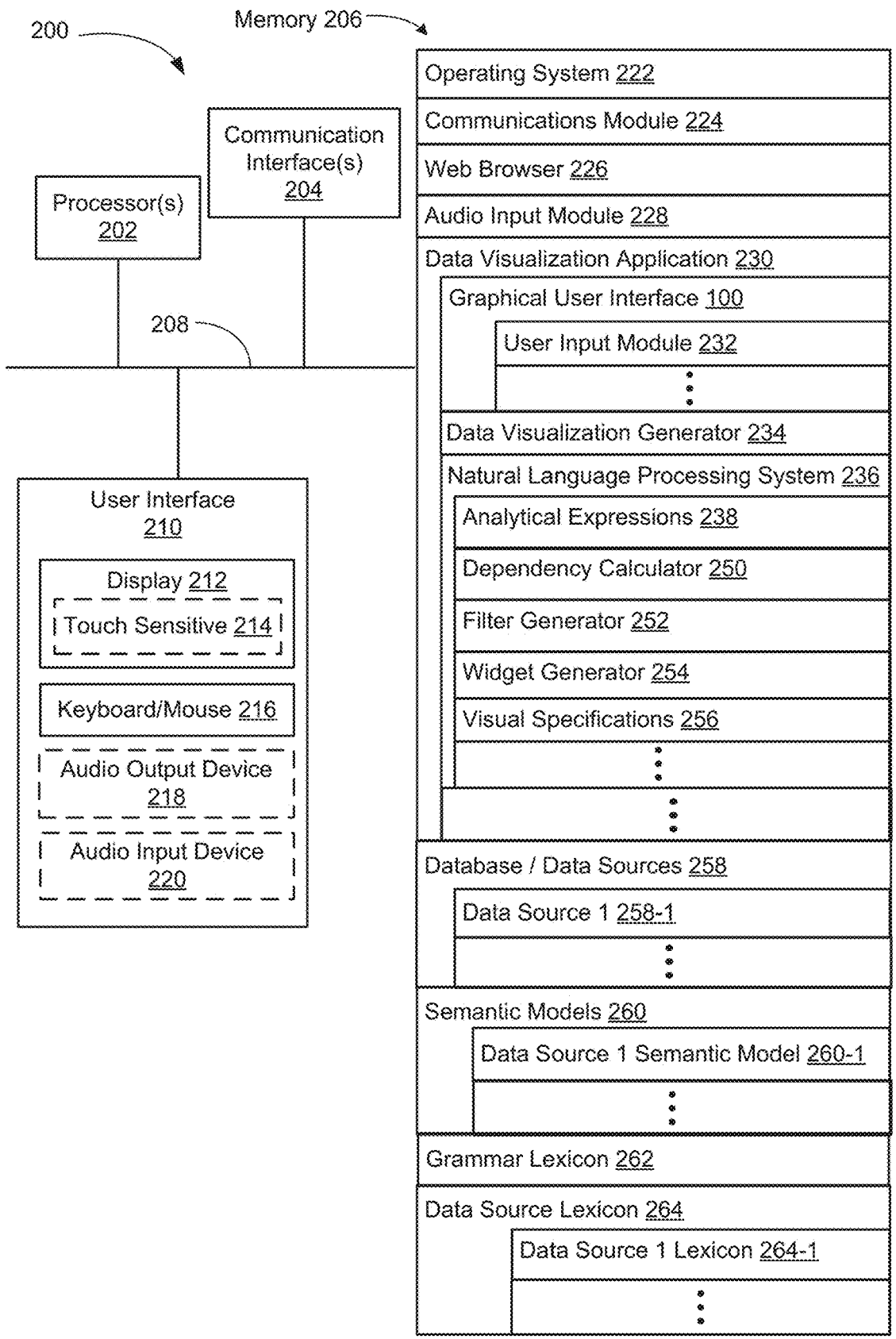

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

an operating system 222, which includes procedures for handling various basic system services and for performing hardware dependent tasks;

a communications module 224, which is used for connecting the computing device 200 to other computers and devices via the one or more communication interfaces 204 (wired or wireless), such as the Internet, other wide area networks, local area networks, metropolitan area networks, and so on;

a web browser 226 (or other application capable of displaying web pages), which enables a user to communicate over a network with remote computers or devices;

an audio input module 228 (e.g., a microphone module) for processing audio captured by the audio input device 220. The captured audio may be sent to a remote server and/or processed by an application executing on the computing device 200 (e.g., the data visualization application 230 or the natural language system 236);

a data visualization application 230, which generates data visualizations and related features. In some implementations, the data visualization application 230 includes:

a graphical user interface 100 for a user to construct visual graphics. In some implementations, the graphical user interface includes a user input module 232 for receiving user input through the natural language box 124. For example, a user inputs a natural language command or expression into the natural language box 124 to identify one or more data sources 258 (which may be stored on the computing device 200 or stored remotely) and/or data fields from the data sources. In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;

a data visualization generator 234, which automatically generates and displays a corresponding visual graphic (also referred to as a "data visualization" or a "data viz") using the user input (e.g., the natural language input);

a natural language system 236, which receives and parses the natural language input provided by the user. The natural language system 236 may identify analytical expressions 238, which are described in FIG. 2B;

the natural language system 236 may also include a dependency calculator 250, which looks up dependencies in a database 258 to determine how particular terms and/or phrases are related (e.g., dependent);

in some implementations, the natural language system 236 includes a filter generator 252, which determines if one or more filters are related to a field that has been modified by a user. The filter generator 252 generates the one or more filters based on user selections;

a widget generator 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field; and visual specifications 256, which are used to define characteristics of a desired data visualization. In some implementations, the information the user provides (e.g., user input) is stored as a visual specification. In some implementations, the visual specifications 256 include previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and zero or more databases or data sources 258 (e.g., a first data source 258-1), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data sources, and uses the selected fields to define a visual graphic;

zero or more semantic models 260 (e.g., a first semantic model 260-1), each of which is derived directly from a respective database or data source 258. The semantic model 260 represents the database schema and contains metadata about attributes. In some implementations, the semantic model 260 also includes metadata of alternative labels or synonyms of the attributes. The semantic model 260 includes data types (e.g., "text," "date," "geospatial," "Boolean," and "numeric"), attributes (e.g., a currency type such as the United States Dollar), and a semantic role (e.g., the "City" role for a geospatial attribute) for data fields of the respective database or data source 258. In some implementations, the semantic model 260 also captures statistical values (e.g., data distribution, range limits, average, and cardinality) for each attribute. In some implementations, the semantic model 260 is augmented with a grammar lexicon 262, which contains a set of analytical concepts 266 found in many query languages (e.g., average, filter, and sort). In some implementations, the semantic model 260 also distinguishes between attributes that are measures (e.g., attributes that can be measured, aggregated, or used for mathematical operations) and dimensions (e.g., fields that cannot be aggregated except by counting). Thus, the semantic model 260 helps with inferencing and choosing salient attributes and values;

a grammar lexicon 262, which includes analytical concepts 266 (see FIG. 2C) that are used to support the analytical expressions 238 for forming intermediate expressions; and zero or more data source lexicons 264 (e.g., a first data source lexicon 264-1), each of which is associated with a respective database or data source 258. Details of the components of a data source lexicon are described in FIG. 2D.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language system 236) to address the problem of proliferation of ambiguous syntactic parses inherent to natural language querying. The canonical structures are unambiguous from the point of view of the parser and the natural language system 236 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

FIG. 2B is block diagram illustrating the analytical expressions 238 of the natural language system 236, in accordance with some implementations. The analytical expressions 238 include:
  aggregation expressions 240. For example, "average Sales" is an aggregate expression that includes an aggregate term "average" and an attribute "Sales." In some implementations, the aggregation expressions 240 are in the canonical form [agg att], where agg∈Aggregations and att is an attribute. An "attribute" is also referred to as a "data field";
  group expressions 242. For example, "by Region" is a group expression that includes a group term "by" and an attribute "Region." In some implementations, the group expressions 242 are in the canonical form [grp att], where grp∈Groups and att is an attribute;
  filter expressions 244. For example, "Customer Name starts with John" is a filter expression that contains an attribute "Customer Name," a filter "starts with," and a value "John." In some implementations, the filter expressions 244 are in the canonical form [att filter val], where att is an attribute, filter∈Filters, and val∈Values;
  limit expressions 246. For example, "top 5 Wineries by sum of Sales" is a limit expression that contains a limit term "top", a value "5", a group by attribute "Wineries," and an aggregation expression "sum of Sales." In some implementations, the limit expressions 246 are in the canonical form [limit val ge ae], where limit∈Limits, val∈Values, ge∈group expressions, and de e aggregation expressions; and sort expressions 248. For example, in "sort Products in ascending order by sum of Profit," the phrase "ascending order" is the sort term, "Products" is the attribute to group by, and "sum of Profit" is the aggregation expression. In some implementations, the sort expressions 248 are in the canonical form [sort ge ae], where sort∈Sorts, ge∈group expressions, and de E aggregation expressions.

FIG. 2C is a block diagram illustrating components of a grammar lexicon 262 according to some implementations. In some implementations, the grammar lexicon comprises analytical concepts 266 that support the formation of analytical expressions 238. The analytical concepts 266 include:
  a field 268 concept, which is a finite set of data fields. Examples of field concepts include "Sales" and "Product Category";
  a value 270 concept, which is a finite set of values for a data field. Examples of value concepts include the value 10,500,000.00 for a Sales data field and the value "Chairs" for a Product Category data field;
  an aggregation 272 concept, which is a finite set of operators that aggregate the values of multiple rows to form a single value based on a mathematical operation. Examples of aggregation concepts include "sum," "average," "median," "count," and "distinct count";
  a group 274 concept, which is a finite set of operators that partition the data into categories. An example of a group concept includes the "by" key value;
  a filter 276 concept, which is a finite set of operators that return a subset of rows from the database. Examples of filter concepts include "filter to," "at least," "between," and "at most";
  a limit 278 concept, which is a finite set of operators (akin to the filters 276) that return a subset of rows from the database, restricting to n rows, where 1≤n≤N, and N is the total number of rows in the domain. Examples of limit concepts include "top" and "bottom"; and
  a sort 280 concept, which is a finite set of operators that arranges data rows in an order. Examples of sort concepts include "ascending," "descending," and "alphabetical."

Figure 2D:
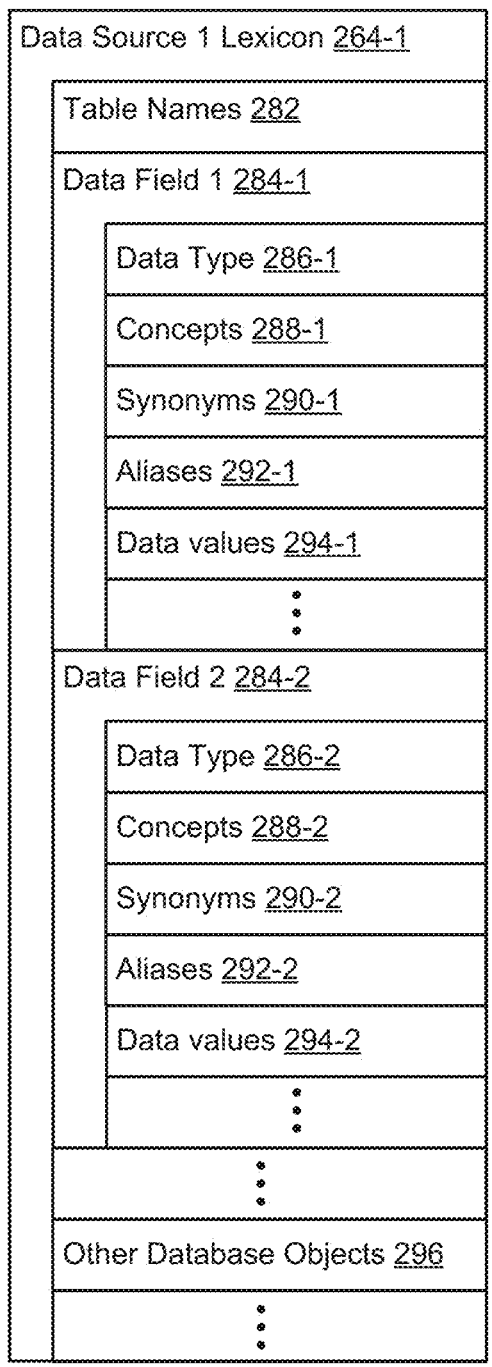

FIG. 2D is a block diagram illustrating components of a first data source lexicon 264-1, in accordance with some implementations. The first data source lexicon 264-1 includes table names 282 corresponding to names of one or more tables of the first data source 258-1, a plurality of data fields 284 of the first data source 258-1, and other database objects 296. Each data field 284 includes:
  a data type 286, such as integer, string, date, or floating point numeric;
  one or more concepts 288 that are used to interpret the data field. For example, a data value "Michael" may be interpreted using the concepts such as a "string," "name," "gender (e.g., male)," "singer," "basketball player," and/or "chef." In some implementations, the one or more concepts are derived from elastic searches;
  one or more synonyms 290, which are defined by the system. For example, a data field "average" may include synonyms such as "mean" and "avg";
  zero or more aliases 292, which are defined by the user. For example, a data field "goods" may include aliases such as "widgets," "bananas," and "my favorite field"; and
  data values 294, which are some or all of the distinct values for a data field. This is particularly useful for low cardinality string data fields. In some instances, the set of stored data values 294 for a data field 284 in a lexicon 264 is limited to data values with threshold usage in the data field 284 (e.g., include a data value 294 in the lexicon when the data value appears in at least a threshold number of rows for the data field 284).

In some implementations, a data source lexicon 264 includes other database objects 296 as well.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, titled "Analyzing Natural Language Expressions in a Data Visualization User Interface, filed Sep. 18, 2018, which is incorporated by reference herein in its entirety.

Figure 3:
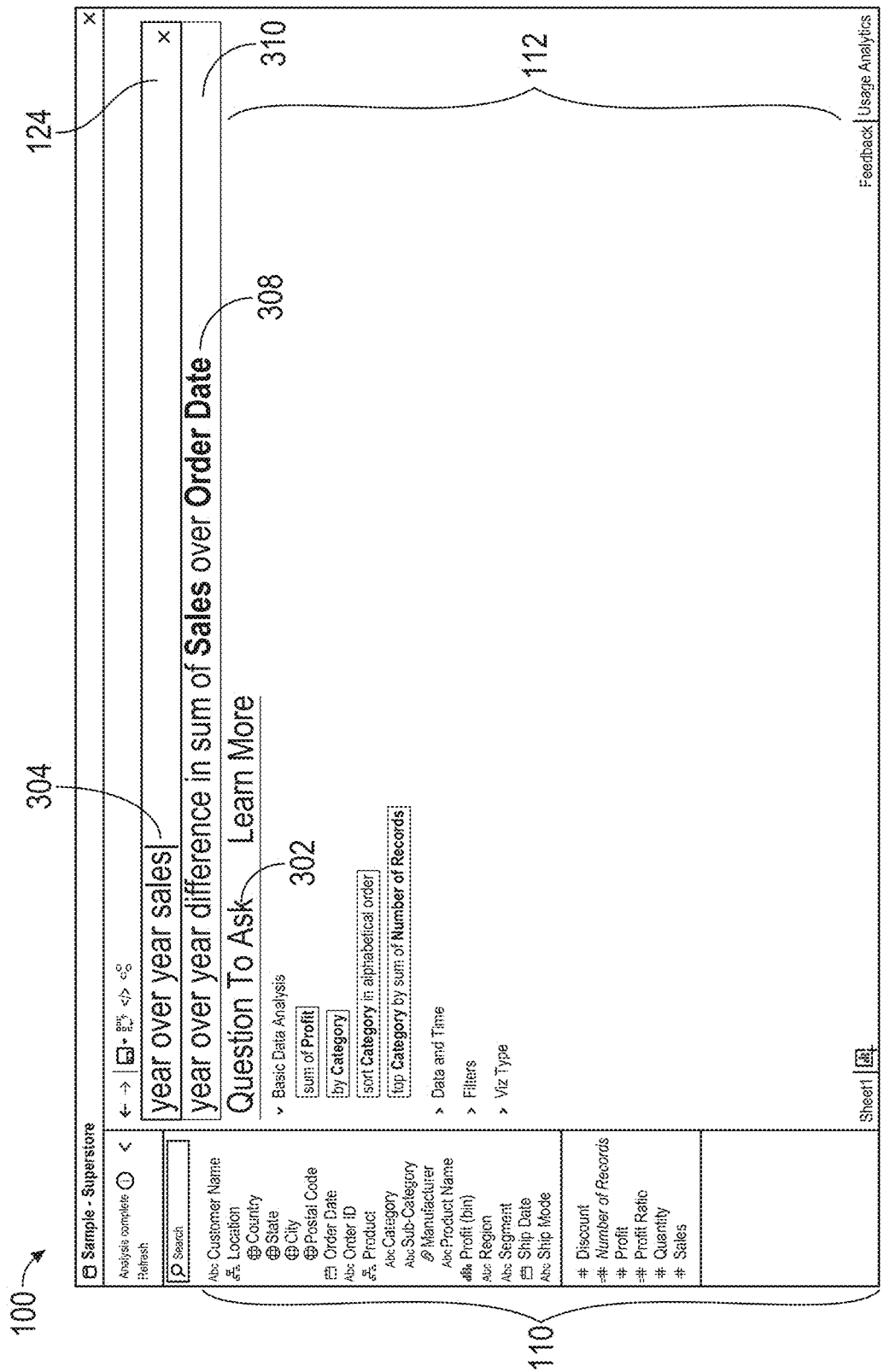
FIG. 3 provides a screenshot for a graphical user interface according to some implementations.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above FIG. 3 is a screen shot of a graphical user interface 100 according to some implementations. In some implementations, as illustrated in FIG. 3, the data visualization region 112 displays suggestions 302 (e.g., tips or pointers) to assist the user in interacting with the data source. Further details about the suggestions 302 are described in U.S. patent application Ser. No. 16/601,437, filed Oct. 14, 2019, entitled "Incremental Updates to Natural Language Expressions in a Data Visualization User Interface," which is incorporated by reference herein in its entirely.

In the example of FIG. 3, a user is interacting with a data source 258. The schema information region 110 provides named data elements (e.g., field names) from the data source 258, which may be selected and used to build a data visualization.

FIG. 3 illustrates a user interaction with the graphical user interface 100. In this example, the user inputs (e.g., enters or types) a natural language expression (e.g., a natural language command) 304 "year over year sales" in the command box 124. The user may also input the natural language expression by speech, which is then captured using an audio input device 220 (e.g. a microphone) coupled to the computing device 200. Typically, the natural language expression includes one or more terms that identify data fields from the data source 258. A term may be a dimension (e.g., categorical data) or a measure (e.g., a numerical quantity). As illustrated by the example, the natural language input typically includes one or more terms that correspond to data fields (e.g., the term "sales" identifies a data field from the data source).

In some implementations, parsing of the natural language expression is triggered in response to the user input. In this example, the natural language command 304 includes the terms "year over year," which specifies a table calculation type.

In response to the natural language command 304, the graphical user interface 100 displays an interpretation 308 (also referred to as a proposed action) in an interpretation box 310. In some implementations, as illustrated in FIG. 3, the field names "Sales" and "Order Date" are displayed in a visually distinctive manner (e.g., in boldface) relative to other words included in the interpretation 308.

Figure 4A:
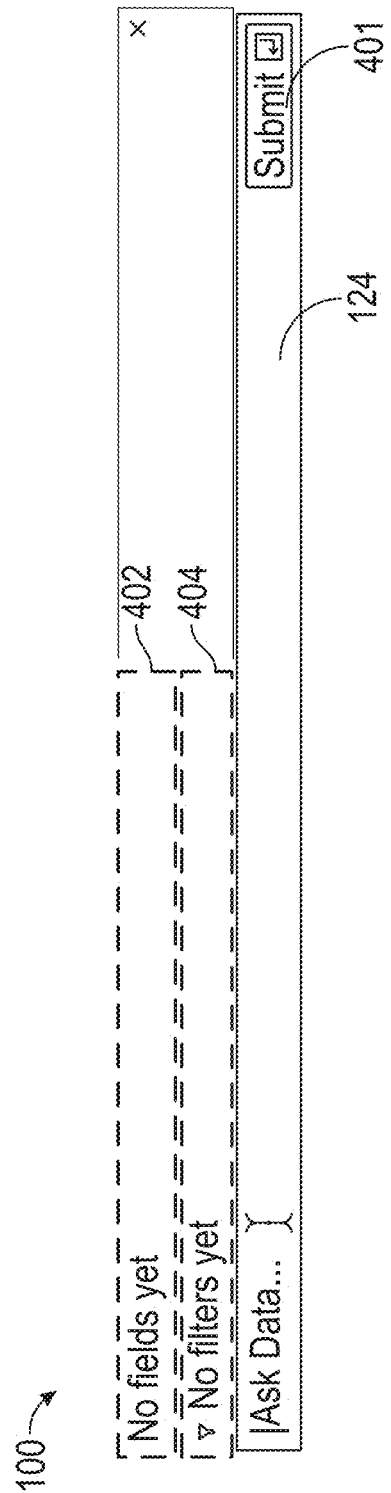
FIGS. 4A and 4B provide a series of screen shots for interactions with a graphical user interface according to some implementations.
Figure 4B:
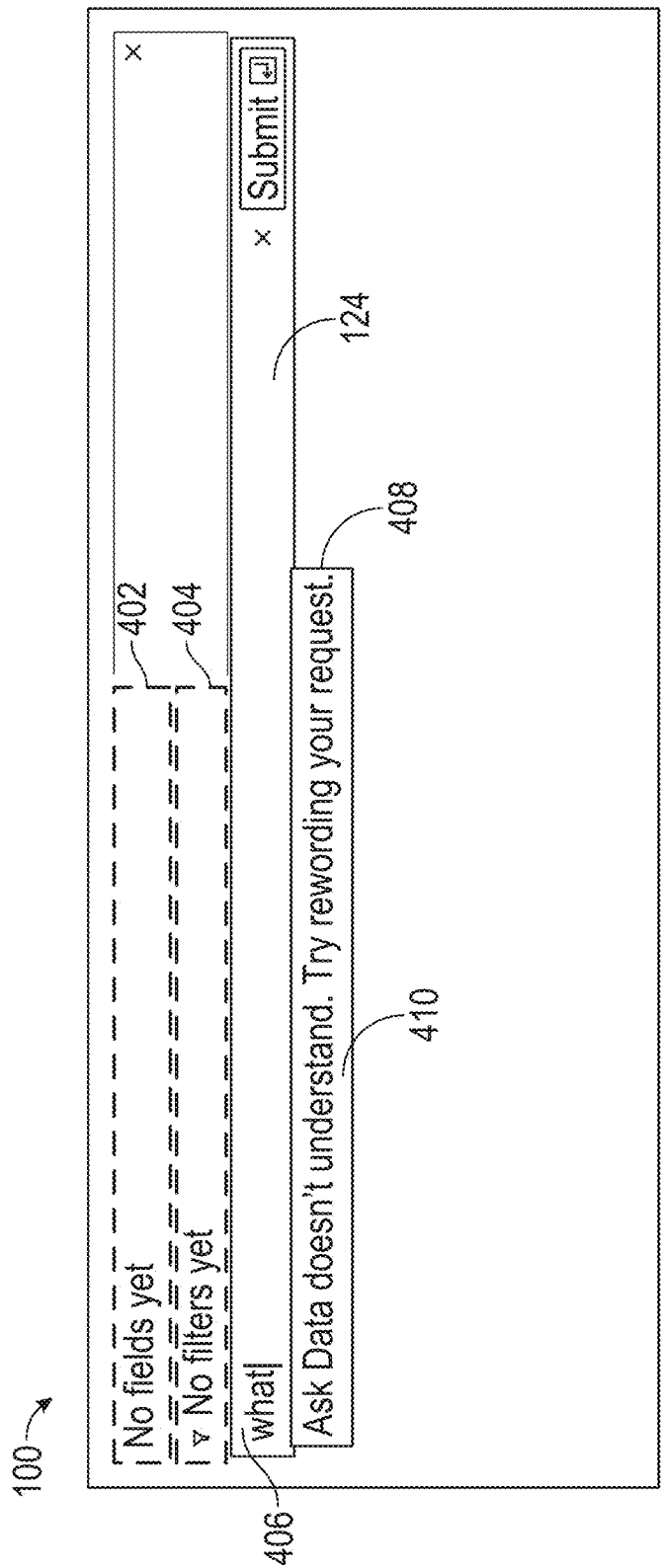

FIGS. 4A and 4B provide a series of screen shots for a graphical user interface 100 according to some implementations.

FIG. 4A provides a screen shot for a partial view of a graphical user interface 100 according to some implementations.

In some implementations, as illustrated in FIG. 4A, the graphical user interface 100 has a natural language input box 124 for receiving natural language commands from a user. The natural language input box 124 includes a graphical control element 401 (e.g., a "Submit" affordance) that, when selected by a user, causes a natural language command in the input box 124 to be transmitted to the computing system 200 (e.g., the natural language system 236) for analysis and/or interpretation. In some implementations, the computing system 200 generates a visualization (e.g., a data visualization) in response to the analysis and/or interpretation and returns the visualization for display in the graphical user interface 100. In this example, the graphical control element 401 is deactivated (e.g., grayed out) because the graphical user interface 100 has yet to receive a natural language command.

In some implementations, the graphical user interface 100 also comprises a data field interpretation region 402 and a filter interpretation region 404, which are located adjacent to (e.g., above) the natural language input box 124. The data field interpretation region 402 displays how the natural language system 236 interprets the natural language input from a user in light of the selected data source. The filter interpretation region 404 displays the filters that are applied to data fields of the data source 258 in response to the natural language input from the user. In this example, no interpretation is displayed in the regions 402 and 404 because the graphical user interface 100 has yet to receive a natural language command.

FIG. 4B illustrates a user interaction with the graphical user interface 100. In this example, the user inputs (e.g., enters or types) a partial natural language expression 406 "what" into the command box 124. In general, the expression can be a command, an input, or an utterance that includes partial or incomplete words, phrases, and/or sentences. The user may also input the natural language expression by speech, which is then captured using an audio input device 220 (e.g. a microphone) coupled to the computing device 200. In response to the natural language command 406, the graphical user interface 100 displays a dropdown menu 408 that includes a statement 410 (e.g., "Ask Data does not understand. Try rewording your request.") Typically, a natural language expression includes one or more terms that identify entities (e.g., a data field, a data value of a data field, an analytical operation, and/or a data visualization type) from the data source 258. In this example, the natural language system 236 generates and displays the statement 410 because it is unable to identify an entity of the data source 258 that corresponds to the partial language expression 406.

Figure 5A:
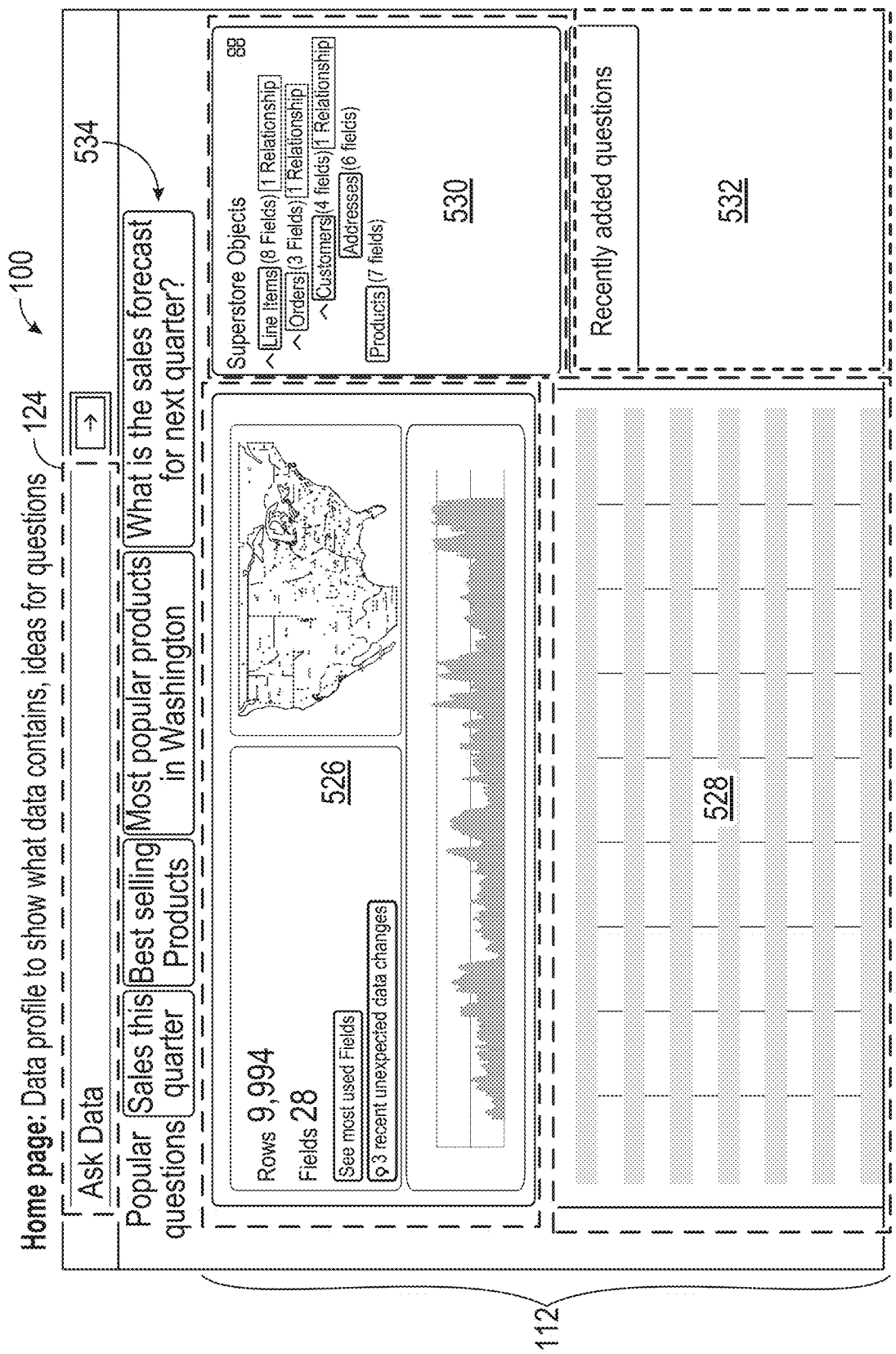

FIGS. 5A-5J provide a series of screenshots for generating a data analysis template in accordance with some implementations. The graphical user interface 100 includes a natural language input box 124 for receiving natural language commands from the user. Below the natural language input box 124 is a data visualization region 112. As illustrated in FIG. 5A, in some implementations, the data visualization region 112 depicts a graphic even when the user has not input anything into the natural language input box 124. In the example of 5A, the natural language input box displays a first graphic 526 with a count of data rows (e.g. 9,994) and a count of data fields. In some implementations, the data visualization region 112 has four sub-regions. In some implementations, the first sub-region 526 includes counts of data rows and data fields, along with some sample data visualizations. In some implementations, the data visualization region 112 further includes a second sub-region 528, which displays a data grid. In some implementations, a third sub-region 530 includes an object listing from the data source. In this example, the Superstore data source has five objects (e.g., tables): LineItems, Orders, Customers, Addresses, and Products. The hierarchical display shows the relationships between the objects. In some implementations, a fourth sub-region 532 displays recently added questions (by the user or other users). In some implementations, a list of popular questions 534 appears above the data visualization region 112 (e.g. "Sales this quarter").

Figure 5B:
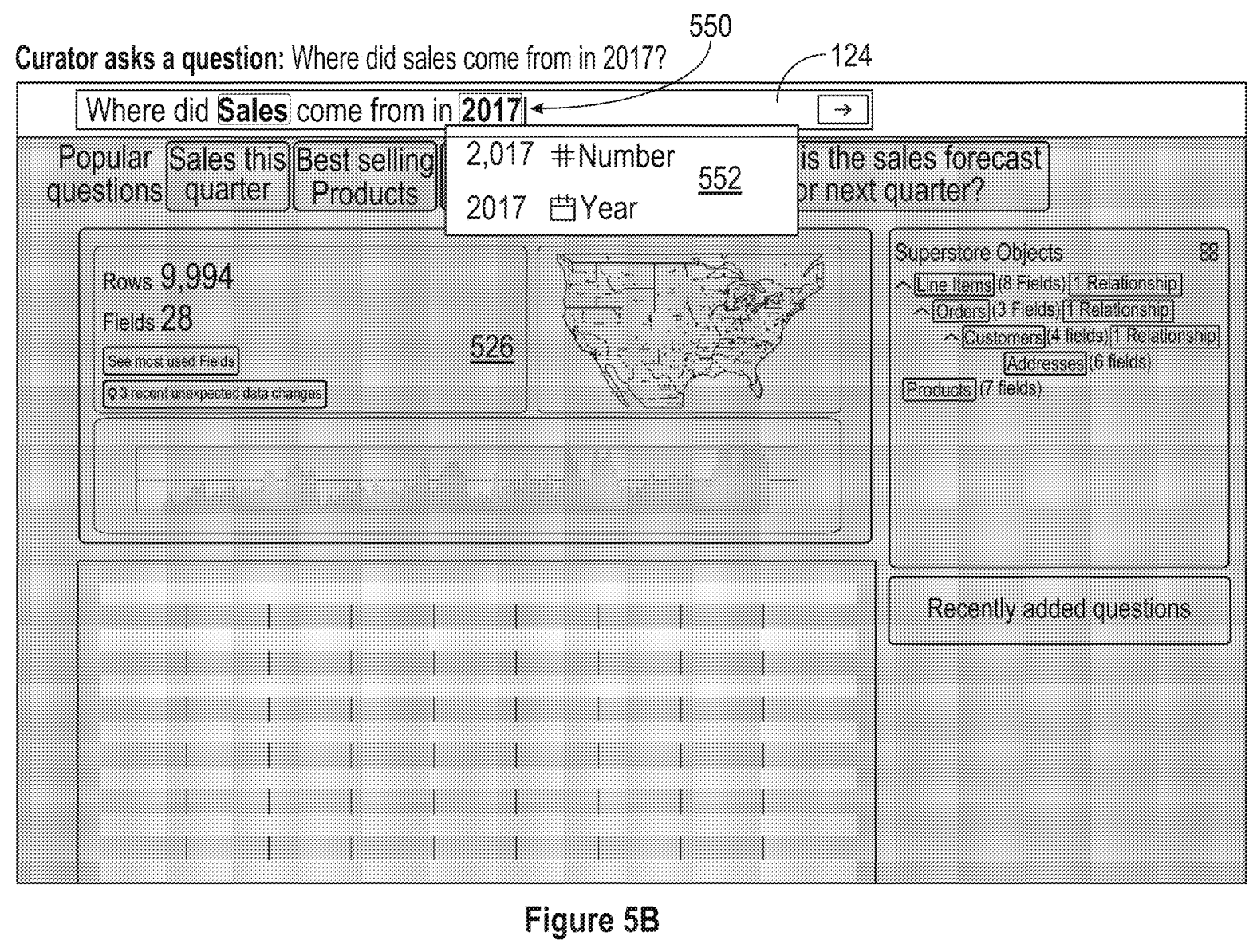

As illustrated in FIG. 5B, a curator starts a process to build a data analysis template. The curator begins by entering a natural language expression 550 into the natural language input box 124. As illustrated, the popup window 552 indicates that "2017" could be interpreted as a number or as a year. In this case, the curator indicates that 2017 is a year.

Figure 5C:
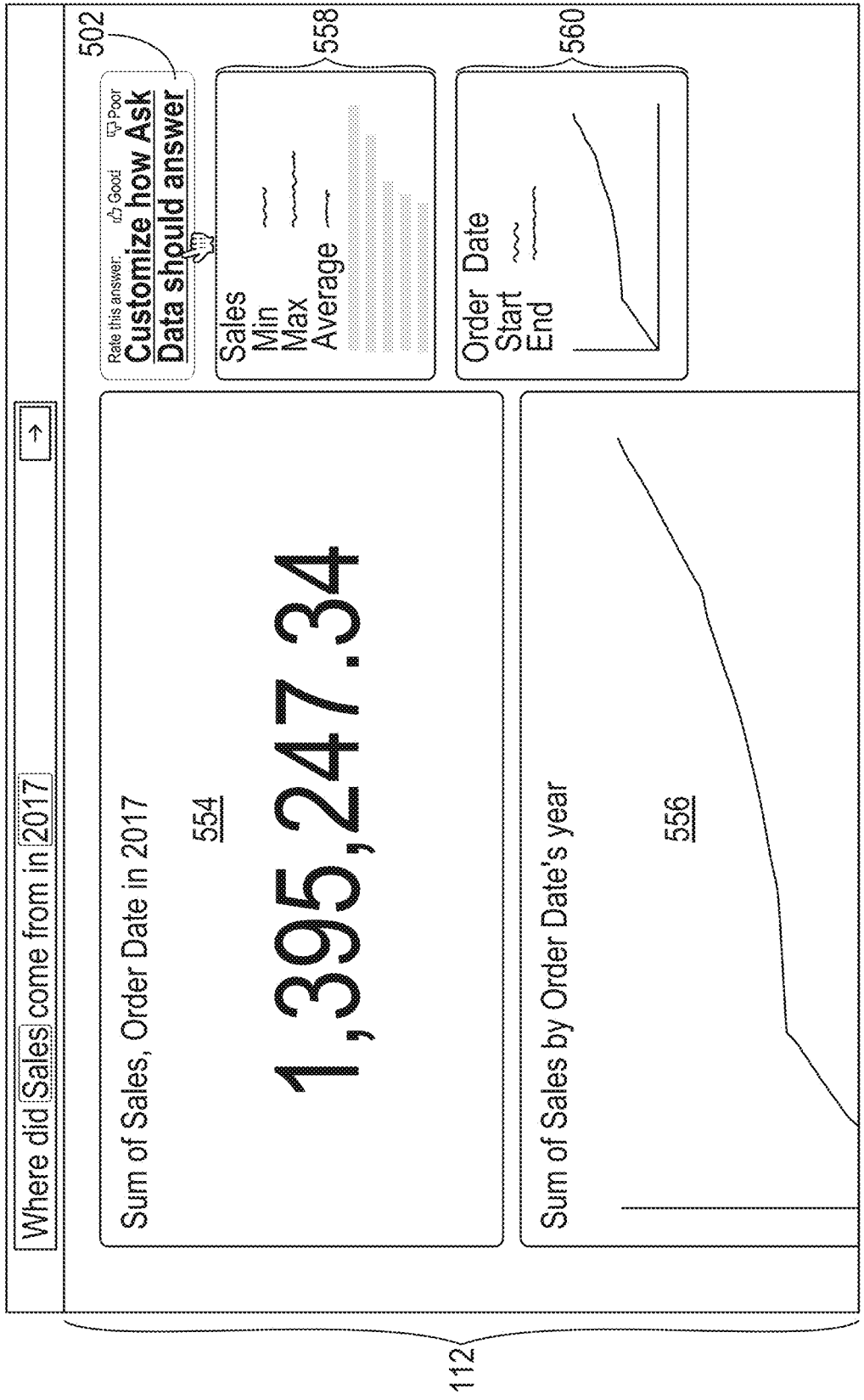

As shown in FIG. 5C, the computing device parses the natural language input 550 into individual terms or tokens, including one or more keywords, and generates a dashboard with two data visualizations: a simple text table 554 with a single data value indicating the total sales in 2017; and a line graph 556 showing sales by year, with a range of years including 2017. Because "Sales" and "Order Date" are data fields needed for the data visualizations, the user interface also displays metadata about these two data fields. The metadata 558 for the Sales data field includes the minimum value, the maximum value, and the average value for data values of the data field. The metadata 558 also includes a histogram showing the distribution of data values. For the Order Date data field, the metadata 560 shows the high and low order dates, and a line graph showing the distribution of the Order Date. In some implementations, histograms are used for showing the distributions of date fields and numeric fields (e.g., using binning).

Figure 5D:
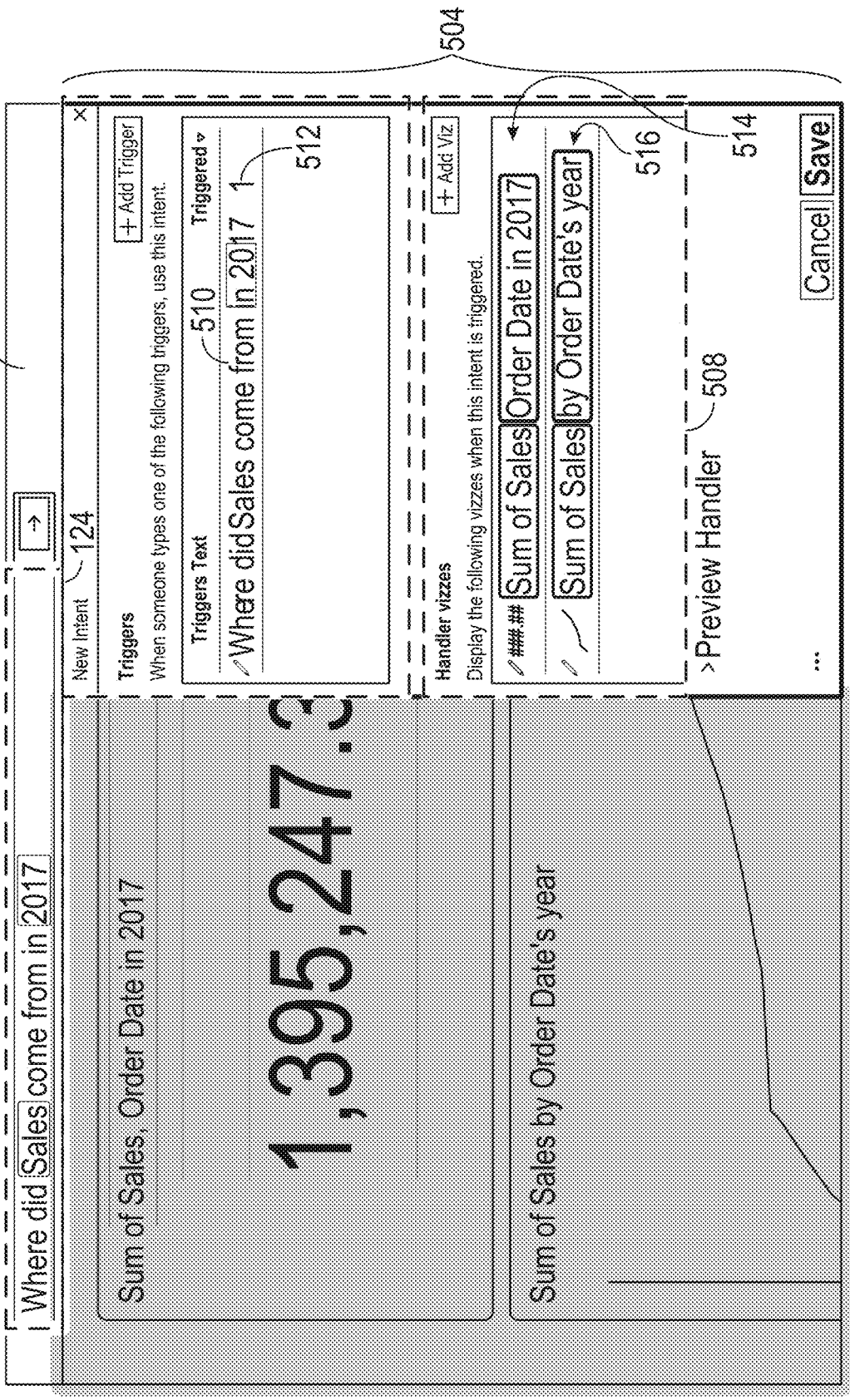

After selecting the affordance 502, the interface opens a "new intent" region 504. As illustrated in FIG. 5D, the new intent region 504 contains two sub-regions: a trigger region 506 and a visualization definition region 508. User interaction with these two sub-regions allows the user to specify what natural language expressions will use this template and what data visualizations will be displayed when the template is invoked.

The initial trigger text 510 is exactly what the curator entered in the natural language input box 124. In some implementations, the data fields specified in the initial trigger text (e.g., "Sales") are visually emphasized.

The interface also displays a trigger count 512, which indicates how many times this trigger has been invoked. Because this is the first usage, the trigger count is currently 1.

The visualization definition region 508 indicates the data visualizations that will be displayed for this template. The first visualization definition 514 defines a text table that will show a single number representing the total sales in 2017 (see the first visualization 554 in FIG. 5C). The second visualization definition 516 defines a line graph of annual sales, including the annual sales in 2017 and a range of years surrounding 2017 (see the second visualization 556 in FIG. 5C).

Figure 5E:
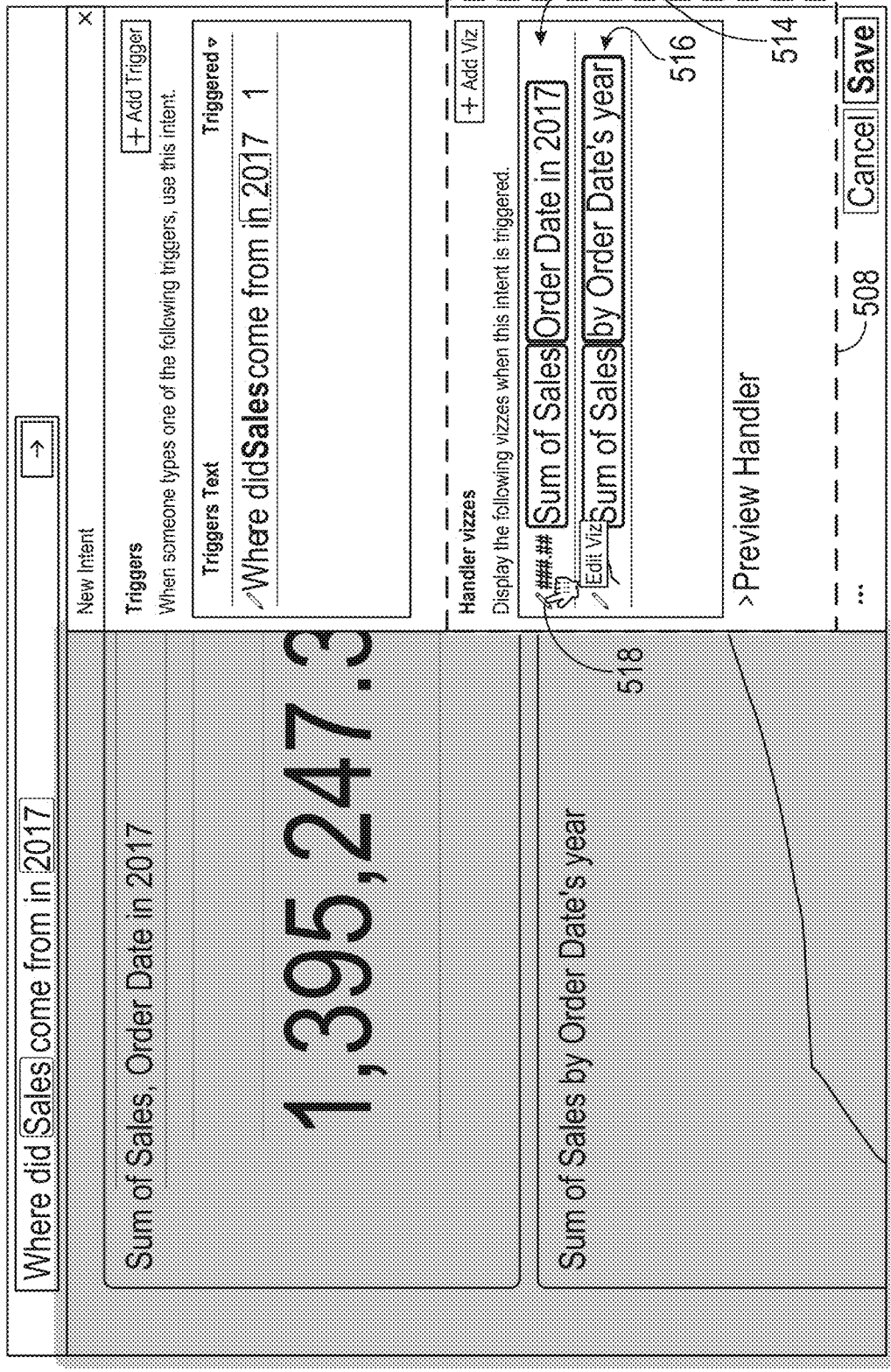

FIG. 5E illustrates the user hovering over the edit affordance 518 for the first visualization definition 514.

Figure 5F:
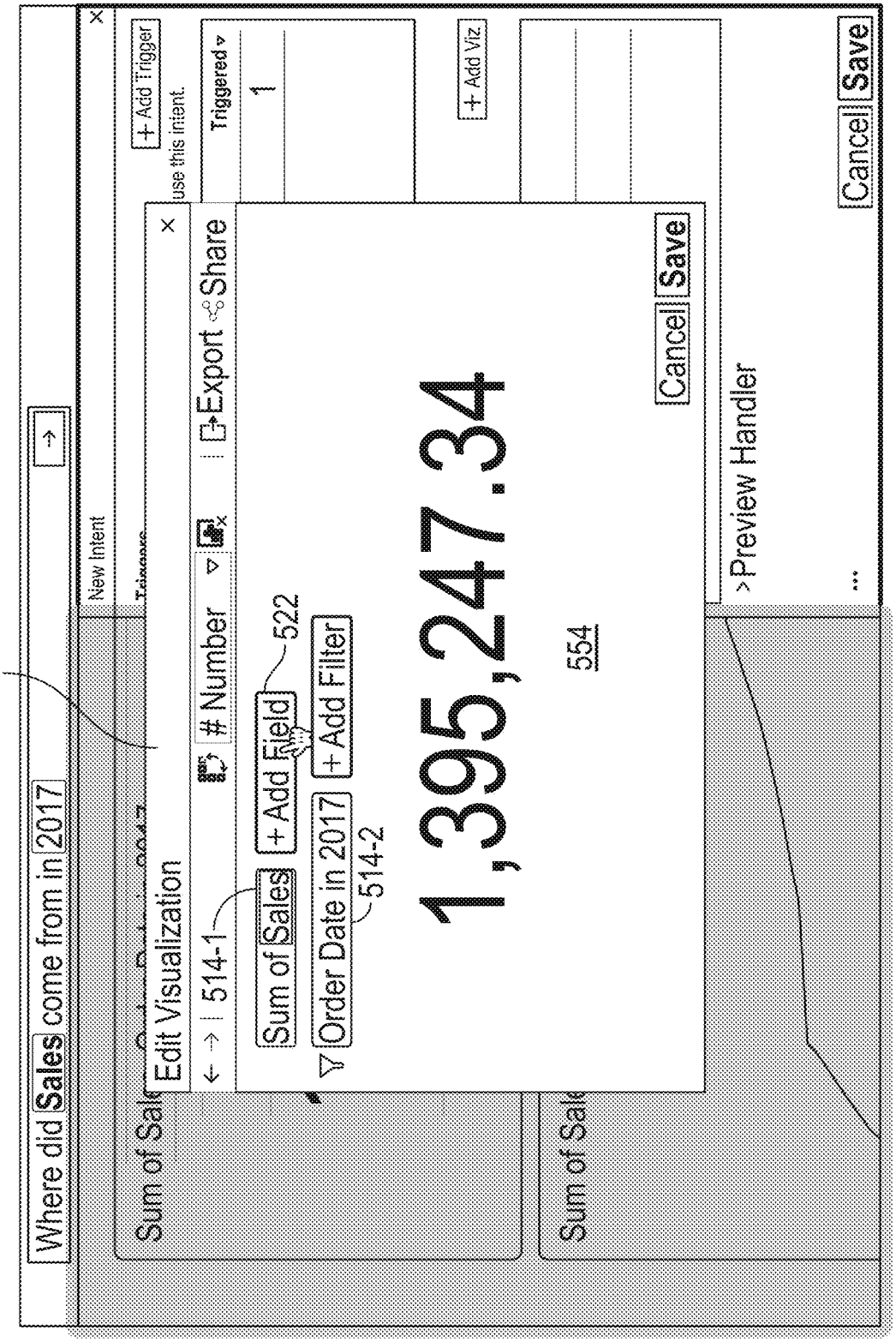
Figure 5G:
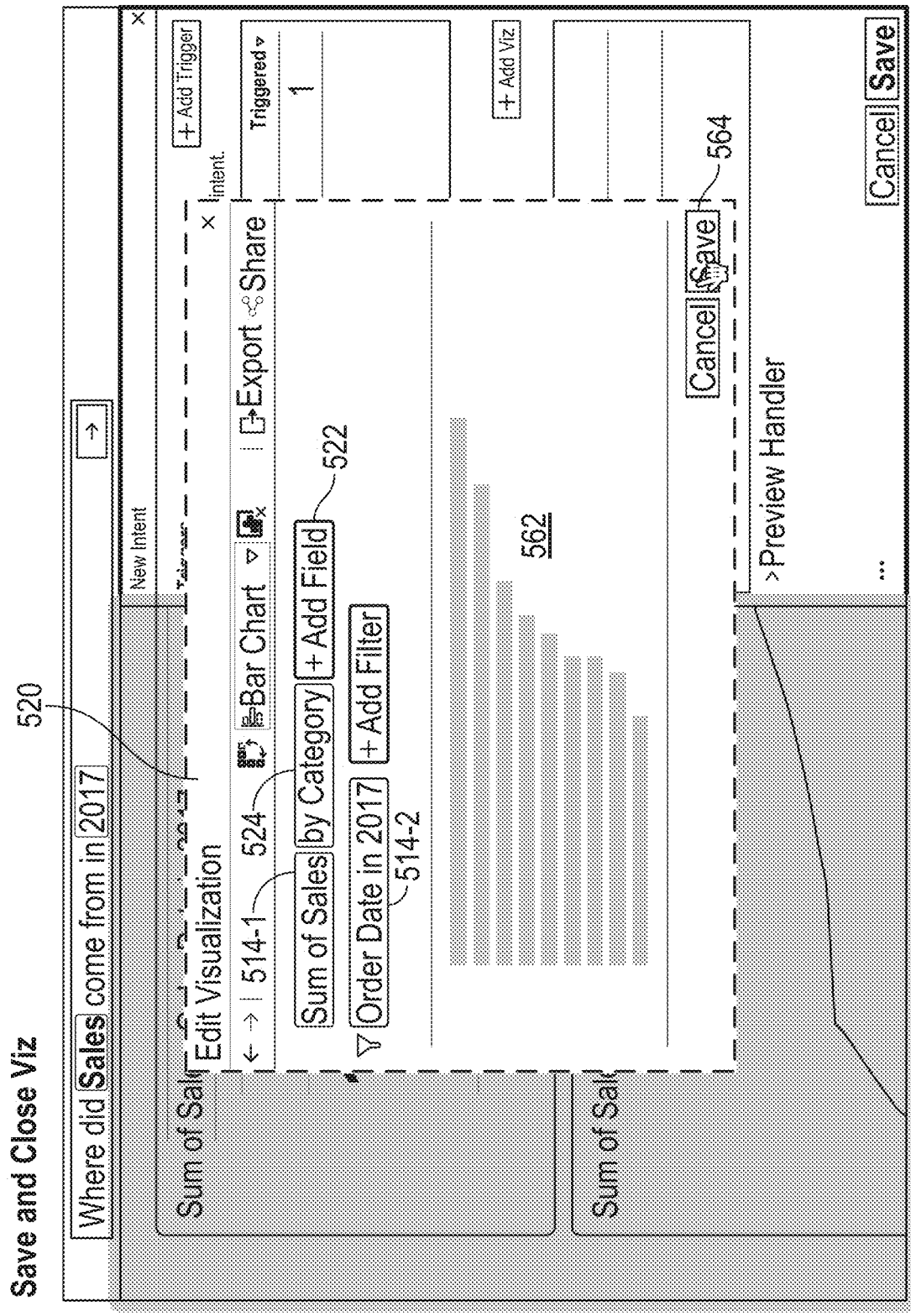

As illustrated in FIG. 5F, after clicking on the affordance 518, the interface displays an edit window 520 for the first visualization definition 514, including the first visualization 554. The first visualization definition 514 is split into two parts 514-1 and 514-2, using the methodology depicted in FIGS. 4A and 4B. In some instances, the curator selects the Add Field button 522. In this example, the curator adds the data field Category as part of a new grouping command "by Category" 524. This is shown in FIG. 5G.

Figure 5H:
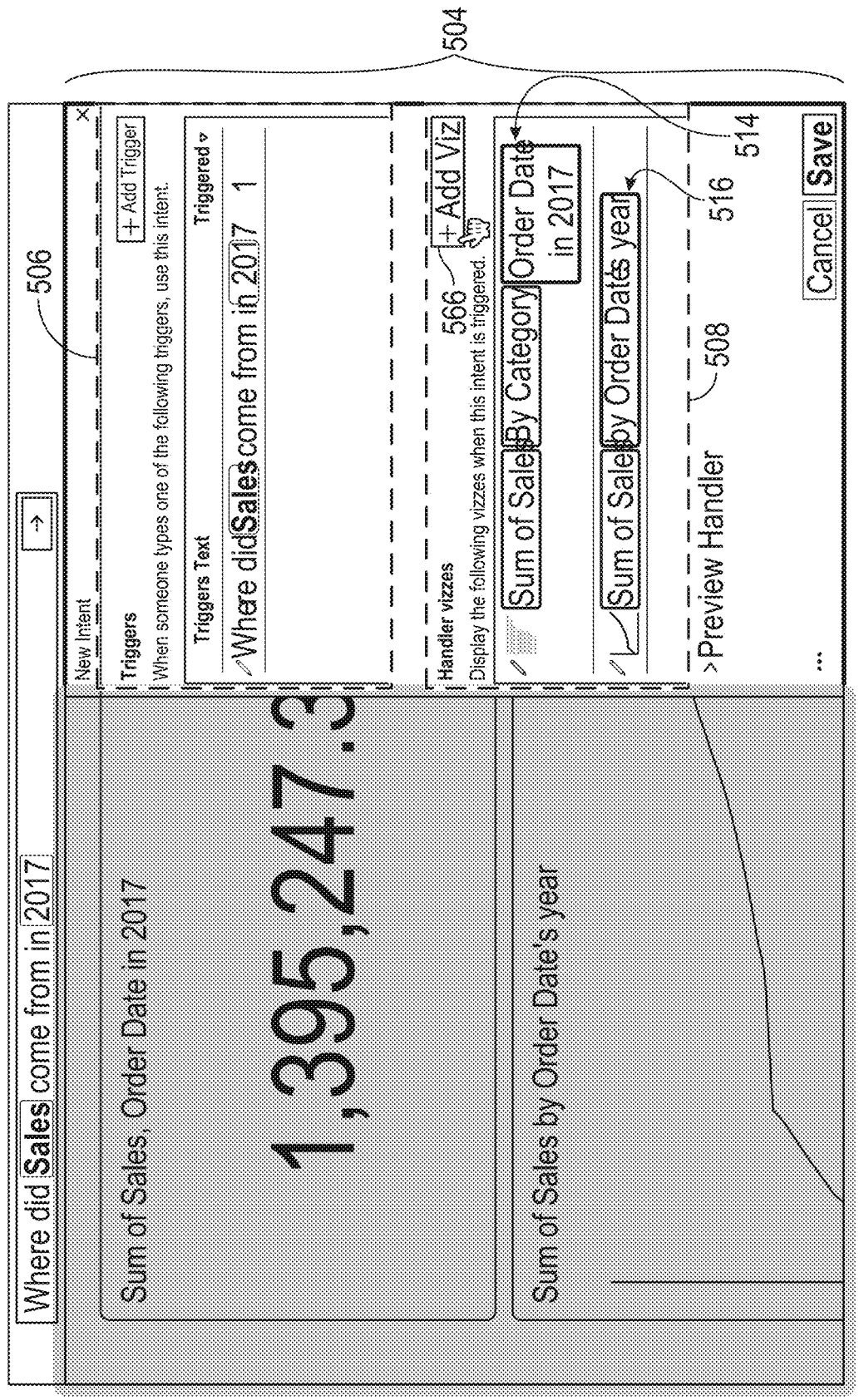

Once this grouping 524 is added, the interface replaces the text table 554 with a bar chart 562, breaking down sales by Category. The curator selects the Save button 564, and the interface updates the visualization definition region 508 to show that the first visualization definition 514 now creates a bar chart with bars representing categories. This is shown in FIG. 5H.

Figure 5I:
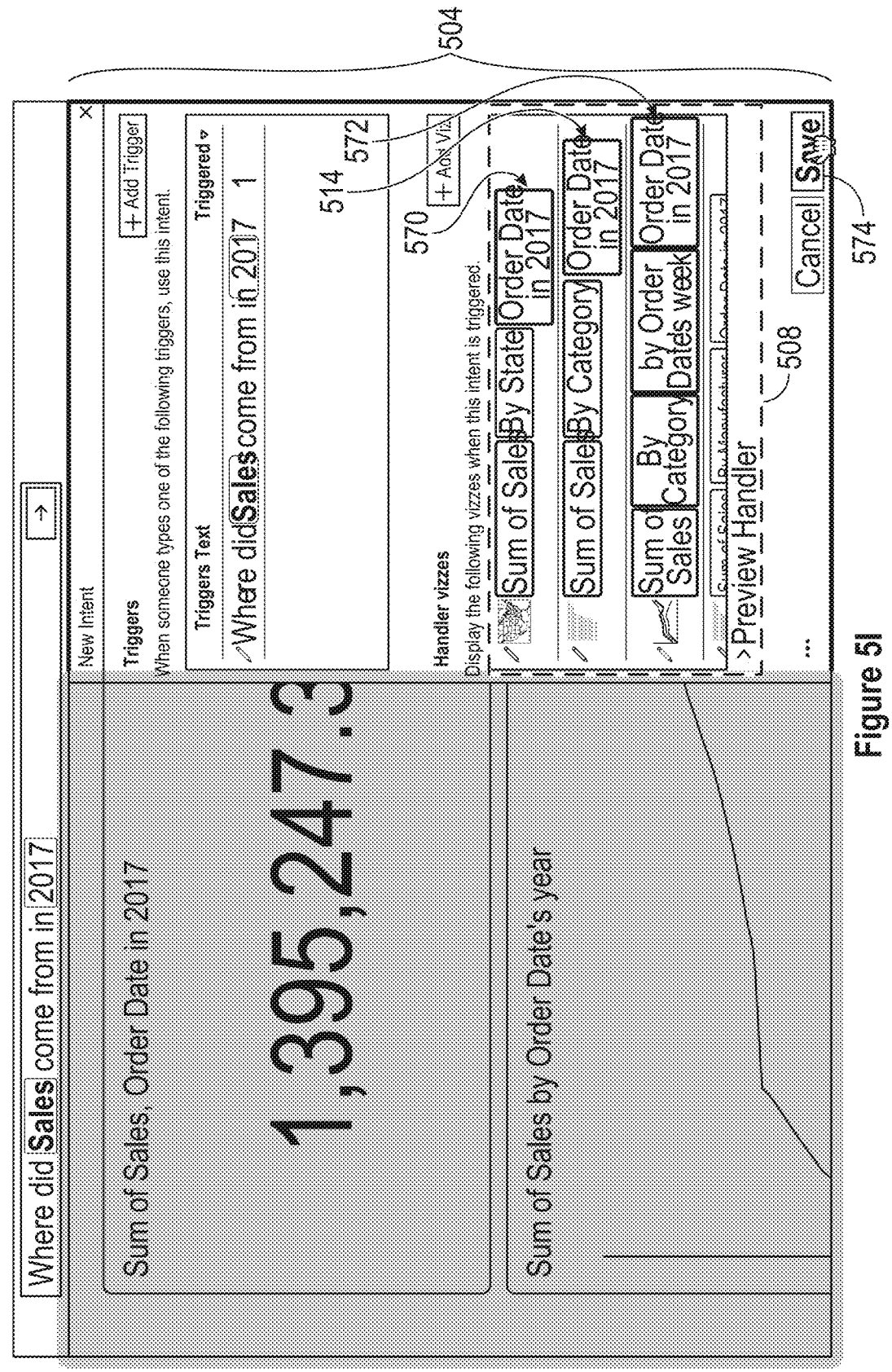

The curator selects the Add Viz button 566 to add additional visualization definitions, and also edits the second visualization definition 516. After these inserts and updates, the visualization definition region 508 includes four or more visualization definitions, including the two new definitions 570 and 572. This is shown in FIG. 5I.

Figure 5J:
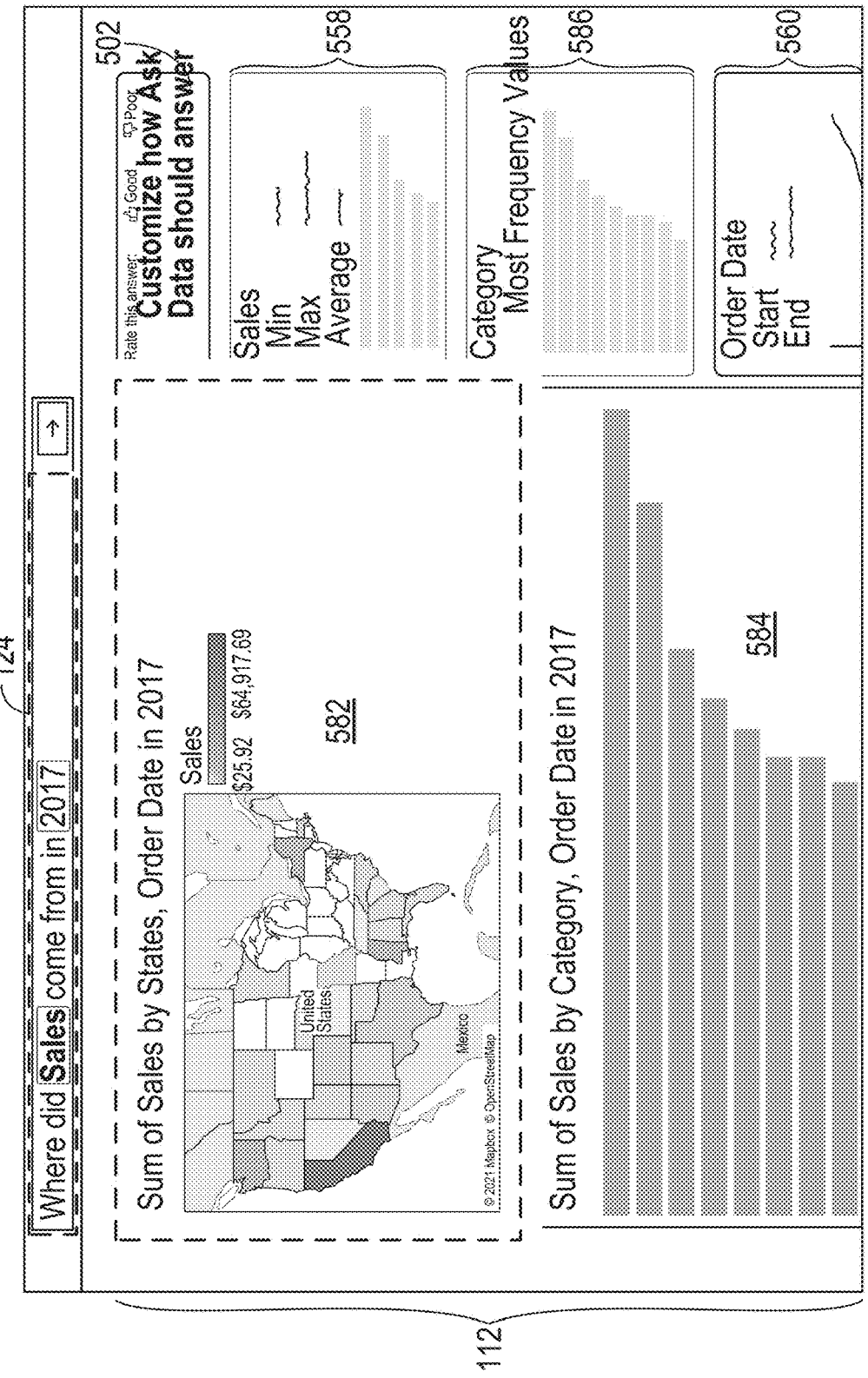

After the user selects the Save button 574 in the new intent region 504, the user interface redisplays the dashboard in the visualization region 112, as shown in FIG. 5J. This includes the new visualizations 582 and 584. Because "Category" is now a data field used by at least one visualization, the interface displays the metadata 586 for the Category data field. Because there are more visualizations than can fit vertically in the visualization region 112, vertical scrolling can be used to see the desired visualizations. Some implementations tile the multiple visualizations on the display (e.g., vertically and horizontally) to reduce the need for scrolling.

Figure 6A:
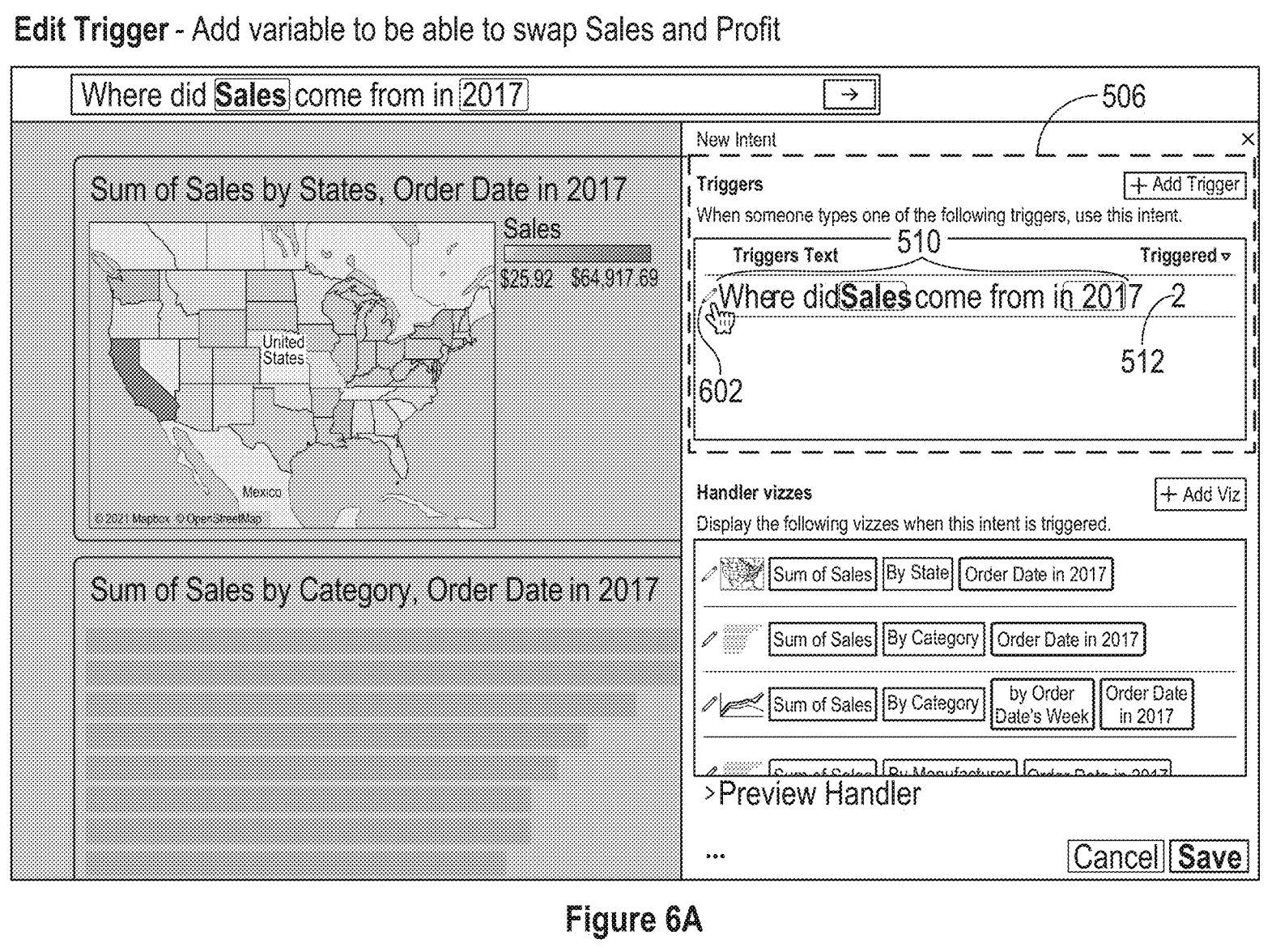
Figure 6B:
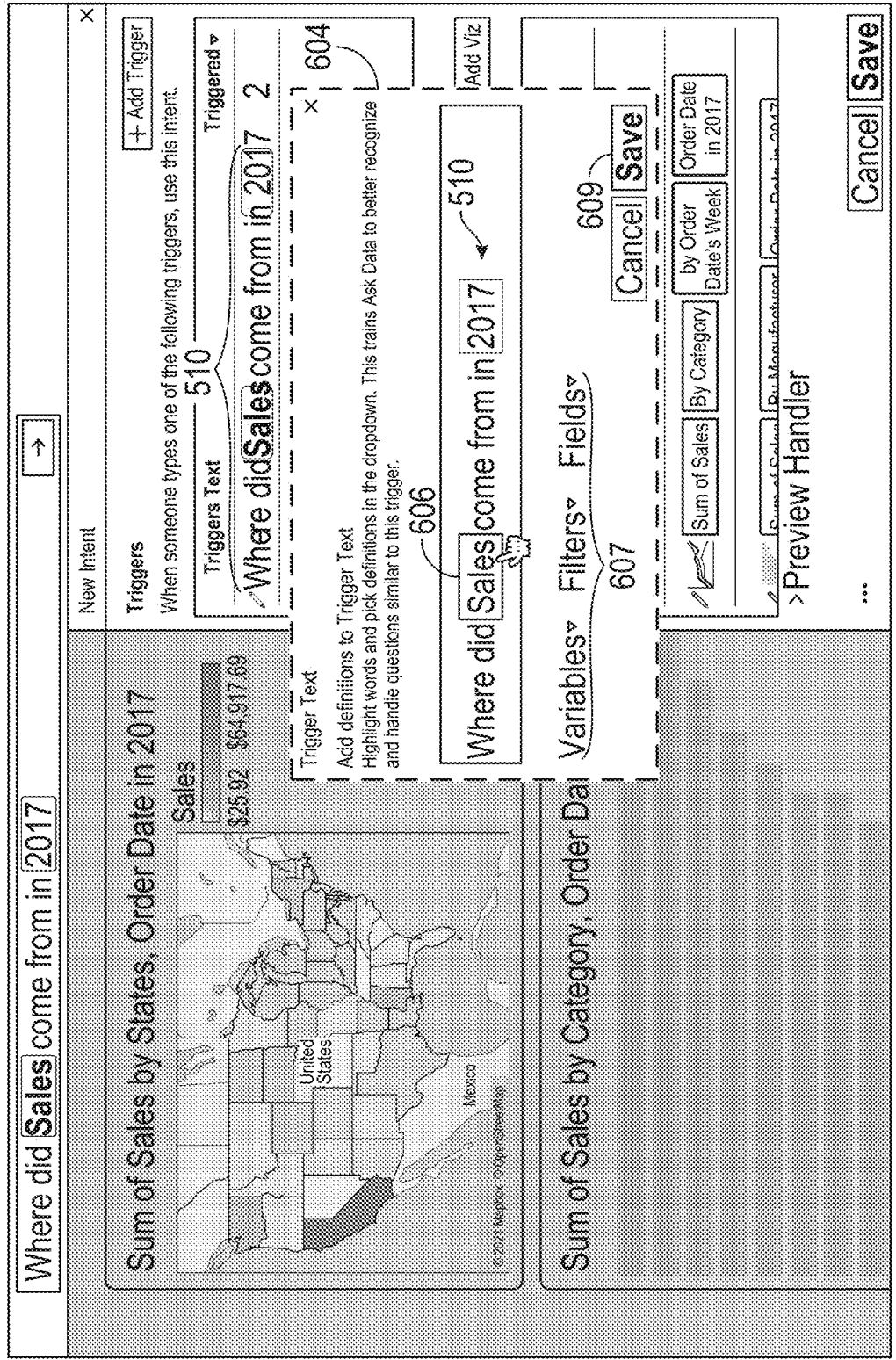

FIGS. 6A-6I provide a series of screenshots to further customize the data analysis template created in FIGS. 5A-5J. As above in FIG. 5D, FIG. 6A is displayed after the user clicks on the "Customize how Ask Data should answer" link 502. The trigger count 512 now shows "2" because this is the second time the template has been triggered. FIG. 6A illustrates the user hovering over the trigger text edit affordance 602 for the data analysis template.

After clicking on the link 602, the interface opens a trigger text definition window 604. As illustrated in FIG. 6B, within the trigger text definition window 604, the user is able to select any portion of the trigger text 510. The window 604 also includes affordances 607 to create or modify variables (also referred to as parameters or variable terms), create or modify filters, and to insert additional fields (e.g., for sorting or grouping). The "Sales" term is a data field. In many cases, the curator will replace a specific data field with a broader collection of data fields so that the template can be applied to more questions. For example, a specific fixed data field can be replaced by (i) a parameter that matches any data field, (ii) a parameter that matches only measure data fields, (iii) a parameter that matches only dimension data fields, or (iv) a parameter that matches a specific set of user-selected data fields.

Figure 6C:
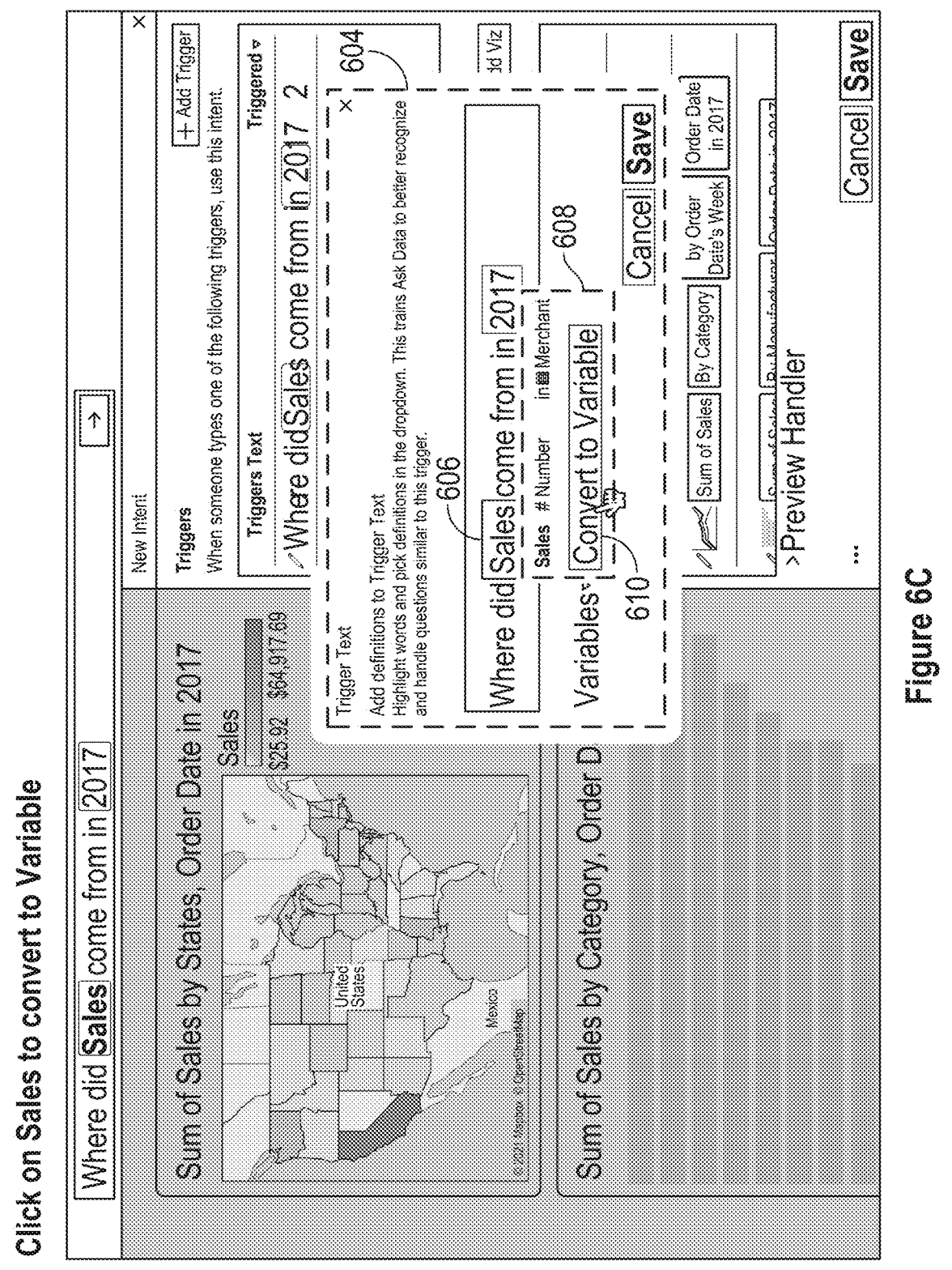

In FIG. 6B, the curator selects the Sales data field 606. This brings up the variable conversion popup 608, as shown in FIG. 6C. The popup 608 indicates that the user selected the data fields "Sales," that this data field is a number, and that this data field is in the Merchant object/table. This popup 608 also includes an affordance 610 to convert the "Sales" term to a variable term. This allows the curator to replace the Sales data field in the trigger text with a parameter (variable). In this example, the user selects the affordance 610.

Figure 6D:
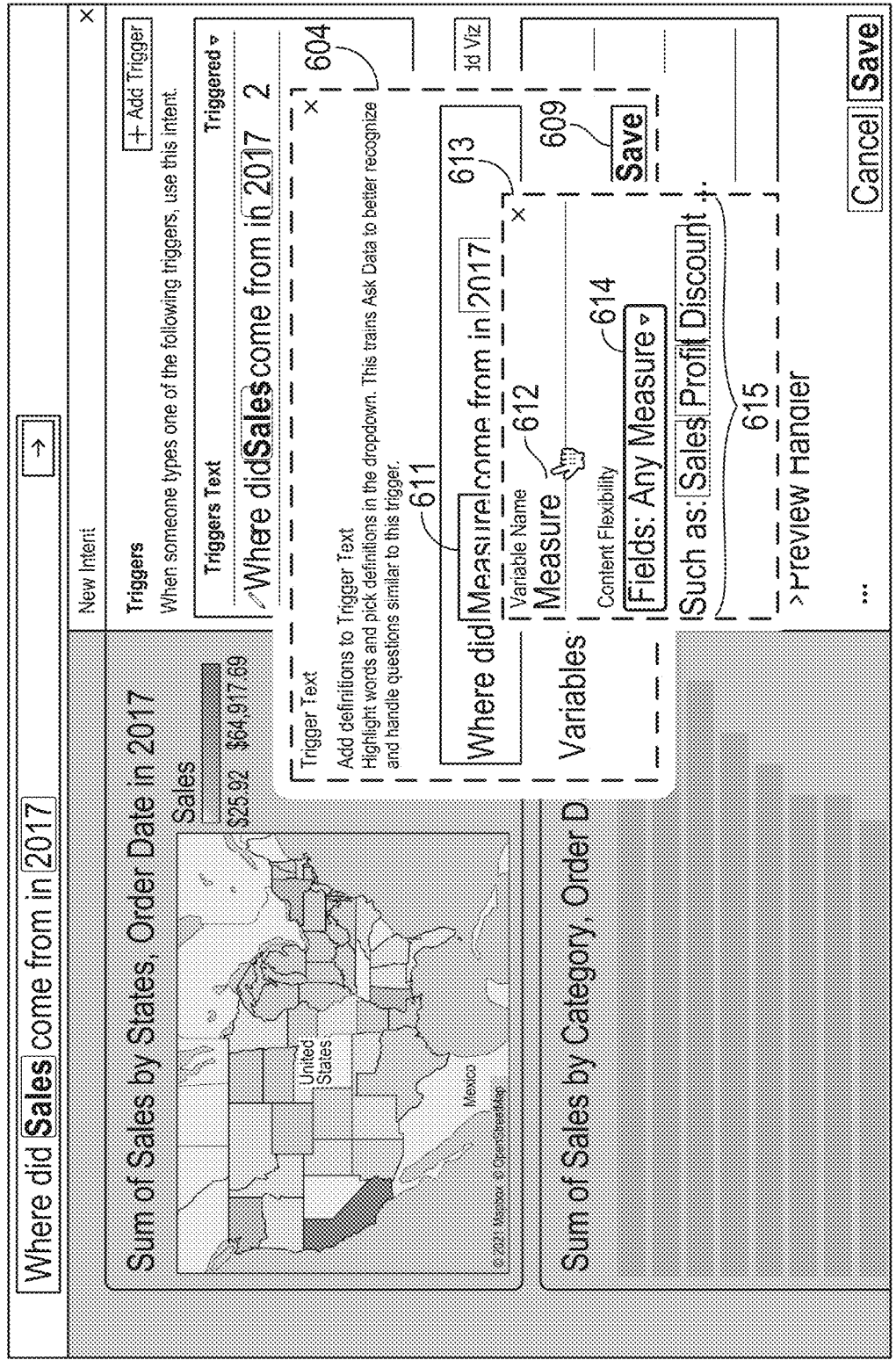

As illustrated in FIG. 6D, the interface displays a variable conversion window 613. The system recognizes that "Sales" is a measure data field, so the default behavior when converting it to a variable term to allow it to represent and measure data field in the data set (or the same object/table). The content flexibility dropdown 614 indicates this with the expression "Fields: Any Measure." Other options are to replace "Sales" with a parameter that is considered to match any data field or to designate a specific set of replacement data fields (i.e., specify what specific data fields are considered matches for this parameter). If the selected data field had been a dimension data field, the default parameter would be one that matches any dimension data field.

The window 613 also lists a set of sample replacement fields 615, for the parameter, from the data set. If some of the sample fields would not be appropriate, the curator may designate just the proper replacements rather than allowing any measure data field.

Note that the concept of "replacement" is being used in two different ways here. First, the curator is replacing the fixed term "Sales" with a parameter (i.e., a variable term). Second, the curator is defining what data fields will be considered a match for the parameter. The data fields that match the parameter definition will "replace" the parameter when subsequent users enter natural language commands that match the template.

The curator can assign a name 612 to the new variable. Because "Sales" is a measure, the default name for the new variable is "Measure." When a template has two or more variable data fields, the curator is more likely to assign meaningful names to distinguish them. The name 612 also appears as the trigger term 611 in the trigger text definition window.

Figure 6E:
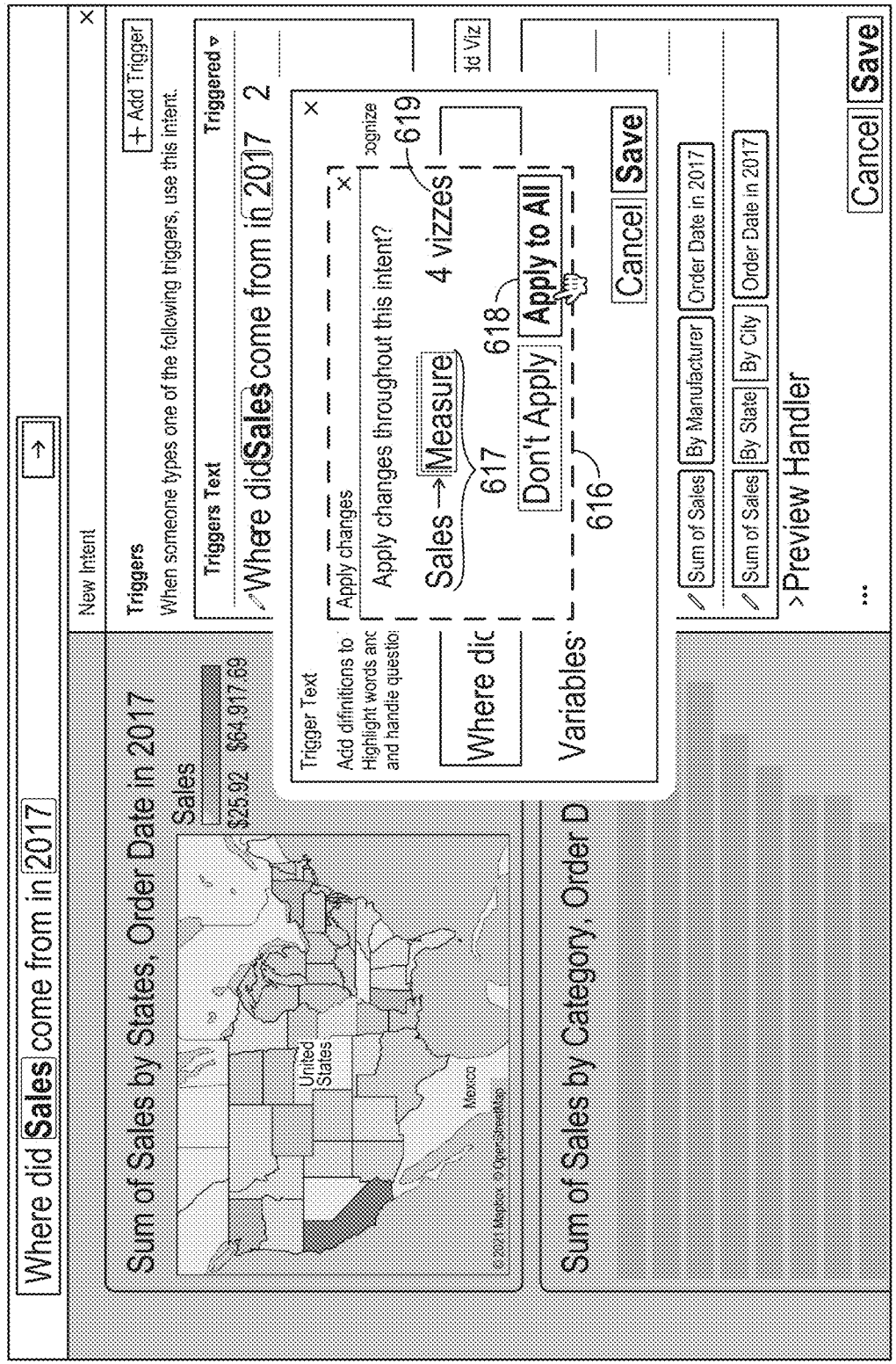

After closing the variable conversion window 613 and selecting the Save affordance 609 in the trigger text definition window 604, the interface displays a confirmation popup 616, as shown in FIG. 6E. The confirmation popup 616 includes a conversion summary 617, showing that the data field "Sales" will be replaced by the parameter "Measure," and indicates the conversion scope 619 (it will apply to four data visualizations). The confirmation popup 616 also includes an affordance 618 (e.g., a button) to confirm the replacement (and an alternative affordance to not apply the replacement).

Figure 6F:
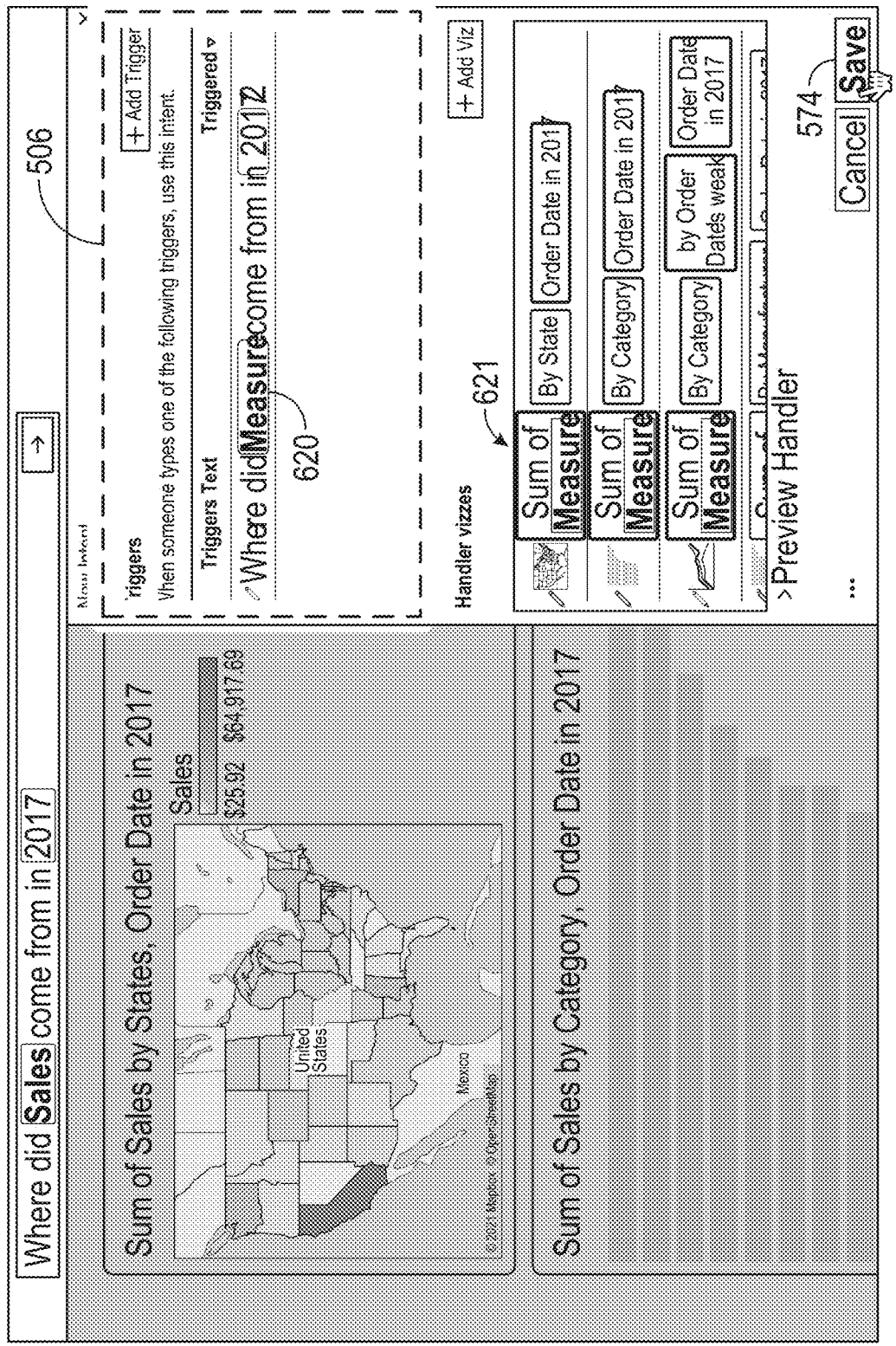

FIG. 6F illustrates that the trigger text 510 has updated to include the user customization. In this example, the fixed term "Sales" has been converted to the term "Measure" 620. In addition, the "Sales" data field has been replaced by the parameter "Measure" in each of the four visualizations, as shown in the column 621. The curator then saves the template changes using the Save affordance 574.

Figure 6G:
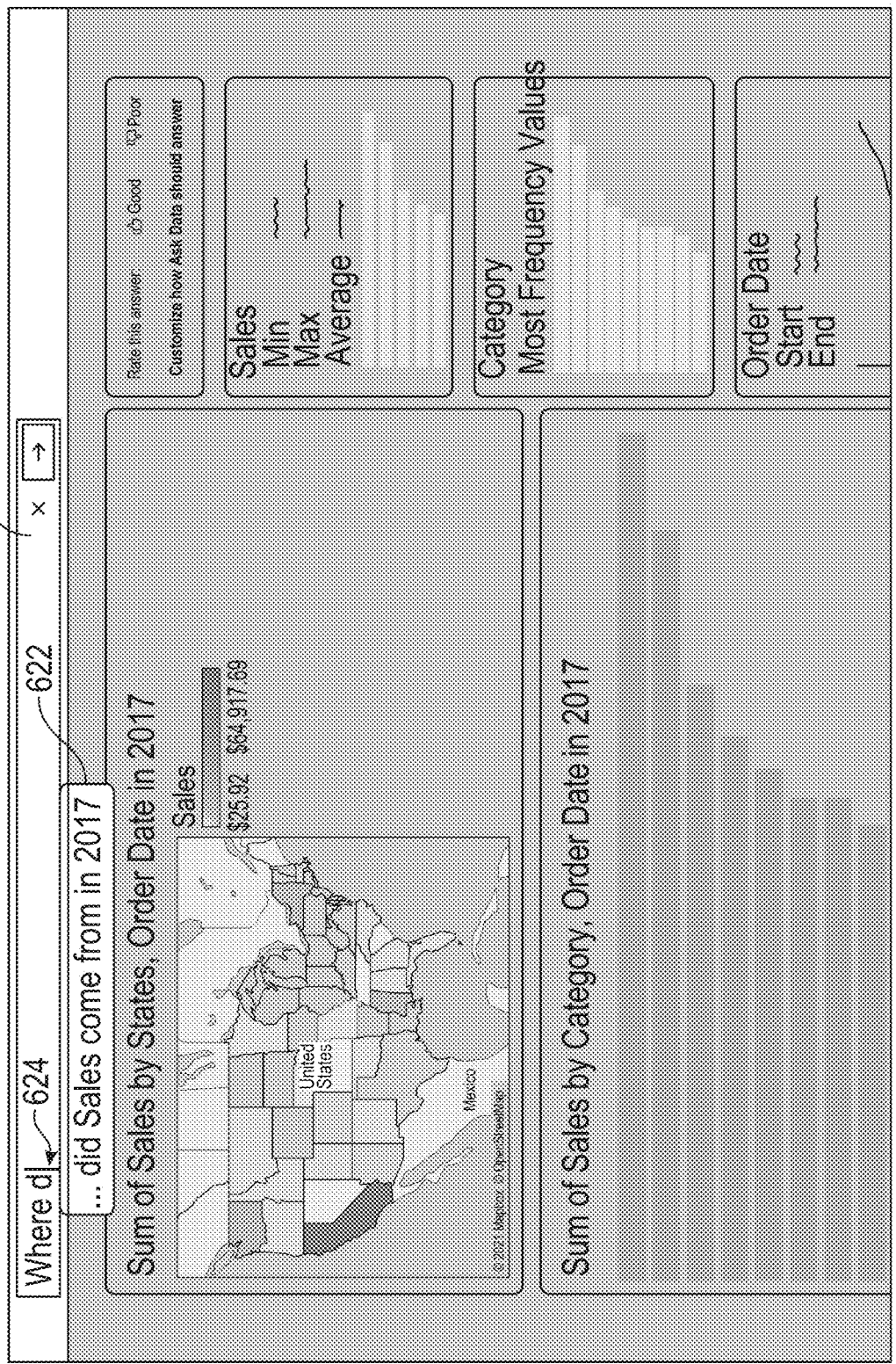

FIG. 6G shows the curator testing the updated template. The curator inputs a partial natural language expression 624 into the natural language input box 124. In response to this input, the graphical user interface 100 displays interpretations in a dropdown menu 622. In some implementations, the interpretation that appears is based on overall popularity.

In response to the curator's input, the dropdown menu 622 displays " . . . did Sales come from in 2017."

Figure 6H:
Figure 6I:
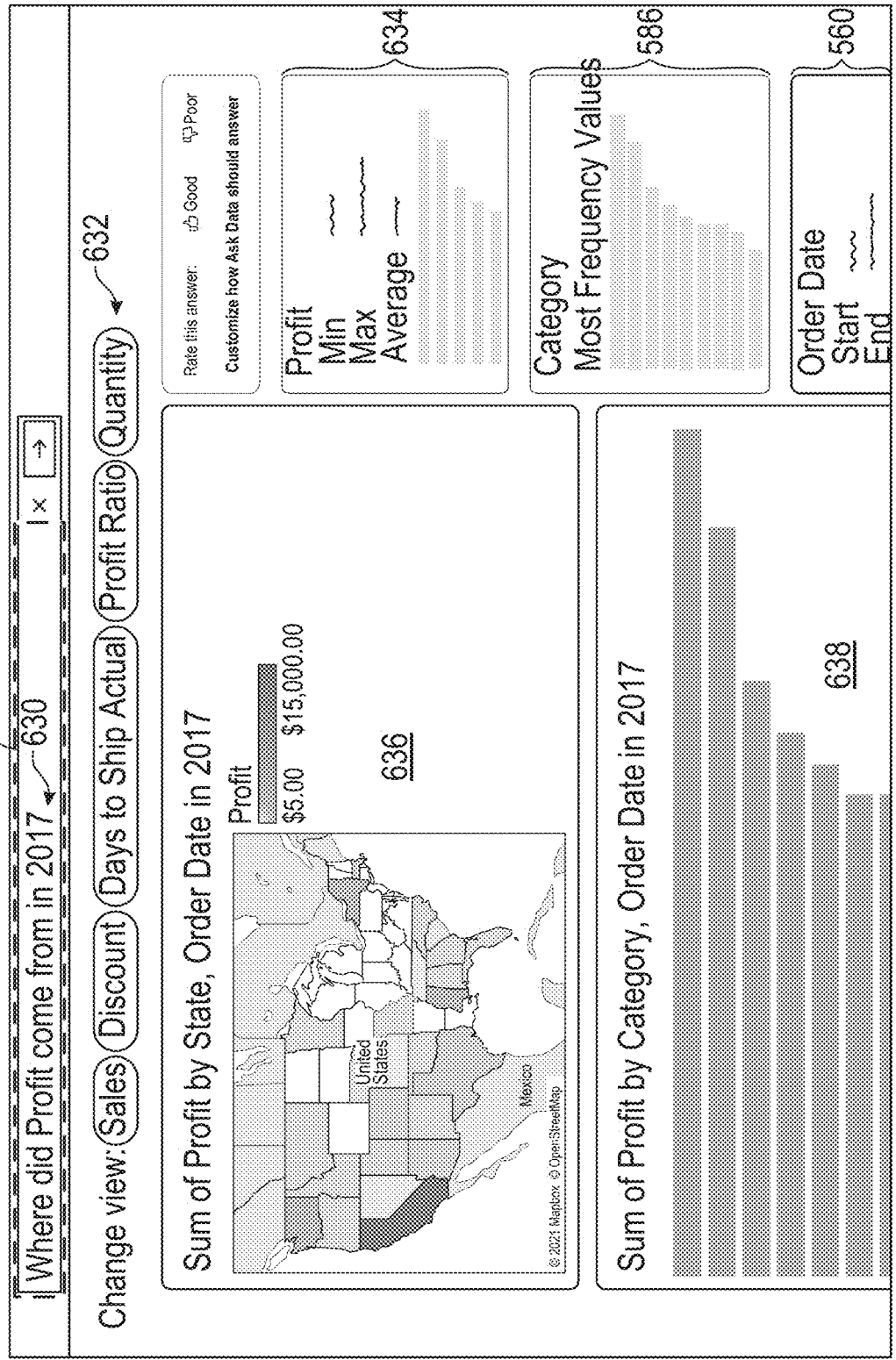

FIG. 6H shows what occurs after further input by the curator. Additional keystrokes are appended to the end of the partial natural language input in the natural language input box 124. The user may click on any portion of the partial natural language input and input additional keystrokes and/or modify an existing term of the partial natural language input. In response to the updated partial expression 626, the dropdown menu 622 updates to suggest different interpretations. In this example, the curator types "Where did pro" 626 into the natural language input box 124. The computing system recognizes that the user is not typing in "Where did Sales come from in 2017," but it still matches the template because Sales was replaced by the variable term. Accordingly, the dashboard displays interpretations in the dropdown menu 622, including " . . . Profit come from in 2017" 628. The template is working as intended.

When the user selects the "Profit" option 628 (or manually types in the rest of the text), the user interface displays the data visualizations for the data analysis template. That is, the entered text "Where did profit come from in 2017" 630 has matched the template, so the user interface displays the data visualizations for the template, including the map data visualization 636 and the bar chart visualization 638. Because Profit is the selected data field (instead of Sales), the interface displays metadata 634 for the Profit data field. In addition, the interface displays other data fields 632 that could be used for the Measure parameter. Selecting any of the options 632 replaces the "Profit" term in the expression 630 with the selected alternative measure data field.

The displayed list of alternative data fields 632 also suggests a way in which the template could be improved. Some of the measure data fields, such as Days to Ship and Profit Ratio might not make sense for this template. Therefore, the curator could edit the template further to limit the Measure parameter to just the meaningful measure data fields.

The current template is also limited to the year 2017. This is a prime candidate to become a parameter. Unlike Sales, which is a data field, 2017 is a data value. If a curator selects a trigger term that is a data value, the curator can replace the specific value with a set of values (e.g., 2016, 2017, 2018, and 2019), or replace the data value with a range of data values (e.g., 2016-2025, limited to integer values). Parameterizing the year makes this template more versatile.

In general, the user input does not have to match the full predefined trigger text in order to match a particular data analysis template. Triggers can encode for optional words (e.g. "which" and "the" in the trigger "which region has the most sales" may be designated as optional). In some implementations, the computing device recognizes synonyms for words in trigger text. Some templates include variable terms that can represent dimension data fields (e.g. "state" or "region"). Users can specify various constraints for the terms in trigger text.

FIGS. 7A-7C provide sample source code for matching data analysis templates to input natural language commands in accordance with some implementations. FIGS. 7A and 7B provide sample code for how the computing device determines "which X has the most Y." FIG. 7C provides source code for the ParseQuestion function. The ParseQuestion function takes in a query and determines whether it matches the triggers for any of the data analysis templates.

Figure 8A:
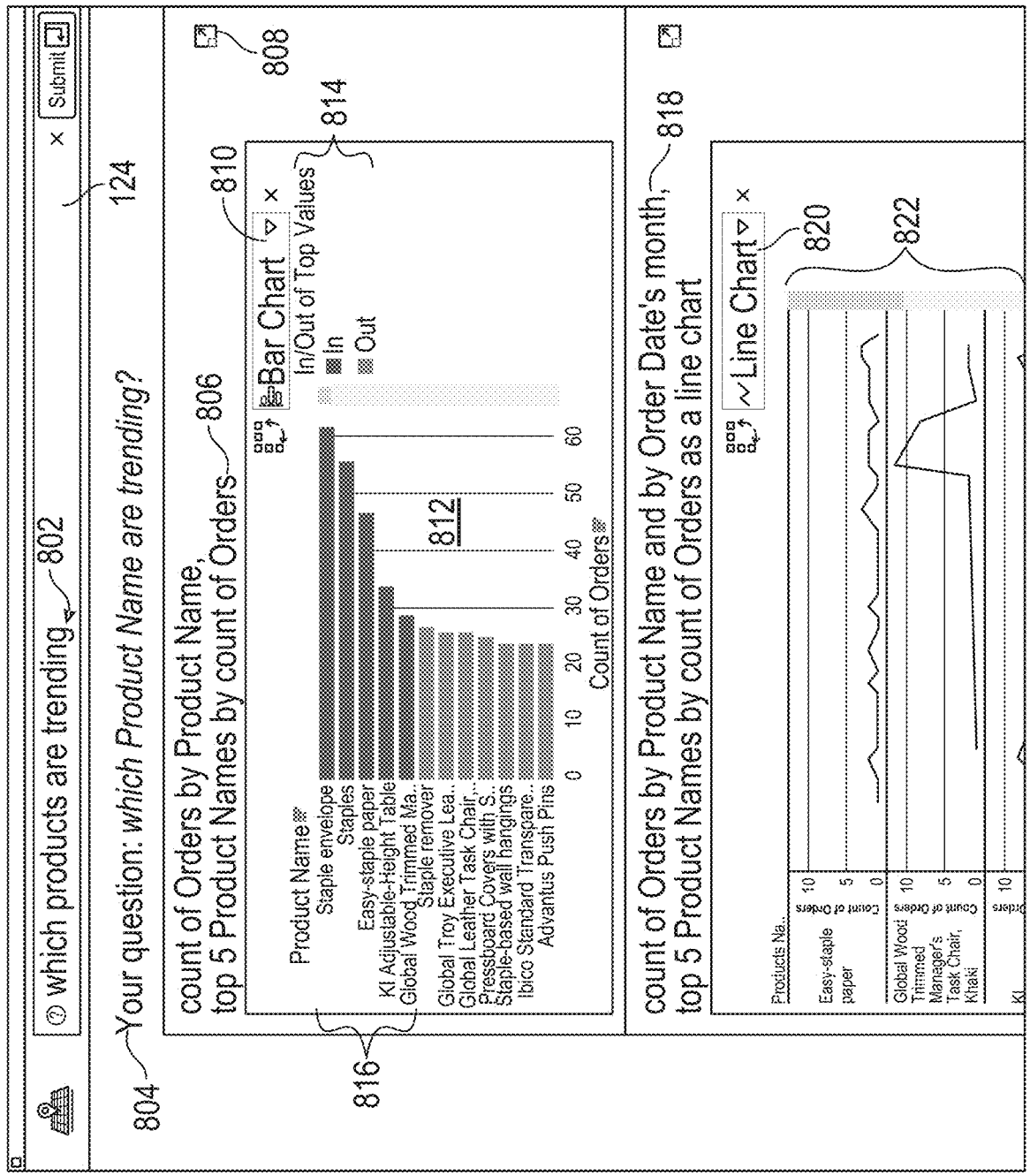
Figure 8B:
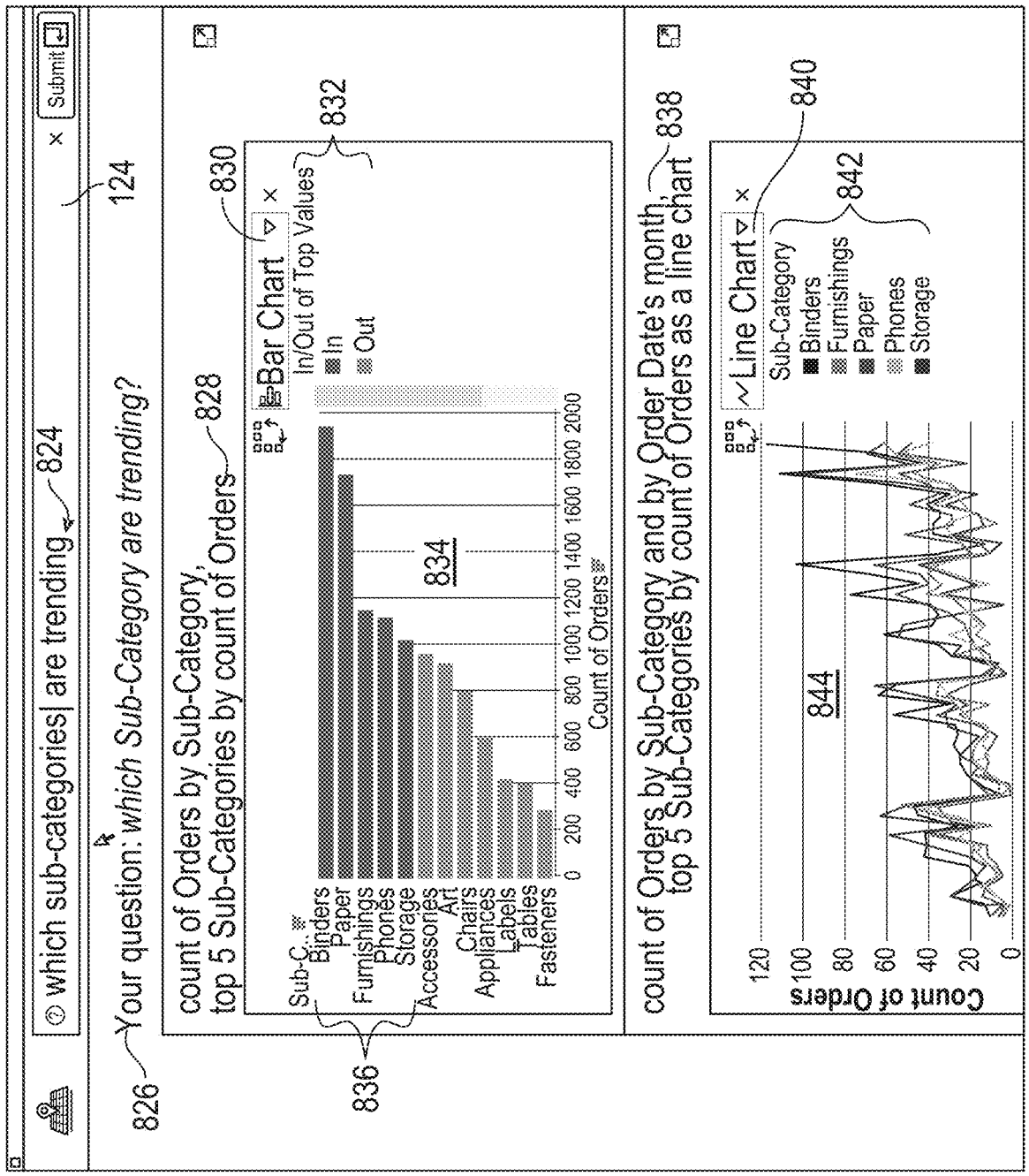

FIGS. 8A-8F illustrate how natural language input is matched to existing data analysis templates. FIGS. 8A and 8B use a first template, FIGS. 8C and 8D use a second template, and FIGS. 8E and 8F use a third template.

A curator has previously created a data analysis template to review trending items. The trigger text for a first data analysis template is "which [Dimension] are trending?" The words "which" and "are" are designated as optional. The [Dimension] parameter will match any data field in the data set that is a dimension. (In some cases, the curator specifies a limited set of dimension data fields rather than allowing all dimension data fields.) The term "trending" is required. In some implementations, the term "trending" has one or more designated synonyms. In some implementations, stemmed versions of "trending" will also be considered a match (e.g., "trend" or "trends"). In some implementations, the curator may specify words that are not necessarily "synonyms" of trending, but convey the same meaning in this context (e.g., a person may ask what is "currently popular"). In some implementations, words that convey the same meaning are determined automatically (e.g., using WordNet).

In addition to the parameterized trigger text, the first data analysis template includes two data visualizations. The first data visualization is "count of Orders by [Dimension], top 5 [Dimension] by count of Orders." This first data visualization is a bar chart. The second data visualization is "count of Orders by [Dimension] and by Order Date's month, top 5 [Dimension] by count of Orders as a line chart." As explicitly stated, the second data visualization is a line chart. Both data visualizations use the [Dimension] parameter specified in the trigger text.

In FIGS. 8A and 8B, a user enters a natural language command that matches the first data analysis template. In FIG. 8A, the user inters the expression "which products are trending" 802 in the input box 124. The system determines that the term "products" matches the "Product Name" dimension data field in the selected data set, and the interface shows the interpretation "which Product Name are trending" 804 to show the user how the input expression 802 was handled. (If this is the wrong interpretation, the user can easily see that and modify the input.)

Because the user input 802 matches the first data template, the interface displays the two data visualizations 812 and 822 corresponding to the first data analysis template. Replacing [Dimension] with [Product Name] in the first data visualization definition, the first data visualization description is "count of Orders by Product Name, top 5 Product by count of Orders" 806, as shown above the bar chart 812. The data visualization type menu 810 shows that it is a bar chart (which the user can change), and the interface also includes a legend 814 to indicate the color coding of which products are in the top five. The top five bars 816 are colored blue, whereas the remaining bars are a shade of gray.

The first data visualization also includes an affordance 808, which can give the user more fine level tuning of the first data visualization 812 (e.g., using an interface like the one shown in FIGS. 4A and 4B, thus enabling the user to modify the visualization description 806 by adding, modifying, or removing any portion of the description 806).

The second visualization 822 is a line chart, as indicated by the visualization type selector 820. The visualization description "count of Orders by Product Name and by Order Date's month, top 5 Product Name by count of Orders as a line chart" 818 indicates how the second visualization 822 was constructed.

As these two visualizations indicate, the curator did the hard work by creating a meaningful data analysis template, enabling users to ask simple questions and get useful results, even for a person with limited knowledge or understanding of the data visualization platform.

FIG. 8B illustrates a second user expression 824 that matches the same first data analysis template and demonstrates the power of parameterized trigger text for data analysis templates. In this case, rather than asking about specific products, the user wants to know about sub-categories. After entering the expression 824, the interface displays the interpretation "which Sub-Category are trending?" 826. In this instance, the system matched the input "sub-categories" to the dimension data field "Sub-Category". In this instance, the term "sub-category" is a term of art for a specific company, so the user is familiar with it. In some instances, not all users would be familiar with this term, so the curator may set up one or more synonyms. In some implementations, synonyms are set up at the data source level so that the synonyms are known whenever a user accesses the data source (e.g., not just for matching data analysis templates).

In response to matching the trigger text for the first data analysis template, the interface displays the two data visualizations 834 and 844 for the first data analysis template. As in FIG. 8A, the first data visualization 834 is a bar chart 830 and the second data visualization 844 is a line chart 840. The visualization definition 828 for the first visualization replaces [Dimension] with [Sub-Category]. As in FIG. 8A, the first visualization includes a legend 832 and the top five bars 836 are highlighted in blue to indicate that they are in the top five values.

The second visualization 844 is constructed according to the second visualization definition 838, in which [Dimension] is replaced by [Sub-Category]. The legend 842 shows the color for each of the top five sub-categories.

FIGS. 8A and 8B deal with two different types of data (Product Name versus Sub-Category), but the data analysis template is able to generate the relevant helpful data visualizations in both cases. The same template can be applied to any dimension data field in the data source and show what data values for that data field are trending.

Figure 8C:
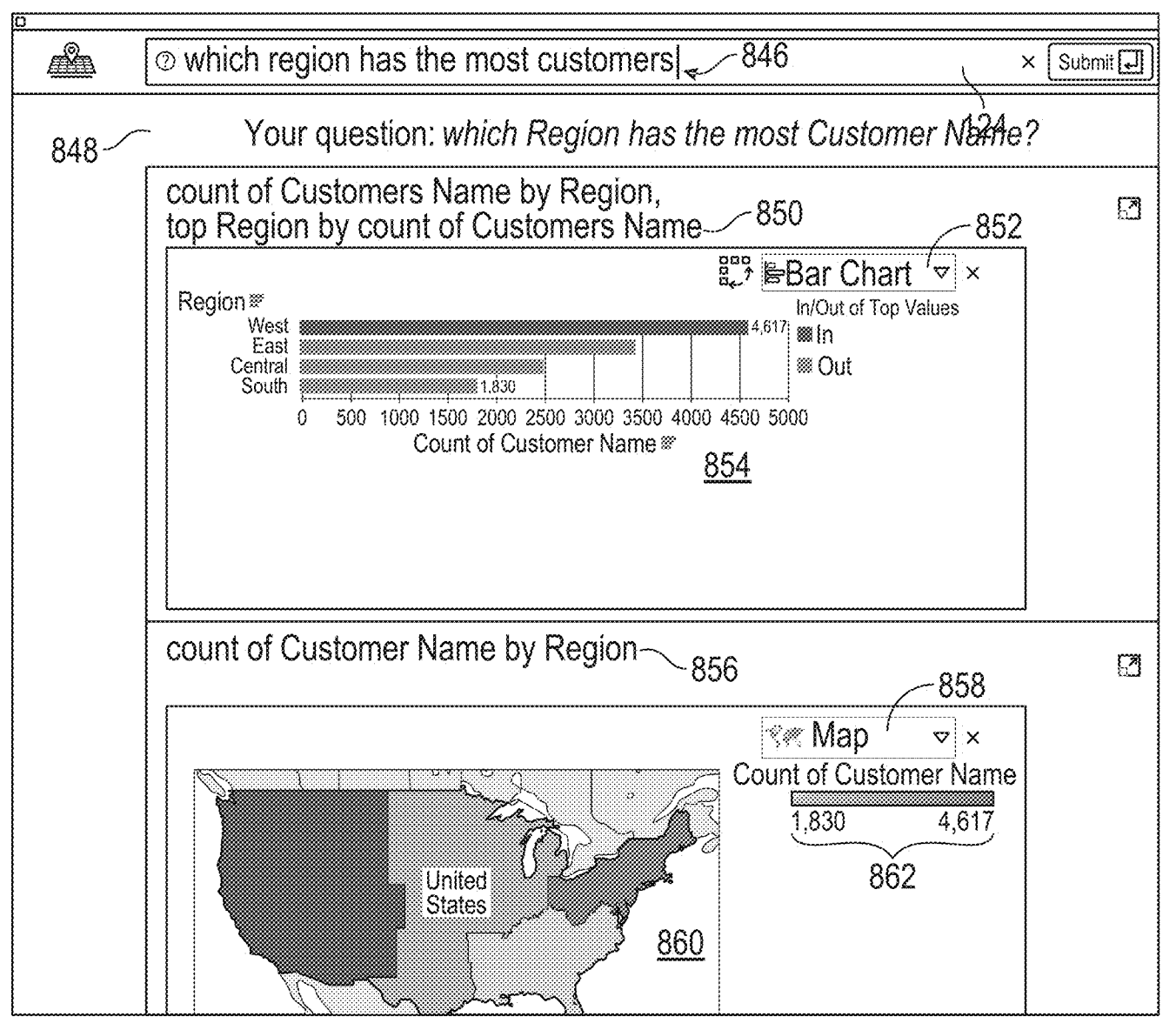
Figure 8D:
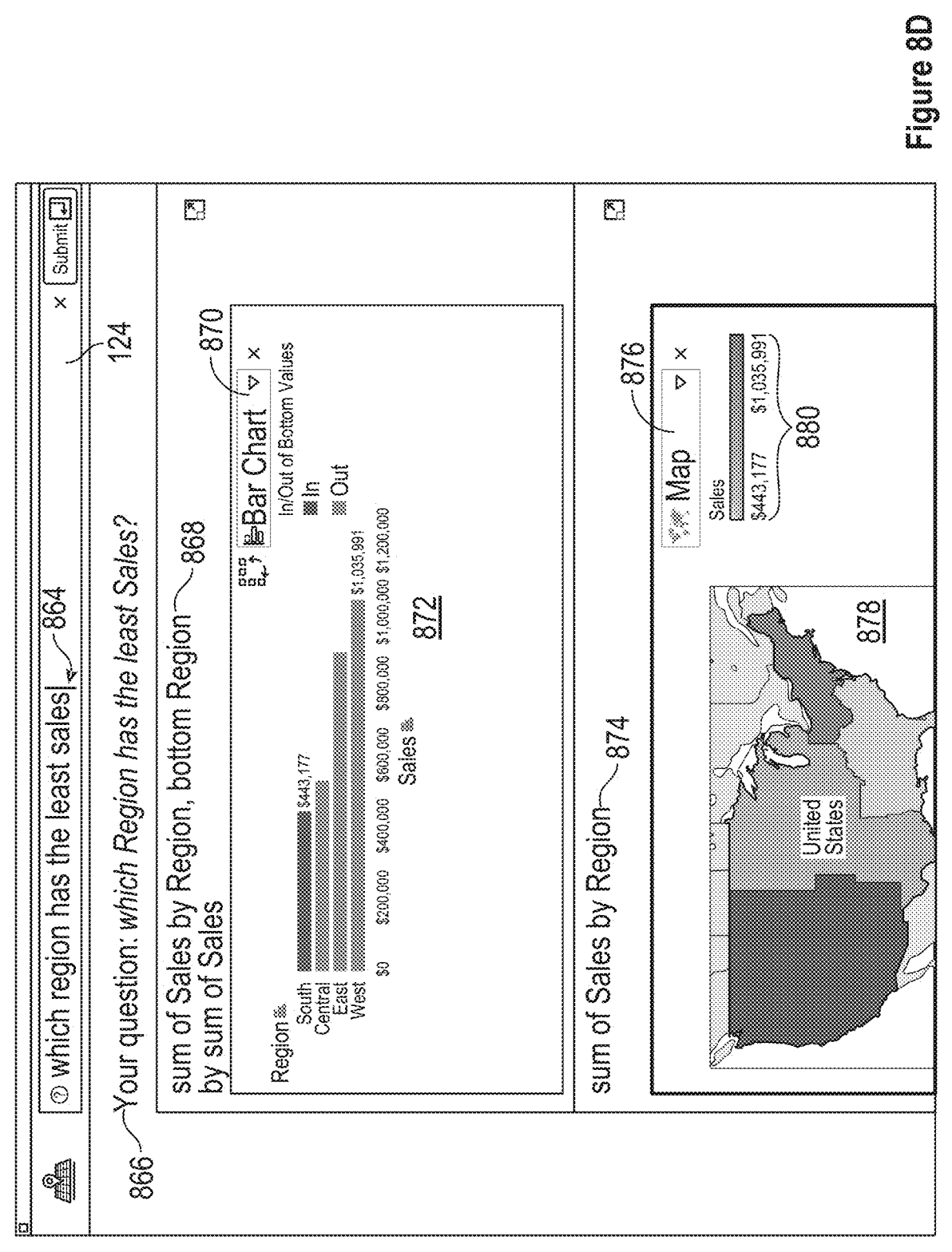

FIGS. 8C and 8D use a second data analysis template. For the second data analysis template, the trigger text is "which [Dimension] has the [Superlative] [Data Field]". The three terms "which," "has," and "the" are designated as optional terms. The term "[Dimension]" is designated to match and dimension data field in the data source. The term "[Superlative]" is designated to match any superlative quantitative adjective (e.g., "most" or "least").

For the second data analysis template, the curator created two data visualizations: a bar chart defined by "[Aggregate] of [Data Field] by [Dimension], top [Dimension] by [Aggregate] of [Data Field]" and a map defined by "[Aggregate] of [Data Field] by [Dimension]". These parameterized data visualizations use the parameters defined in the trigger text. The term [Aggregate] in the data visualization definitions is a parameter that depends on the [Data Field]. When the [Data Field] is a dimension, the [Aggregate] is "count", and when the [Data Field] is a measure, the [Aggregate] is "sum".

In FIG. 8C, the user enters the expression "which region has the most customers" 846 in the input box 124. The system displays the interpretation "which Region has the most Customer Name?" 848. In this case, the term "region" in the expression 846 is easily recognized as corresponding to the Region data field, and the term "customers" is correlated to the Customer Name data field. This matches the second data analysis template.

In response to the user's input 846, the interface displays the two data visualizations corresponding to the second data analysis template: a bar chart 854 and a map visualization 860. The bar chart 854 is defined by the visualization definition "count of Customer Name by Region, top Region by count of Customer Name" 850. The visualization type selector 852 shows that this is a bar chart (which the user can change). Because the user input asked for the region with the most customers, the visualization highlights the West region, which has the most sales (e.g., highlighting in blue). Because Customer Name is a dimension data field, the [Aggregate] operator is "count".

For the second visualization 860, the visualization definition is "count of Customer Name by Region" 856, and the visualization type 858 was preselected by the template curator to be a map. The second visualization 860 includes a legend 862 indicating the color gradient used to indicate the count of customers.

FIG. 8D demonstrates the flexibility of the second data analysis template. Rather than looking for the most customers, the user now wants to look for the region with the least sales. Because of the parameterization of the trigger text, the same template is flexible enough to handle this question as well.

The user enters the question "which region has the least sales" 864 in the input box 124, and the interface interprets this as "which Region has the least Sales" 866. Because Region and Sales are both data fields in the data source, this interpretation was relatively easy. Note that "least" is a quantitative superlative adjective, so it matches the template.

Because the question 864 matches the second data analysis template, the interface generates and displays the two data visualizations for the template. The first data visualization 872 has the visualization definition "sum of Sales by Region, bottom Region by sum of Sales" 868 and is a bar chart 870. Because Sales is a dimension data field, the [Aggregate] operator is sum. Also, because the user asked for the least sales, the bars are sorted from smallest to largest, with the smallest bar highlighted.

The second data visualization 878 is a map, with visualization definition "sum of Sales by Region" 874. The data visualization type selector 876 indicates that a map has been selected. the second data visualization also includes a legend 880 to show the color gradient used for assigning colors to each of the regions.

Figure 8E:

FIGS. 8E and 8F illustrate the usage of a third data analysis template. For the third data analysis template, the curator has determined some of the most important key performance indicators (KPIs) for the company, and has predetermined how to compute those key performance indicators. In this way, a business user can just ask for the KPIs, and not worry about how to compute them or what data is needed to compute them. To make it flexible, the curator has added a data value parameter, which will be used to filter the data for calculating the key performance indicators.

The curator created very simple trigger text for the third data analysis template, consisting of "[Data Value] kpis". The term [Data Value] is a data value for a data field in the data source, and "kpis" is a fixed term that is required. As usual, the term "kpis" may have some predefine synonyms (e.g., "key performance indicators") or may have some additional alternatives created by the curator.

For the third data analysis template, the curator has defined three data visualizations, each corresponding to a different key performance indicator. For this template, all three of the data visualizations are text tables with a single data value. The first data visualization is "sum of Sales, filter [Data Field] to [Data Value]". When a user asks a question that matching the trigger text of this template, the user has specified a [Data Value]. To recognize this [Data Value], the system has to identify a specific [Data Field], and that is the data field that is used to generate the first data visualization.

The second data visualization is similar, but computes data for Profit rather than Sales. The data visualization definition is "sum of Profit, filter [Data Field] to [Data Value]". Like the first data visualization, the second visualization uses the [Data Value] entered by the user, and determines the corresponding [Data Field] in order to generate the data visualization.

The third data visualization computes the Profit Ratio for the selected [Data Value]. Depending on what data is stored in the data source, the Profit Ration may be retrieved directly from the database, or else computed. In particular, A data visualization in a data analysis can include custom calculations. In this case, the Profit Ratio is the ratio of the data in the first two data visualizations. Some implementations enable a curator to use computed data from one data visualization in a template in calculations for other data visualizations. In other implementations, all of the data visualizations are computed independently of each other (thereby allowing multi-threaded execution).

In FIG. 8E, a user has entered "furniture kpis" 882, which is interpreted as "what are out furniture kpis?" 884. In response, the system matches this to the third data analysis template, and generates the three data visualizations. "Furniture" is a data value of the Category data field, so the first visualization definition is "sum of Sales, filter Category to Furniture" 886. The second visualization definition is "sum of Profit, filter Category to Furniture" 888, and the third visualization definition is "Profit Ratio, filter Category to Furniture" 890. Note that the system generates all of this KPI data for furniture just by entering "furniture kpis" 882 into the input box 124.

In FIG. 8F, the user is still interest in KPIs, but is now interested in data for California. The term "California" (or the California two character code "CA") is a data value for the State data field in the data source, so the question "California kpis" 892 matches the third data analysis template. The interface displays the interpretation 894 and displays the three data visualizations for this template. Instead of "filter Category to Furniture" in each of the data visualization definitions 886, 888, and 890 in FIG. 8E, we have "with State in California" for each of the visualization definitions 896, 898, and 899 in FIG. 8F. In this implementation, filter expressions are worded differently depending on the data field. For example, in some implementations, the filter expression for California would be "filter State to California," looking more like the filter expression for Furniture.

FIGS. 9A-9F provide a flow chart of a method for generating data analysis templates. The method 900 is performed (902) at a computing device. The computing device has a display, one or more processors, and memory. The memory stores (904) one or more programs configured for execution by the one or more processors. The computing device receives (906), in a graphical user interface, a first natural language query (e.g., a natural language input, utterance, command, or question, such as "Show me the region with the fewest customers", "KPIs", or "Which products are trending?"). In some implementations, the first natural language query is a business question rather than a question about a specific data field. In response (908) to receiving the first natural language query, the computing device parses (910) the first natural language query. Parsing the first natural language query includes identifying one or more keywords in the first natural language query (e.g., data fields, data values, data types, terms, trigger words, phrases, or numbers). In some implementations, the computing device identifies (912) one or more data sources that are relevant to the first natural language query. In some implementations, the data source is selected by the user before entering the natural language query. The computing device also identifies (914) one or more data fields and/or data values from the one or more data sources in the first natural language query.

In some implementations, the computing device looks up (916) the keywords using one or more lexicons (e.g., a grammar lexicon and/or a data source lexicon) corresponding to the one or more data sources in order to identify the one or more data fields and/or data values. In some instances, the keywords provided by the user in the natural language query are not actual data field names or actual data values, but are synonyms, attributes, or parameters corresponding to the data values or data fields. For example, the natural language query may include the keyword "SF", which is a synonym of the data value "San Francisco" for the data field "City" in the data source. The lexicon specifies additional metadata about the keywords, such as statistical values of attributes, analytical concepts, whether the keyword corresponds to a data field (and if so, whether it is a measure data field or a dimension data field), whether the keyword is a data value, whether the keyword specifies an analytical operation, and whether the keyword specifies a data visualization type.

The computing device compares (920) the one or more keywords with respective trigger text for each of a plurality of data analysis templates. The comparison is based on the trigger text constraints, such as whether a term in the trigger text is required or not, and whether keywords from the natural language query match constraints for each of the parameters (variable terms). The computing device selects (922) a first data analysis template (also referred to as a dashboard template or a custom intent template) from the plurality of templates in accordance with the comparing. A natural language query typically does not match the trigger text for more than one data analysis template. The first data analysis template includes (924) a plurality of predefined data visualizations. In some implementations, each of the predefined data visualizations has (926) a respective visualization type. In some implementations, the visualization types are (928) bar chart, Gantt chart, line chart, map, pie chart, scatter plot, tree map, and text table.

The computing device generates (966) a dashboard that includes the plurality of data visualizations using the identified data fields and/or data values. In some implementations, the dashboard includes (968) a description of how the first natural language query is interpreted. For example, see the visualization definitions 806 and 818 in FIG. 8A, the visualization definitions 850 and 856 in FIG. 8C, and the visualization definitions 866, 888, and 890 in FIG. 8E.

In some implementations, generating the dashboard includes populating (970) one or more parameters in the first data analysis template using the identified data fields and/or data values identified in the first natural language query. This is illustrated in FIGS. 8A-8F.

In some implementations, generating the dashboard includes, for each (972) of the plurality of data visualizations, forming (974) a respective intermediate expression according to a context-free grammar and one or more semantic models of data fields in the one or more data sources. In some implementations, the intermediate expression uses ArkLang. The computing device translates (976) the respective intermediate expression into one or more executable database queries referencing the identified data fields and/or data values. The computing device then executes (978) the database queries to retrieve data from the one or more data sources. The computing device generates (980) the dashboard to include a plurality of data visualizations using the retrieved data.

The computing device displays the dashboard in the graphical user interface (982).

Figure 9A:
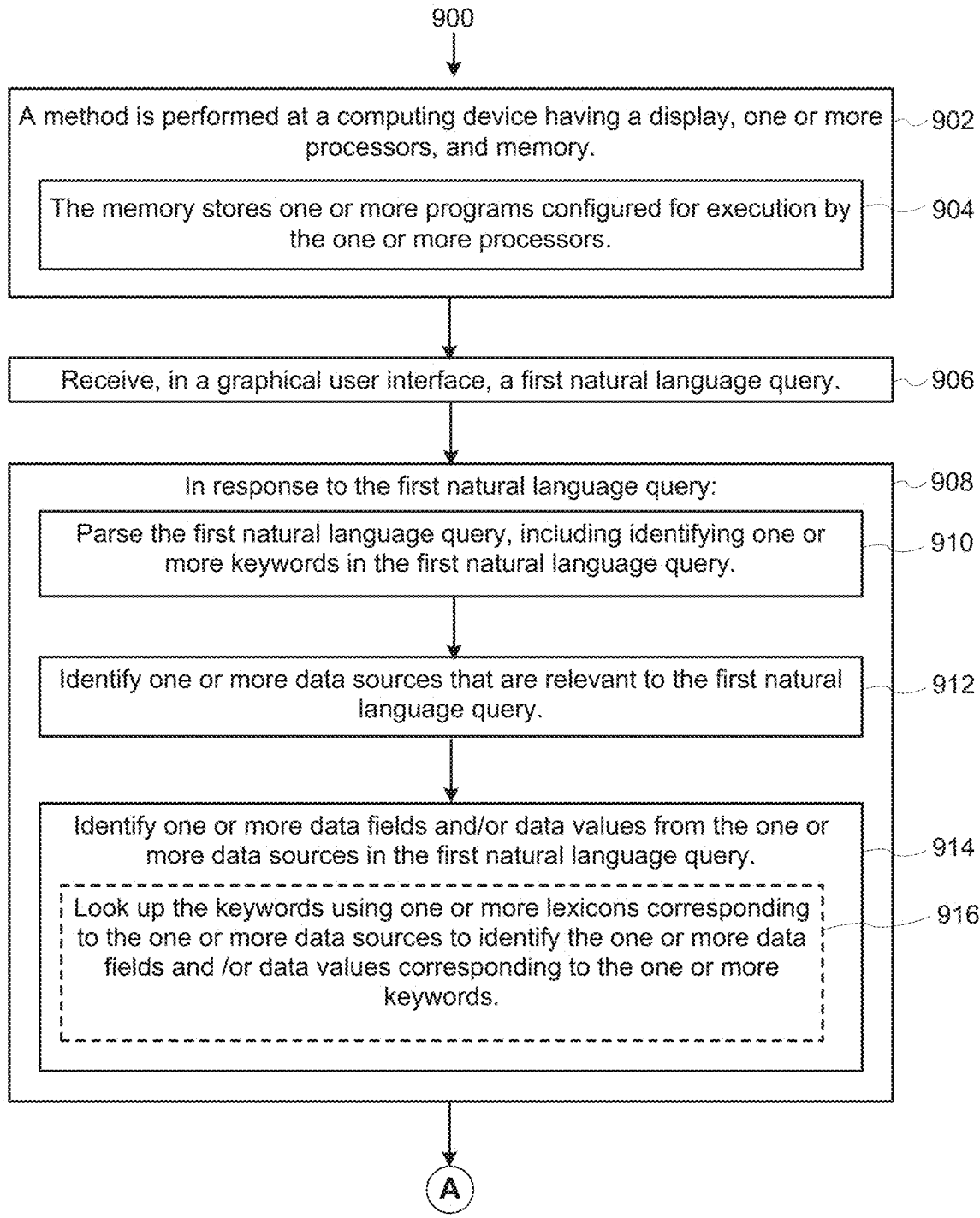
FIGS. 9A-9F provide a flow chart of a method for generating a dashboard according to data analysis templates, according to some implementations.
Figure 9B:
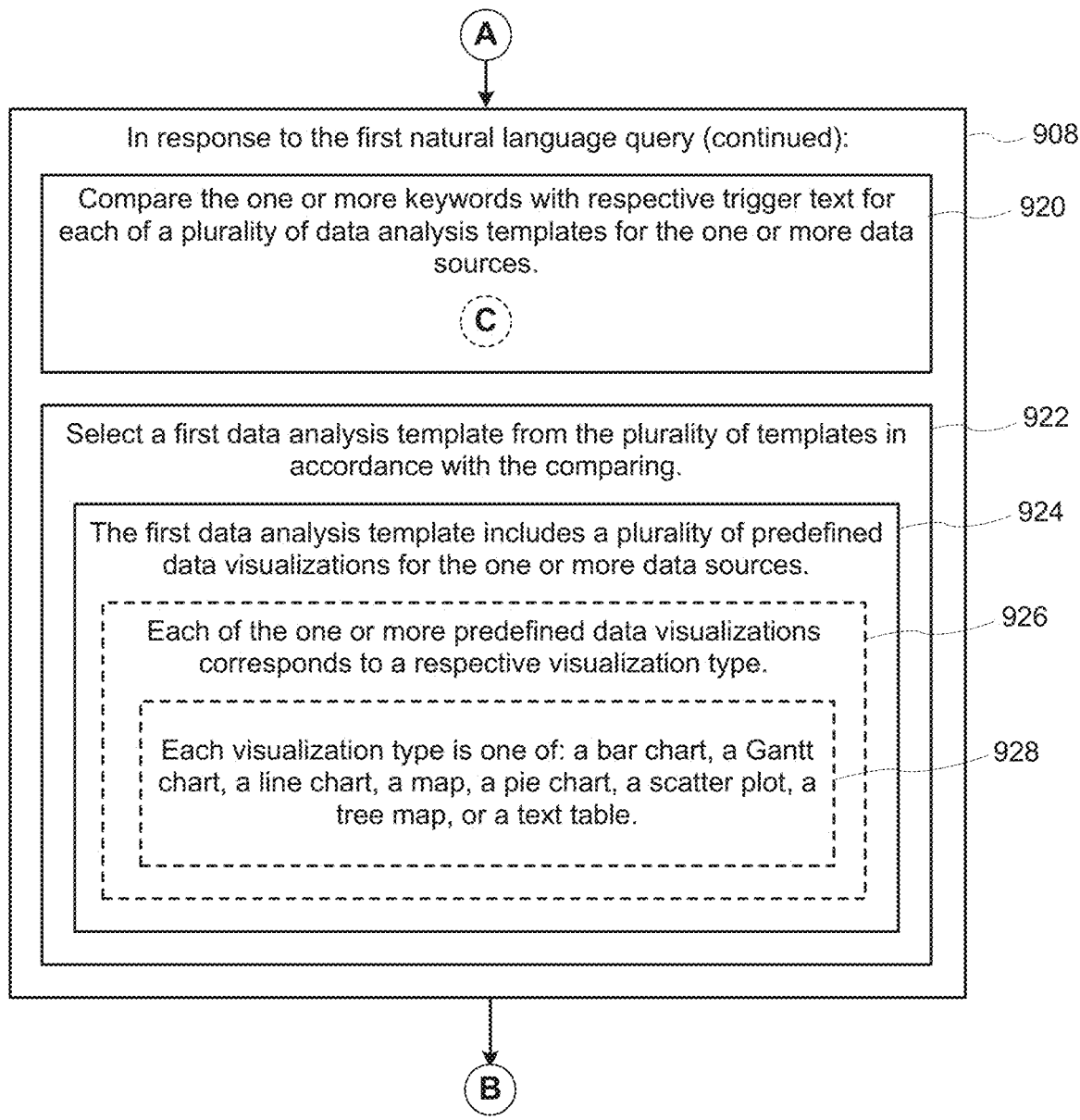
Figure 9C:
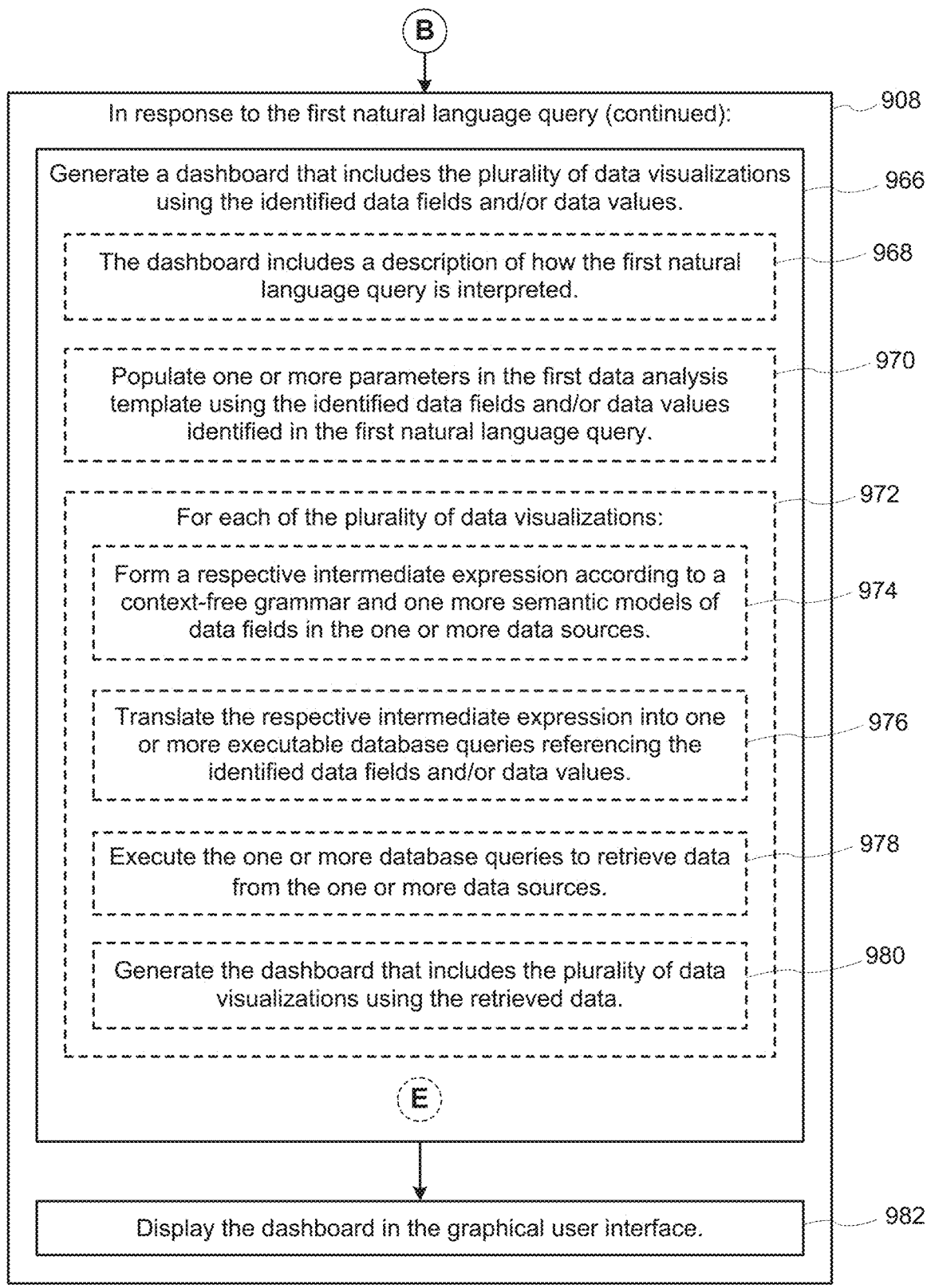
Figure 9D:
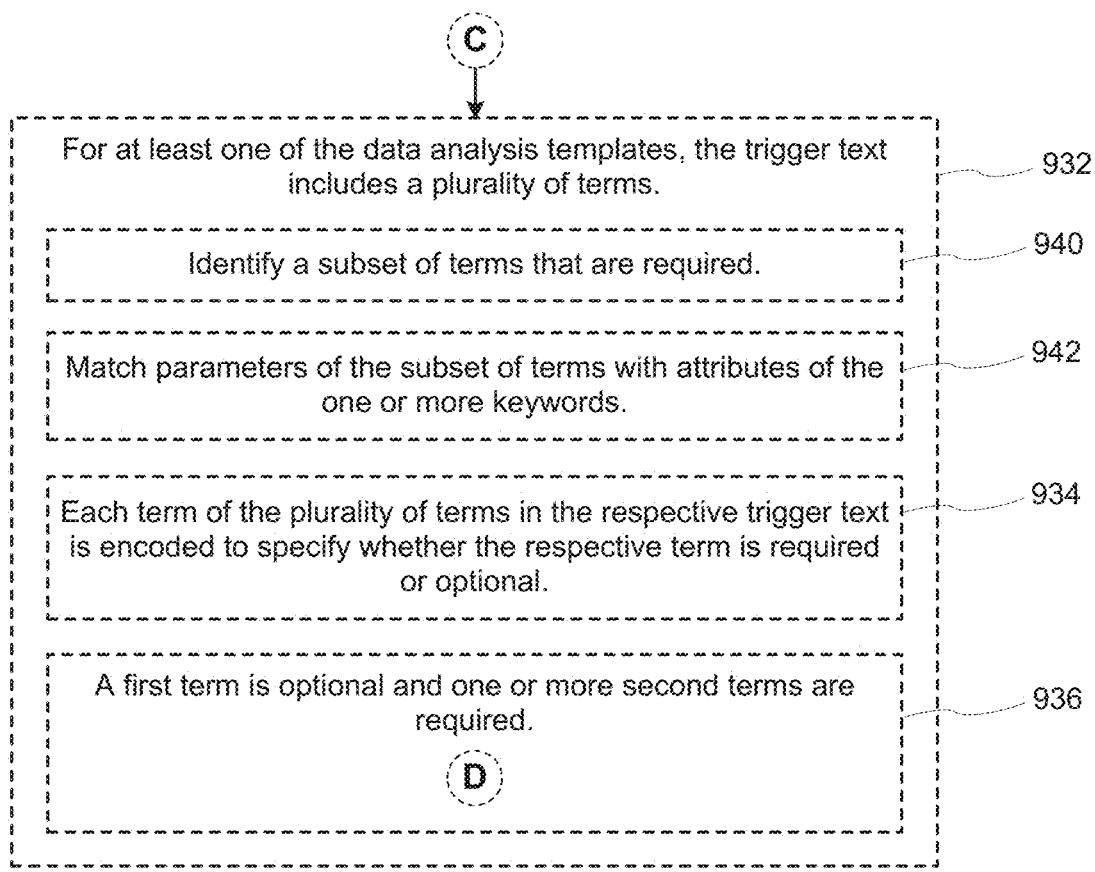
Figure 9E:
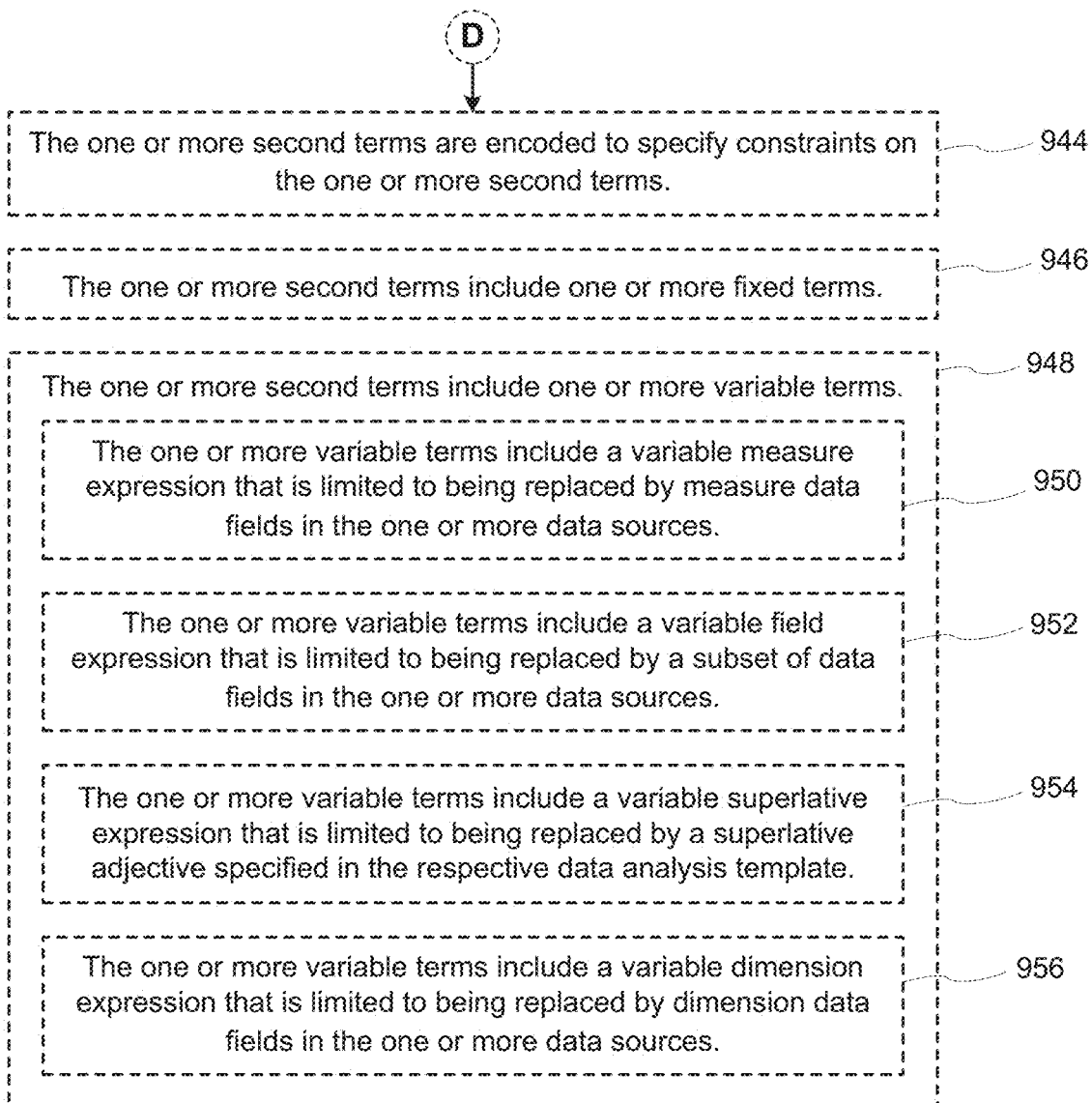
Figure 9F:
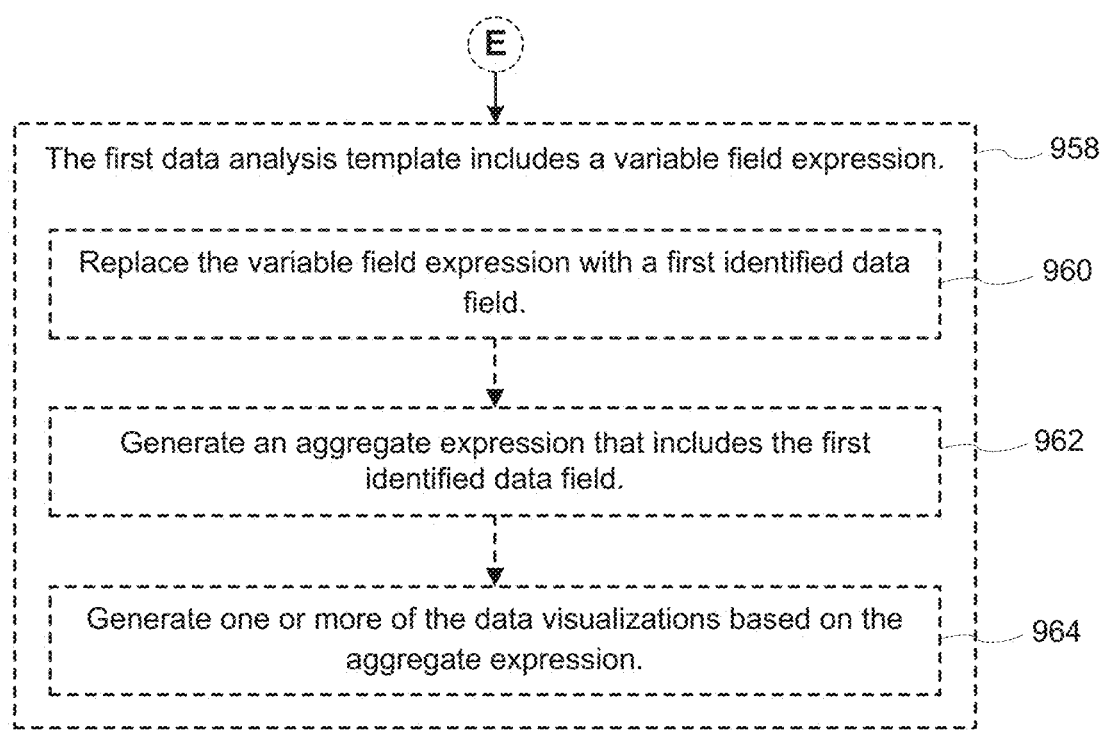
Figure 10A:
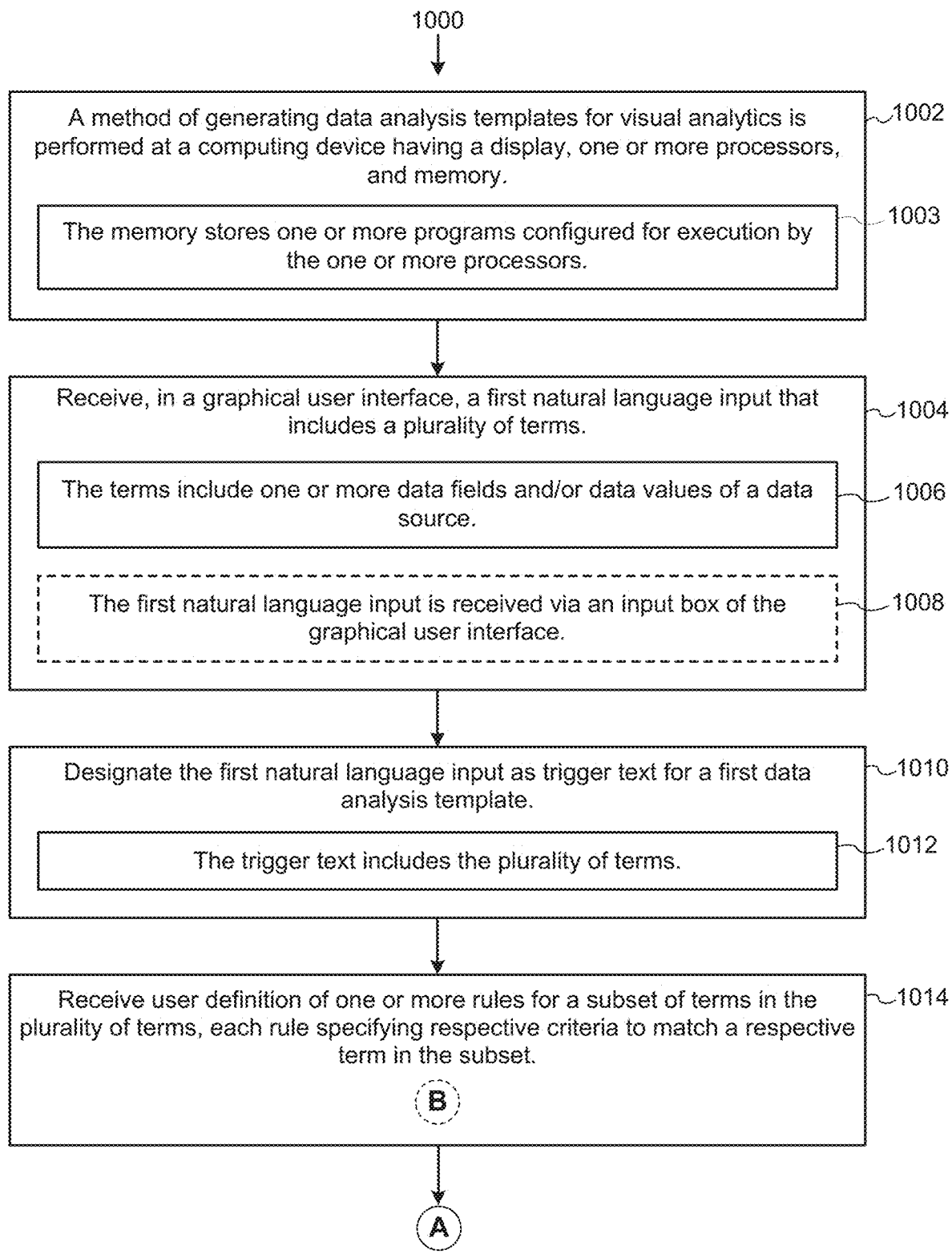
FIGS. 10A-10D provide a flow chart of a method for creating a data analysis template according to some implementations.
Figure 10B:
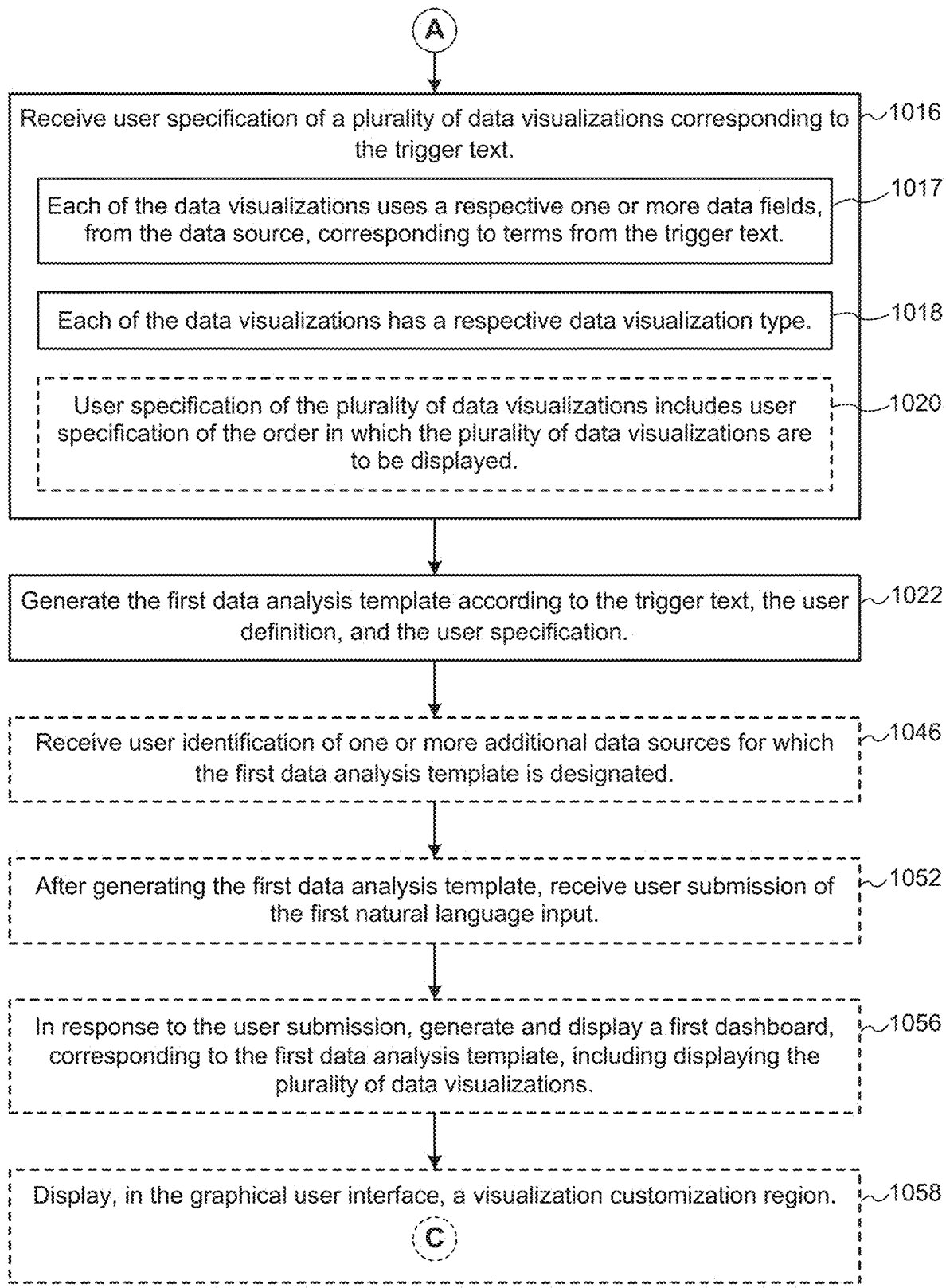
Figure 10C:
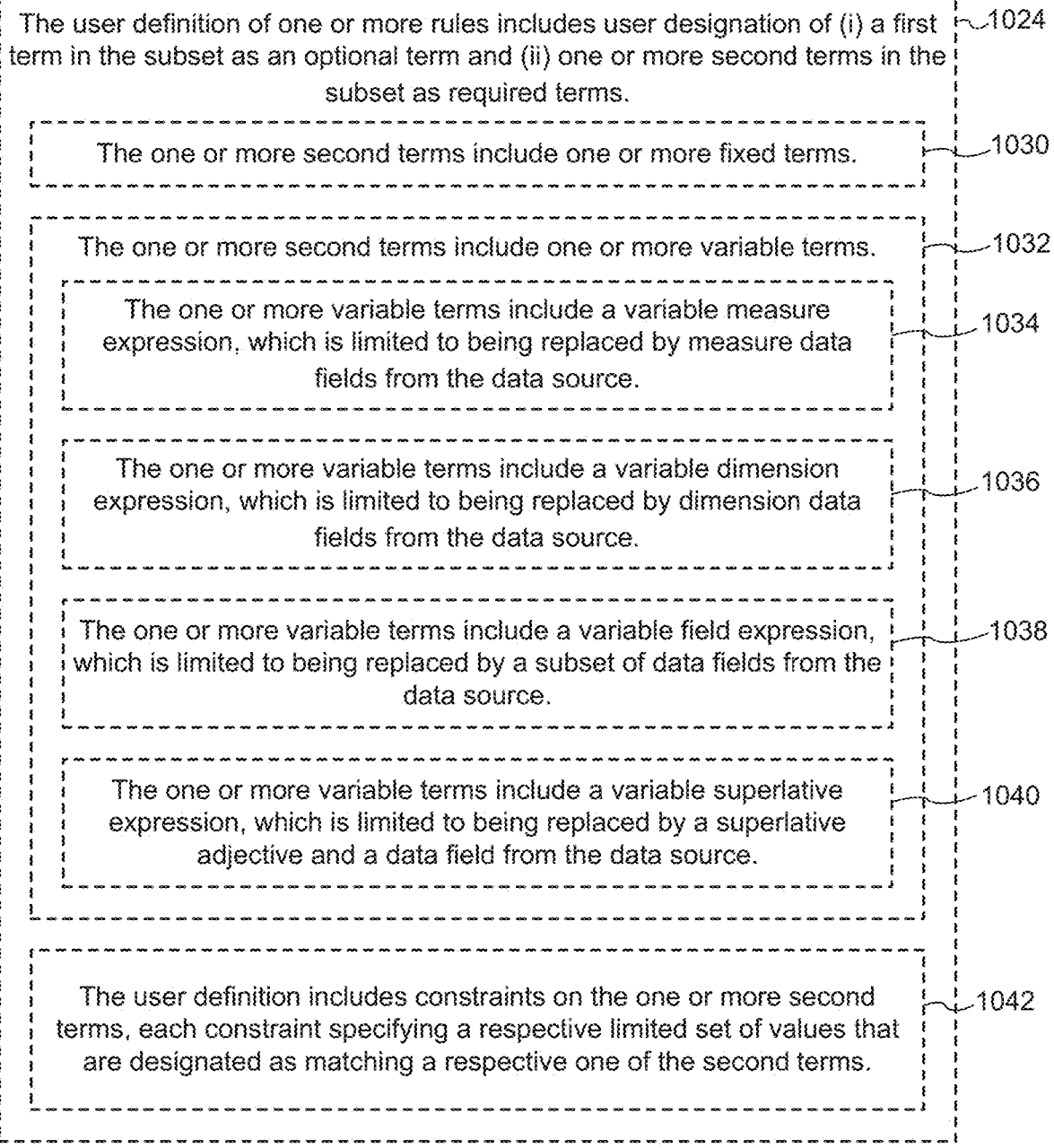
Figure 10D:
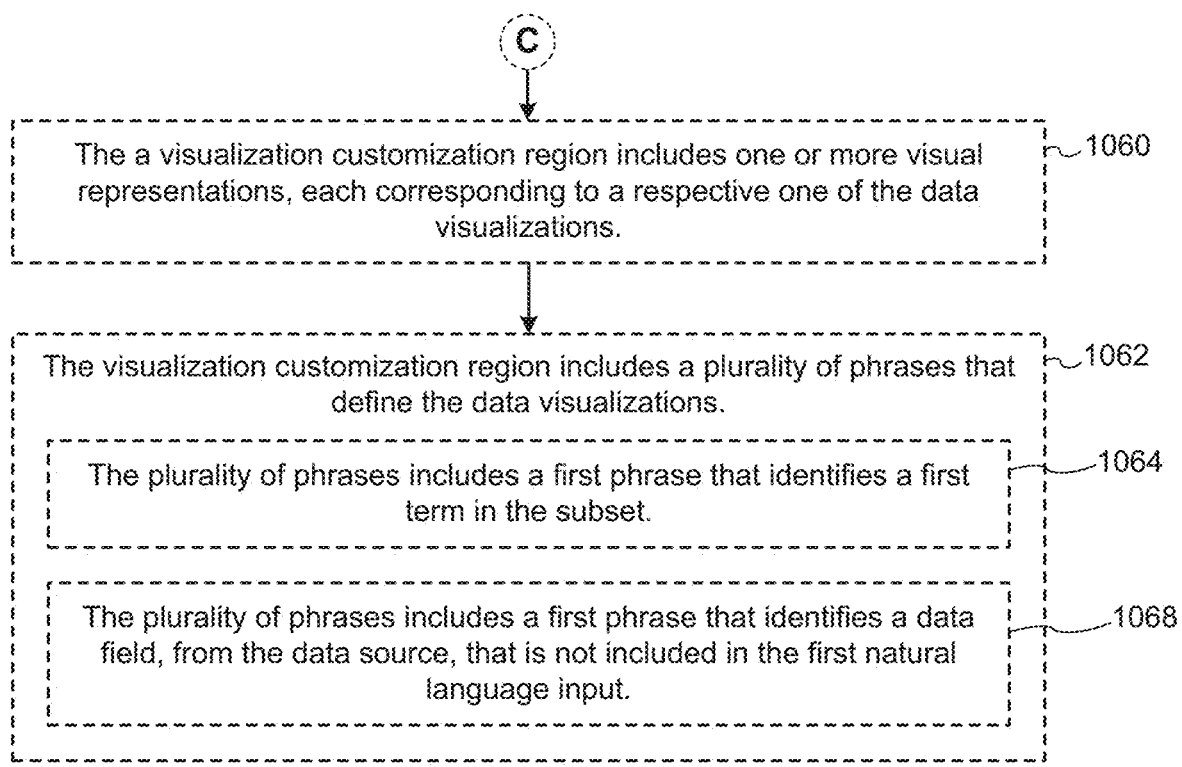

FIGS. 9D-9F describe some of the optional features in the flowchart. First, FIGS. 9D and 9E illustrate how the keywords from the natural language input is compared (920) to the trigger text for templates in some implementations In some implementations, the trigger text for at least one template includes (932) a plurality of terms (see, e.g., the trigger text 510 in FIG. 6A). Comparing the keywords to the trigger text identifies (940) a subset of terms (e.g., one or more) that are required (e.g., each term can be one word or else two or more adjacent words) and matches (942) parameters of the subset of terms with attributes of the one or more keywords (e.g., the parameters of the subset of term can specify whether the term is a measure data field, a dimension data field, or has a particular data type (e.g., numeric, string, date, or currency). The parameters can specify a list of data fields and/or data values that a curator has identified (e.g., limiting to meaningful options). In some instances, the trigger text has some terms that are optional. Although optional terms are not required to match anything in the user input, matching of option terms is used in some implementations to recognize when the user's input includes unmatched terms. That is, by matching a term on the input to an optional term in the trigger text, that term is not considered an extra unmatched term.

In some implementations, each term of the plurality of terms in the respective trigger text is encoded (934) to specify whether the respective term is required or optional.

In some instances, the trigger text includes a plurality of terms (932), which includes (936) a first term that is optional (for example, in the trigger text "Which region has the most sales," the terms "which" and "the" are optional). The trigger text also includes (936) one or more second terms that are required. The required terms can be fixed (e.g., "Region") or variable (i.e., a parameter, such as the "Measure" parameter 620 in FIG. 6F).

In some implementations, the one or more second terms are encoded (944) to specify constraints on the one or more second terms. For example, in some implementations, the constraints can include: limiting a term to a subset of measure data fields, limiting a term to a subset of dimension data fields, limiting a term to particular data types or limiting a term to a specific set or range of data values.

In some implementations, the one or more second terms include one or more fixed terms, such as "Region" or "Sales" or "2017".

In some implementations, the one or more second terms include (946) one or more variable terms, such as the Measure term 620 in FIG. 6F.

In some instances, the one or more variable terms include (950) a variable measure expression, which is limited to being replaced by measure data fields in the one or more data sources. In some instances, the one or more variable terms include (956) a variable dimension expression, which is limited to being replaced by dimension data fields in the one or more data sources. In some instances, the one or more variable terms include (952) a variable field expression, which is limited to being replaced by a subset of data fields in the one or more data sources (e.g., all of the data fields in the data sources or a specific subset of data fields specified in the data analysis template). In some instances, the one or more variable terms include (954) a variable superlative expression, which is limited to being replaced by superlative adjectives specified in the data analysis template.

FIG. 9F provides some details of how the data visualizations are generated when there are parameters, according to some implementations.

In some instances, the first data analysis template includes (958) a variable field expression. Generating the dashboard includes replacing (960) the variable field expression with a first identified data field, generating (962) an aggregate expression that includes the first identified data field (e.g., "distinct count of Customers" or "sum of Sales"), and generating (964) one or more of the data visualizations based on the aggregate expression.

FIGS. 10A-10D provide a flow chart for generating a data analysis template that includes (i) a plurality of data visualizations and (ii) trigger text to determine when it is used. The method 1000 is performed (1002) at a computing device. The computing device has a display, one or more processors, and memory. The memory stores (1003) one or more programs configured for execution by the one or more processors. The computing device receives (1004), in a graphical user interface, a first natural language input that includes a plurality of terms (e.g., "Where did Profit come from in 2017?"). The terms include (1006) one or more data fields and/or data values from a data source. In some implementations, the input is received (1008) via an input box 124 of the graphical user interface (see, e.g., FIG. 5B) The computing device designates (1010) the first natural language input as trigger text for a first data analysis template. The trigger text includes (1012) the plurality of terms.

The computing device then receives (1014) user definition (e.g., user specification) of one or more rules for a subset of the terms in the plurality of terms (some or all of the plurality of terms). Each of the rules specifies (1014) respective criteria to match a respective term in the subset. In most cases, a "term" is a set of adjacent characters surrounded by white space (or the beginning or the end of the natural language input). In some cases, a term has embedded white space, such as the data value "San Francisco" or the data field name "Product Name". Usually, the user definition of one or more rules includes (1024) user designation of (i) a first term as an optional term and one or more second terms as required terms.

In some instances, the one or more second terms include (1030) one or more fixed terms (e.g., "Region" or "2017"). In some instances, the one or more second terms include (1032) one or more variable terms (i.e., parameters, such as the "Measure" parameter 620 in FIG. 6F).

In some instances, the one or more variable terms include (1034) a variable measure expression, which is limited to being replaced by measure data fields. In some instances, the one or more variable terms include (1036) a variable dimension expression, which is limited to being replaced by dimension data fields. In some instances, the one or more variable terms include (1038) a variable field expression, which is limited to being replaced by one of the data fields designated by the curator. For example, the subset of possible data fields can be all data fields in the data source or a subset of the data fields specified by the curator. In some instance, the one or more variable terms include (1040) a variable superlative expression, which is limited to being replaced by a superlative adjective following by a data field name from the data source.

In some instances, the user definition includes (1042) constraints on the one or more second terms (e.g., limiting a term to a subset of measure data fields, limiting a term to a subset of dimension data fields, or limiting a term to a particular data type).

After defining the trigger text, the curator specifies (1016) a plurality of data visualizations corresponding to the trigger text. Each of the data visualizations uses (1017) a respective one or more data fields, from the data source, corresponding to terms from the trigger text. Each of the data visualizations has (1018) a respective data visualization type. In some implementations, the user specification of the data visualizations includes (1020) user specification of the order in which the data visualizations are to be displayed. The computing device then generates (1022) the first data analysis template according to the trigger text, the user definition, and the user specification. In some implementations, the graphical user interface used to generate a template is the same as the interface used by users to access templates. In some implementations, the interface for generating data analysis templates is distinct from the GUI for visual analytics.

In some instances, the computing device receives (1046) user identification of one or more additional data sources for which the first data analysis template is designated (e.g., applicable).

In some implementations, after generating the first data analysis template, the computing device receives (1052) user submission (e.g., another user input) of the first natural language input. In response to the user submission, the computing device generates and displays (1056) a first dashboard. The first dashboard corresponds to the first data analysis template. It displays the plurality of data visualizations.

In some implementations, the computing device displays (1058), in the graphical user interface, a visualization customization region (e.g., a viz handler, a data visualization editor, or a data visualization setup region). The visualization customization region includes (1060) one or more visual representations. The one or more visual representations each correspond to a respective data visualization. The visualization customization region also includes (1062) a plurality of phrases (e.g., adjacent to each of the visual representations) that define the respective data visualization.

In some implementations, the plurality of phrases includes (1064) a first phrase that identifies a first term in the subset.

In some implementations, the plurality of phrases includes (1068) a first phrase that identifies a data field, from the data source, that is not included in the first natural language input. In some implementations, a user/curator can specify certain data fields (e.g., grouping fields, aggregate fields, or fields to filter the dataset) that are not part of the trigger text for generating a respective data visualization. The curator is usually the one who has knowledge of the perspectives (visualizations) that are most helpful to answer higher-level business questions, and the data fields associated with those visualizations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device having a display, one or more processors, and memory storing one or more programs configured for execution by the one or more processors:
receiving, in a graphical user interface, a first natural language query directed to a first data source;
in response to receiving the first natural language query:
parsing the first natural language query, including identifying from the first natural language query one or more keywords corresponding to one or more data fields and/or data values of the first data source;
comparing the one or more keywords corresponding to the one or more data fields and/or data values to respective trigger text for each data analysis template of a plurality of data analysis templates for the first data source, wherein;
the plurality of data analysis templates includes a first data analysis template having first trigger text that includes one or more variable terms; and
comparing the one or more keywords corresponding to the one or more data fields and/or data values to the first trigger text of the first data analysis template includes determining whether the one or more keywords corresponding to the one or more data fields and/or data values match a respective predefined set of data fields and/or data values designated for each of the one or more variable terms;
selecting a data analysis template from the plurality of templates in accordance with the comparing, the selected data analysis template including a plurality of first predefined data visualizations for the first data source;
generating a first data dashboard including the plurality of first predefined data visualizations using (i) the selected data analysis template and (ii) the one or more keywords corresponding to the one or more data fields and/or data values, the generating including:
for each of the plurality of first predefined data visualizations:
forming a respective intermediate expression according to a context-free grammar and one more semantic models of data fields in the first data source;
translating the respective intermediate expression into one or more executable database queries referencing the one or more data fields and/or data values;
executing the one or more database queries to retrieve data from the first data source; and
generating the first data dashboard that includes the plurality of first predefined data visualizations using the retrieved data; and
displaying the first data dashboard in the graphical user interface.

2. The method of claim 1, wherein:
the plurality of data analysis templates includes a second data analysis template having second trigger text that includes a plurality of terms; and
comparing the one or more keywords corresponding to the one or more data fields and/or data values to the second trigger text of the second data analysis template includes:
identifying a subset of terms that are required; and
matching parameters of the subset of terms with attributes of the one or more keywords.

3. The method of claim 2, wherein each term of the plurality of terms in the respective trigger text is encoded to specify whether the respective term is required or optional.

4. The method of claim 1, wherein;
the plurality of data analysis templates includes a third data analysis template having third trigger text that includes a plurality of terms, including:
a first term that is optional; and
one or more second terms that are required.

5. The method of claim 4, wherein the one or more second terms are encoded to specify constraints on the one or more second terms.

6. The method of claim 4, wherein the one or more second terms include one or more fixed terms.

7. The method of claim 4, wherein the one or more second terms include one or more variable terms.

8. The method of claim 7, wherein the one or more variable terms include one or more of:
a variable dimension expression that is limited to being replaced by other dimension fields in the first data source;
a variable field expression that is limited to being replaced by a subset of data fields in the first data source; and/or
a variable superlative expression that is limited to being replaced by other superlatives specified in the respective data analysis template.

9. The method of claim 8, wherein:
the one or more variable terms include a variable field expression;
the selected data analysis template is the third data analysis template; and
generating the first data dashboard including the plurality of first predefined data visualizations further comprises:
replacing the variable field expression with a first identified data field;
generating an aggregate expression that includes the first identified data field; and
generating one or more of the plurality of first predefined data visualizations based on the aggregate expression.

10. The method of claim 1, further comprising:
after identifying from the first natural language query the one or more keywords corresponding to one or more data fields and/or data values of the first data source, looking up the keywords using one or more lexicons corresponding to the first data source to identify the one or more data fields and/or data values corresponding to the one or more keywords.

11. The method of claim 1, wherein each predefined data visualization, of the respective plurality of predefined data visualizations, has a respective visualization type that is selected from the group consisting of: a bar chart, a Gantt chart, a line chart, a map, a pie chart, a scatter plot, a tree map, and a text table.

12. The method of claim 1, wherein generating the first data dashboard includes populating one or more parameters in the first data analysis template using the one or more keywords corresponding to the one or more data fields and/or data values of the first data source that are identified in the first natural language query.

13. The method of claim 1, further comprising:
after displaying the first data dashboard in the graphical user interface:
  receiving, in the graphical user interface, a second natural language query, wherein the second natural language query includes a first keyword that is distinct from the one or more keywords identified from the first natural language query;
  in response to receiving the second natural language query:
    in accordance with a determination that the first keyword matches the respective trigger text for the selected data analysis template:
      generating a second data dashboard using the selected data analysis template by replacing a first data field and/or data value corresponding to the first natural language query with a second data field and/or data value corresponding to the second natural language query the second data dashboard including the plurality of first predefined data visualizations; and
      displaying the second data dashboard in the graphical user interface.

14. The method of claim 1, wherein each data visualization of the plurality of first predefined data visualizations has the same data visualization type.

15. The method of claim 1, wherein each data visualization of the plurality of first predefined data visualizations has a distinct data visualization type.

16. The method of claim 1, wherein:
each data analysis template, of the plurality of data analysis templates, includes a respective plurality of predefined data visualizations; and
at least one of the respective predefined data visualizations uses a respective predefined data field, from the first data source, that is distinct from the one or more keywords corresponding to the one or more data fields and/or data values of the first data source.

17. A computing device, comprising:
one or more processors; and
memory coupled to the one or more processors, the memory storing one or more programs configured to be executed by the one or more processors, the one or more programs including instructions for:
  receiving, in a graphical user interface, a first natural language query directed to a first data source;
  in response to receiving the first natural language query:
    parsing the first natural language query, including identifying from the first natural language query one or more keywords corresponding to one or more data fields and/or data values of the first data source;
    comparing the one or more keywords corresponding to the one or more data fields and/or data values to respective trigger text for each data analysis template of a plurality of data analysis templates for the first data source, wherein;
    the plurality of data analysis templates includes a first data analysis template having first trigger text that includes one or more variable terms; and
    comparing the one or more keywords corresponding to the one or more data fields and/or data values to the first trigger text of the first data analysis template includes determining whether the one or more keywords corresponding to the one or more data fields and/or data values match a respective predefined set of data fields and/or data values designated for each of the one or more variable terms;
  selecting a data analysis template from the plurality of templates in accordance with the comparing, the selected data analysis template including a plurality of first predefined data visualizations for the first data source;
  generating a first data dashboard including the plurality of first predefined data visualizations using (i) the selected data analysis template and (ii) the one or more keywords corresponding to the one or more data fields and/or data values, the generating including:
    for each of the plurality of first predefined data visualizations:
      forming a respective intermediate expression according to a context-free grammar and one more semantic models of data fields in the first data source;
      translating the respective intermediate expression into one or more executable database queries referencing the one or more data fields and/or data values;
      executing the one or more database queries to retrieve data from the first data source; and
    generating the first data dashboard that includes the plurality of first predefined data visualizations using the retrieved data; and
  displaying the first data dashboard in the graphical user interface.

18. The computing device of claim 17, wherein:
the plurality of data analysis templates includes a second data analysis template having second trigger text that includes a plurality of terms; and
the instructions for comparing the one or more keywords corresponding to the one or more data fields and/or data values to the second trigger text of the second data analysis template further comprises instructions for:
identifying a subset of terms that are required; and
matching parameters of the subset of terms with attributes of the one or more keywords.

19. The computing device of claim 17, wherein the plurality of data analysis templates includes a third data analysis template having third trigger text that includes one or more of:
a variable dimension expression that is limited to being replaced by other dimension fields in the first data source;

a variable field expression that is limited to being replaced by a subset of data fields in the first data source; and/or a variable superlative expression that is limited to being replaced by other superlatives specified in the respective data analysis template.

20. A non-transitory computer-readable storage medium storing one or more programs configured for execution by one or more processors of a computing device, the one or more programs comprising instructions for:

receiving, in a graphical user interface, a first natural language query directed to a first data source;

in response to receiving the first natural language query:

parsing the first natural language query, including identifying from the first natural language query one or more keywords corresponding to one or more data fields and/or data values of the first data source;

comparing the one or more keywords corresponding to the one or more data fields and/or data values to respective trigger text for each data analysis template of a plurality of data analysis templates for the first data source, wherein;

the plurality of data analysis templates includes a first data analysis template having first trigger text that includes one or more variable terms; and comparing the one or more keywords corresponding to the one or more data fields and/or data values to the first trigger text of the first data analysis template includes determining whether the one or more keywords corresponding to the one or more data fields and/or data values match a respective predefined set of data fields and/or data values designated for each of the one or more variable terms;

selecting a data analysis template from the plurality of templates in accordance with the comparing, the selected data analysis template including a plurality of first predefined data visualizations for the first data source;

generating a first data dashboard including the plurality of first predefined data visualizations using (i) the selected data analysis template and (ii) the one or more keywords corresponding to the one or more data fields and/or data values, the generating including:

for each of the plurality of first predefined data visualizations:

forming a respective intermediate expression according to a context-free grammar and one more semantic models of data fields in the first data source;

translating the respective intermediate expression into one or more executable database queries referencing the one or more data fields and/or data values;

executing the one or more database queries to retrieve data from the first data source; and generating the first data dashboard that includes the plurality of first predefined data visualizations using the retrieved data; and displaying the first data dashboard in the graphical user interface.

\* \* \* \* \*